(12) United States Patent
Chaudhry et al.

(10) Patent No.: US 10,380,429 B2
(45) Date of Patent: Aug. 13, 2019

(54) METHODS AND SYSTEMS FOR PERSON DETECTION IN A VIDEO FEED

(71) Applicant: GOOGLE LLC, Mountain View, CA (US)

(72) Inventors: Rizwan Ahmed Chaudhry, Palo Alto, CA (US); Navneet Dalal, Mountain View, CA (US); Jonathan Z. Ben-Meshulam, Mountain View, CA (US); George Alban Heitz, III, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 373 days.

(21) Appl. No.: 15/207,459

(22) Filed: Jul. 11, 2016

(65) Prior Publication Data

US 2018/0012463 A1    Jan. 11, 2018

(51) Int. Cl.
*G06K 9/00*     (2006.01)
*G06T 7/246*    (2017.01)
(Continued)

(52) U.S. Cl.
CPC ..... *G06K 9/00765* (2013.01); *G06K 9/00771* (2013.01); *G06K 9/6219* (2013.01);
(Continued)

(58) Field of Classification Search
None
See application file for complete search history.

(56) References Cited

U.S. PATENT DOCUMENTS 5,237,408 A    8/1993   Blum et al.
6,046,745 A    4/2000   Moriya et al.
(Continued)

FOREIGN PATENT DOCUMENTS

EP        1024666        8/2000
WO    WO 2009/138037    11/2009

OTHER PUBLICATIONS

Author unknown, "Ch. 1 Configuring Main System" (GEOVision), 2009, https://web.archive.org/web/20090520185506/https:/videos.cctvcamerapros.com/pdf/geovision/geovision-8-manual-ch1.pdf, p. 1-79.

(Continued)

*Primary Examiner* — Matthew C Bella
*Assistant Examiner* — Brian D Shin
(74) *Attorney, Agent, or Firm* — Morgan, Lewis & Bockius LLP

(57) ABSTRACT

The various embodiments described herein include methods, devices, and systems for providing event alerts. In one aspect, a method includes: (1) obtaining a video feed, the video feed comprising a plurality of images; and, (2) for each image, analyzing the image to determine whether the image includes a person, the analyzing including: (a) determining that the image includes a potential instance of a person by analyzing the image at a first resolution; (b) in accordance with the determination that the image includes the potential instance, denoting a region around the potential instance; (c) determining whether the region includes an instance of the person by analyzing the region at a second resolution, greater than the first resolution; and (d) in accordance with a determination that the region includes the instance of the person, determining that the image includes the person.

20 Claims, 43 Drawing Sheets

(51) Int. Cl.
*H04N 7/18* (2006.01)
*G06K 9/62* (2006.01)
*G06K 9/46* (2006.01)

(52) U.S. Cl.
CPC .............. *G06T 7/246* (2017.01); *H04N 7/18* (2013.01); *H04N 7/181* (2013.01); *G06K 9/00369* (2013.01); *G06K 9/46* (2013.01); *G06K 2009/00738* (2013.01); *G06T 2207/10016* (2013.01); *G06T 2207/20016* (2013.01); *G06T 2207/30196* (2013.01)

(56) References Cited

U.S. PATENT DOCUMENTS

| | | | |
|---|---|---|---|
| 6,144,375 A | 11/2000 | Jain et al. | |
| D450,059 S | 11/2001 | Itou | |
| 6,366,296 B1 | 4/2002 | Boreczky et al. | |
| 6,400,378 B1 | 6/2002 | Snook | |
| 6,424,370 B1 | 7/2002 | Courtney | |
| 6,476,858 B1 | 11/2002 | Ramirez Diaz et al. | |
| 6,496,598 B1 | 12/2002 | Harman | |
| 6,535,793 B2 | 3/2003 | Allard | |
| 6,571,050 B1 | 5/2003 | Park | |
| 6,600,784 B1 | 7/2003 | Divakaran et al. | |
| 6,611,653 B1 | 8/2003 | Kim et al. | |
| 6,628,835 B1 | 9/2003 | Brill et al. | |
| 6,643,416 B1 | 11/2003 | Daniels et al. | |
| 6,647,200 B1 | 11/2003 | Tanaka | |
| 6,665,423 B1 | 12/2003 | Mehrotra et al. | |
| 6,697,103 B1 | 2/2004 | Fernandez et al. | |
| 6,741,977 B1 | 5/2004 | Nagaya et al. | |
| D491,956 S | 6/2004 | Ombao et al. | |
| 6,792,676 B2 | 9/2004 | Haji et al. | |
| 6,816,184 B1 | 11/2004 | Brill et al. | |
| D499,740 S | 12/2004 | Ombao et al. | |
| 6,970,183 B1 | 11/2005 | Monroe | |
| 7,016,415 B2 | 3/2006 | Alvarez | |
| 7,023,469 B1 | 4/2006 | Olson | |
| 7,142,600 B1 | 11/2006 | Schonfeld et al. | |
| D555,661 S | 11/2007 | Kim | |
| 7,403,116 B2 | 7/2008 | Bittner | |
| 7,421,455 B2 | 9/2008 | Hua et al. | |
| 7,421,727 B2 | 9/2008 | Oya et al. | |
| 7,433,493 B1 | 10/2008 | Miyoshi et al. | |
| 7,440,613 B2 | 10/2008 | Xu | |
| 7,447,337 B2 | 11/2008 | Zhang et al. | |
| D590,412 S | 4/2009 | Saft et al. | |
| D607,001 S | 12/2009 | Ording | |
| 7,629,995 B2 | 12/2009 | Salivar et al. | |
| 7,685,519 B1 | 3/2010 | Duncan et al. | |
| 7,760,908 B2 | 7/2010 | Curtner et al. | |
| 7,765,482 B2 | 7/2010 | Wood et al. | |
| D621,413 S | 8/2010 | Rasmussen | |
| D625,323 S | 10/2010 | Matsushima et al. | |
| 7,813,525 B2 | 10/2010 | Aggarwal | |
| 7,823,066 B1 | 10/2010 | Kuramura | |
| 7,920,626 B2 | 4/2011 | Fernandez et al. | |
| 7,924,323 B2 | 4/2011 | Walker et al. | |
| D638,025 S | 5/2011 | Saft et al. | |
| 7,995,096 B1 | 8/2011 | Cressy et al. | |
| 8,115,623 B1 | 2/2012 | Green | |
| 8,122,038 B2 | 2/2012 | Handy et al. | |
| 8,130,839 B2 | 3/2012 | Kawashima et al. | |
| 8,200,669 B1 | 6/2012 | Iampietro et al. | |
| 8,204,273 B2 | 6/2012 | Chambers et al. | |
| 8,284,258 B1 | 10/2012 | Cetin et al. | |
| 8,295,597 B1 | 10/2012 | Sharma et al. | |
| 8,300,890 B1 | 10/2012 | Gaikwad et al. | |
| 8,305,447 B1 | 11/2012 | Wong | |
| 8,390,684 B2 | 3/2013 | Piran et al. | |
| 8,401,232 B2 | 3/2013 | Fan | |
| 8,494,234 B1 | 7/2013 | Bozinovic et al. | |
| 8,515,128 B1 | 8/2013 | Hildreth | |
| 8,525,665 B1 | 9/2013 | Trundle et al. | |
| 8,537,219 B2 | 9/2013 | Desimone et al. | |
| 8,577,091 B2 | 11/2013 | Ivanov et al. | |
| 8,587,653 B1 | 11/2013 | Vidunas et al. | |
| 8,613,070 B1 | 12/2013 | Borzycki et al. | |
| 8,676,493 B2 | 3/2014 | M et al. | |
| 8,688,483 B2 | 4/2014 | Watts | |
| 8,707,194 B1 | 4/2014 | Jenkins et al. | |
| 8,775,242 B2 | 7/2014 | Tavares et al. | |
| 8,780,201 B1 | 7/2014 | Scalisi et al. | |
| 8,854,457 B2 | 10/2014 | De Vleeschouwer et al. | |
| 8,902,085 B1 | 12/2014 | Ray et al. | |
| 8,941,733 B2 | 1/2015 | Albers et al. | |
| 8,941,736 B1 | 1/2015 | Scalisi | |
| 8,942,438 B2 | 1/2015 | Ivanov et al. | |
| 8,953,848 B2 | 2/2015 | Ivanov et al. | |
| 8,958,602 B1 | 2/2015 | Lane et al. | |
| 8,966,368 B2 | 2/2015 | Kuramura | |
| 8,982,141 B2 | 3/2015 | Freyhult | |
| 9,014,429 B2 | 4/2015 | Badawy | |
| 9,025,836 B2 | 5/2015 | Ptucha | |
| 9,064,393 B2 | 6/2015 | He | |
| 9,082,018 B1 | 7/2015 | Laska et al. | |
| 9,158,974 B1 | 10/2015 | Laska et al. | |
| 9,172,911 B2 | 10/2015 | Kristiansen et al. | |
| 9,213,903 B1 | 12/2015 | Laska et al. | |
| 9,269,243 B2 | 2/2016 | Shet et al. | |
| 9,325,905 B2 | 4/2016 | Noyes | |
| 9,361,011 B1 | 6/2016 | Burns et al. | |
| 9,420,331 B2 | 8/2016 | Laska et al. | |
| 9,449,229 B1 | 9/2016 | Laska et al. | |
| 9,479,822 B2 | 10/2016 | Laska et al. | |
| 9,516,053 B1 | 12/2016 | Muddu et al. | |
| 9,575,178 B2 | 2/2017 | Kanamori et al. | |
| D782,495 S | 3/2017 | Laska et al. | |
| 9,600,723 B1 | 3/2017 | Pantofaru et al. | |
| 9,602,860 B2 | 3/2017 | Laska et al. | |
| 9,613,524 B1 | 4/2017 | Lamb et al. | |
| 9,621,798 B2 | 4/2017 | Zhang et al. | |
| 9,674,453 B1 | 6/2017 | Tangeland et al. | |
| 9,753,994 B2 | 9/2017 | Anderson | |
| 9,940,523 B2 | 4/2018 | Laska et al. | |
| 9,997,053 B2 | 6/2018 | Maneskiold et al. | |
| 10,063,815 B1 | 8/2018 | Spivey et al. | |
| 10,108,862 B2 | 10/2018 | Laska et al. | |
| 2002/0002425 A1 | 1/2002 | Dossey et al. | |
| 2002/0113813 A1 | 8/2002 | Yoshimine | |
| 2003/0063093 A1 | 4/2003 | Howard | |
| 2004/0100560 A1 | 5/2004 | Stavely et al. | |
| 2004/0109059 A1 | 6/2004 | Kawakita | |
| 2004/0123328 A1 | 6/2004 | Coffey et al. | |
| 2004/0125908 A1 | 7/2004 | Cesmeli | |
| 2004/0133647 A1 | 7/2004 | Ozkan et al. | |
| 2004/0143602 A1 | 7/2004 | Ruiz et al. | |
| 2004/0174434 A1 | 9/2004 | Walker et al. | |
| 2005/0047672 A1 | 3/2005 | Ben-Ezra et al. | |
| 2005/0074140 A1 | 4/2005 | Grasso et al. | |
| 2005/0132414 A1 | 6/2005 | Bentley et al. | |
| 2005/0151851 A1 | 7/2005 | Schnell | |
| 2005/0246119 A1 | 11/2005 | Koodali | |
| 2006/0056056 A1 | 3/2006 | Ahiska et al. | |
| 2006/0072847 A1 | 4/2006 | Chor et al. | |
| 2006/0093998 A1 | 5/2006 | Vertegaal | |
| 2006/0195716 A1 | 8/2006 | Bittner | |
| 2006/0239645 A1 | 10/2006 | Curtner et al. | |
| 2007/0002141 A1 | 1/2007 | Lipton et al. | |
| 2007/0014554 A1 | 1/2007 | Sasaki | |
| 2007/0041727 A1 | 2/2007 | Lee et al. | |
| 2007/0061862 A1 | 3/2007 | Berger et al. | |
| 2007/0132558 A1 | 6/2007 | Rowe et al. | |
| 2007/0220569 A1 | 9/2007 | Ishii | |
| 2007/0257986 A1 | 11/2007 | Ivanov et al. | |
| 2008/0051648 A1 | 2/2008 | Suri et al. | |
| 2008/0122926 A1 | 5/2008 | Zhou et al. | |
| 2008/0170123 A1 | 7/2008 | Albertson et al. | |
| 2008/0178069 A1 | 7/2008 | Stallings | |
| 2008/0192129 A1 | 8/2008 | Walker et al. | |
| 2008/0244453 A1 | 10/2008 | Cafer | |
| 2008/0270363 A1 | 10/2008 | Hunt et al. | |
| 2008/0303903 A1 | 12/2008 | Bentley et al. | |
| 2008/0316311 A1 | 12/2008 | Albers et al. | |

(56) References Cited

U.S. PATENT DOCUMENTS

| | | |
|---|---|---|
| 2009/0018996 A1 | 1/2009 | Hunt et al. |
| 2009/0033746 A1 | 2/2009 | Brown et al. |
| 2009/0100007 A1 | 4/2009 | Campbell et al. |
| 2009/0141939 A1 | 6/2009 | Chambers et al. |
| 2009/0207257 A1 | 8/2009 | Jung et al. |
| 2009/0232416 A1 | 9/2009 | Murashita |
| 2009/0244291 A1 | 10/2009 | Saptharishi et al. |
| 2009/0262189 A1 | 10/2009 | Marman |
| 2009/0288011 A1 | 11/2009 | Piran et al. |
| 2009/0316956 A1 | 12/2009 | Higuchi et al. |
| 2009/0319829 A1 | 12/2009 | Takayama |
| 2010/0002070 A1 | 1/2010 | Ahiska |
| 2010/0002071 A1 | 1/2010 | Ahiska |
| 2010/0002911 A1 | 1/2010 | Wu et al. |
| 2010/0004839 A1 | 1/2010 | Yokoyama et al. |
| 2010/0033573 A1 | 2/2010 | Malinovski et al. |
| 2010/0133008 A1 | 6/2010 | Gawski et al. |
| 2010/0162114 A1 | 6/2010 | Roth |
| 2010/0210240 A1 | 8/2010 | Mahaffey et al. |
| 2010/0245107 A1 | 9/2010 | Fulker et al. |
| 2010/0304731 A1 | 12/2010 | Bratton et al. |
| 2011/0001605 A1 | 1/2011 | Kiani et al. |
| 2011/0167369 A1 | 7/2011 | Van Os |
| 2011/0199488 A1 | 8/2011 | Gorilovskij et al. |
| 2011/0254972 A1 | 10/2011 | Yaguchi |
| 2011/0255741 A1 | 10/2011 | Jung et al. |
| 2011/0255775 A1 | 10/2011 | McNamer et al. |
| 2011/0291925 A1 | 12/2011 | Israel |
| 2011/0312350 A1 | 12/2011 | Agerholm |
| 2012/0052972 A1 | 3/2012 | Bentley et al. |
| 2012/0098918 A1 | 4/2012 | Murphy |
| 2012/0176496 A1 | 7/2012 | Carbonell et al. |
| 2012/0195363 A1 | 8/2012 | Laganiere et al. |
| 2012/0257000 A1 | 10/2012 | Singhal |
| 2013/0027581 A1 | 1/2013 | Price et al. |
| 2013/0125039 A1 | 5/2013 | Murata |
| 2013/0128022 A1 | 5/2013 | Bose |
| 2013/0145270 A1 | 6/2013 | Piran et al. |
| 2013/0201329 A1* | 8/2013 | Thornton ............... H04N 7/18 348/143 |
| 2013/0242093 A1 | 9/2013 | Cobb et al. |
| 2014/0013243 A1 | 1/2014 | Flynn, III |
| 2014/0044404 A1 | 2/2014 | Grundmann et al. |
| 2014/0056479 A1 | 2/2014 | Bobbitt et al. |
| 2014/0068349 A1 | 3/2014 | Scott et al. |
| 2014/0075370 A1 | 3/2014 | Guerin et al. |
| 2014/0082497 A1 | 3/2014 | Chalouhi et al. |
| 2014/0142907 A1 | 5/2014 | Gellaboina et al. |
| 2014/0146125 A1 | 5/2014 | Kristiansen et al. |
| 2014/0160294 A1 | 6/2014 | Naylor |
| 2014/0198237 A1 | 7/2014 | Noyes |
| 2014/0210646 A1 | 7/2014 | Subramanya |
| 2014/0300722 A1 | 10/2014 | Garcia |
| 2014/0313142 A1 | 10/2014 | Yairi |
| 2014/0313542 A1 | 10/2014 | Benchorin et al. |
| 2014/0320740 A1 | 10/2014 | Wan et al. |
| 2014/0347475 A1 | 11/2014 | Divakaran et al. |
| 2015/0022660 A1 | 1/2015 | Kavadeles |
| 2015/0046184 A1 | 2/2015 | Cocco et al. |
| 2015/0054981 A1 | 2/2015 | Saiki et al. |
| 2015/0074535 A1 | 3/2015 | Silberstein et al. |
| 2015/0098613 A1 | 4/2015 | Gagvani et al. |
| 2015/0181088 A1 | 6/2015 | Wu et al. |
| 2015/0194134 A1 | 7/2015 | Dureau et al. |
| 2015/0201152 A1 | 7/2015 | Cho et al. |
| 2015/0234571 A1 | 8/2015 | Lee et al. |
| 2015/0242687 A1 | 8/2015 | Seo |
| 2015/0242994 A1 | 8/2015 | Shen |
| 2015/0279182 A1 | 10/2015 | Kanaujia et al. |
| 2015/0339702 A1 | 11/2015 | Lin et al. |
| 2016/0006932 A1 | 1/2016 | Zhang et al. |
| 2016/0006988 A1 | 1/2016 | Zhao et al. |
| 2016/0026862 A1 | 1/2016 | Anderson |
| 2016/0041724 A1 | 2/2016 | Kirkby et al. |
| 2016/0042621 A1 | 2/2016 | Hogg et al. |
| 2016/0072831 A1 | 3/2016 | Rieke |
| 2016/0092737 A1 | 3/2016 | Laska et al. |
| 2016/0092738 A1 | 3/2016 | Laska et al. |
| 2016/0103559 A1 | 4/2016 | Maheshwari et al. |
| 2016/0103887 A1 | 4/2016 | Fletcher et al. |
| 2016/0110612 A1 | 4/2016 | Sabripour |
| 2016/0189531 A1 | 6/2016 | Modi et al. |
| 2016/0195716 A1 | 7/2016 | Nakanuma |
| 2016/0219248 A1 | 7/2016 | Reznik et al. |
| 2016/0235344 A1 | 8/2016 | Auerbach |
| 2016/0241818 A1 | 8/2016 | Palanisamy et al. |
| 2016/0274771 A1 | 9/2016 | Seong et al. |
| 2016/0307418 A1 | 10/2016 | Pantus et al. |
| 2016/0316176 A1 | 10/2016 | Laska et al. |
| 2016/0316256 A1* | 10/2016 | Laska ............... G06K 9/00711 |
| 2016/0321889 A1 | 11/2016 | Gagvani et al. |
| 2016/0360116 A1 | 12/2016 | Penha et al. |
| 2016/0366036 A1 | 12/2016 | Gupta et al. |
| 2017/0019605 A1 | 1/2017 | Ahiska |
| 2017/0039729 A1 | 2/2017 | Wang et al. |
| 2017/0111494 A1 | 4/2017 | Kidron et al. |
| 2017/0123492 A1 | 5/2017 | Marggraff et al. |
| 2017/0162230 A1 | 6/2017 | Maliuk et al. |
| 2017/0163929 A1 | 6/2017 | Maliuk et al. |
| 2017/0180678 A1 | 6/2017 | Fish et al. |
| 2017/0257612 A1 | 9/2017 | Emeott et al. |
| 2018/0004784 A1 | 1/2018 | Tompkins |
| 2018/0089328 A1 | 3/2018 | Bath et al. |
| 2018/0096197 A1 | 4/2018 | Kephart |
| 2018/0121035 A1 | 5/2018 | Filippi et al. |
| 2018/0144314 A1 | 5/2018 | Miller |
| 2018/0182148 A1 | 6/2018 | Yanagisawa |
| 2018/0218053 A1 | 8/2018 | Koneru |
| 2018/0219897 A1 | 8/2018 | Muddu et al. |

OTHER PUBLICATIONS

James Drinkwater, "Howto: Set up motion detection in a Mobotix network camera", http://www.networkwebcams.com/ip-camera-learning-center/2010/03/03/howto-setting-up-motion-detection-in-a-mobotix-camera/, Mar. 3, 2010.

D. D Buzan, S. Sclaroff, & G. Kollios, "Extraction and clustering of motion trajectories in video", 2 Proceedings of the 17th Intl Conf. on Pattern Recognition 521-524 (Aug. 2004).

L. L Zelnik-Manor, "Event-based analysis of video", 2 Proceedings of the 2001 IEEE Computer Soc'y Conf. on Computer Vision & Pattern Recognition 123-130 (2001).

Birk, Deterministic Load-Balancing Schemes for Disk-Based Video-on-Demand Storage Servers, 14 IEEE Symposium on Mass Storage Systems, Sep. 1995, pp. 17-25.

Castellanos, Event Detection in Video Using Motion Analysis, 1st ACM Int'l Workshop on Analysis & Retrieval of Tracked Events & Motion in Imagery Streams, Oct. 2010, pp. 57-62.

Delbruck, Frame-free dynamic digital vision, 2008 Int'l Symp. on Secure-Life Electronics, Advanced Electronics for Quality Life & Socy, Mar. 2008, pp. 21-26.

Ellis, Model-based vision for automatic alarm interpretation, IEEE 1990 Int'l Carnahan Conf. on Security Tech, Oct. 1990, pp. 62-67.

FI8921W email notification and motion alarm, Jun. 4, 2013, pp. 1-4, http://foscam.us/forum/fi8921w-email-notification-and-motion-alarm-t5874.html.

Google Inc., International Search Report and Written Opinion, PCT/US2015/039425, dated Sep. 28, 2015, 12 pgs.

Gresham, Review: iZon wi-fi Video monitor and its companion iOS app, 2012, p. 1-8, www.idownloadblog.com/2012/11/21/stem-izon-review.

Halliquist, How do I set up Activity Alerts, 2013, p. 1-3, http://support.dropcam.com/entries/27880086-How-do-i-set-up-Activity-Alerts.

Ispy, Motion Detection Setting up Motion Detection, Dec. 11, 2011, pp. 1-3, https://www.ispyconnect.com/userguide-motion-detection.aspx.

IZON App Guide, 2014, p. 1-30, www.isoncam.com/wp-content/uploads/2014/06/IZON-App-Guide.pdf.

(56) References Cited

OTHER PUBLICATIONS

Logitech, Logitech Alert Video Security System: Getting to Know, 2010, p. 1-9, www.logitech.com/assets/32688/good-to-know.pdf.

Medioni, Event detection and analysis from video streams, 23 IEEE Transactions on Pattern Analysis & Machine Intelligence, Aug. 2001, pp. 873-889.

Revis, How to Setup Motion Detection of your D-Link Camera, Apr. 9, 2014, pp. 1-8, http://blog.dlink.com/how-to-set-up-motion-detection-on-your-d-link-camera.

Schraml, A spatio-termporal clustering method using real-time motion analysis on event-based 3D vision, 2010 IEEE Comp. Socy Conf. on Comp. Vision & Pattern Recognition Workshops, Jun. 2010, pp. 57-63.

Shim, A Study of Surveillance System of Objects Abnormal Behaviour by Blob Composition Analysis, 8 Int'l J. of Security & Its Applications, Mar. 2014, pp. 333-340.

Yoon, Event Detection from MPEG Video in the Compressed Domain, 15th Int'l Conf. on Pattern Recognition, Sep. 2000, pp. 819-822.

You Tube, Sky News Live (screenshot of website illustrating live stream video with timeline having preview thumbnail of past images within the stream), accessed Mar. 23, 2016, 2 pgs, www.youtube.com/watch?v=y60wDzZt8yg.

L. Li, W. Whuang, I.Y.H. Gu, & Q. Tian, "Statistical Modeling of Complex Backgrounds for Foreground Object Detection", 13 IEEE Transactions on Image Processing 1459-1472 (Nov. 2004).

M. Camplani, T. Mantecon, & L. Salgado, "Accurate Depth-Color Scene Modeling for 3D Contents Generation with Low Cost Depth Cameras", 19 IEEE Int'l Conf. on Image Processing 1741-1744 (Oct. 2012).

F. Zhou, F. De la Torre, & J.K. Hodgins, "Aligned Cluster Analysis for Temporal Segmentation of Human Motion", 8 IEEE Int'l Conf. on Automatic Face & Gesture Recognition 1-7 (Sep. 2008).

Google LLC, EP Patent Certificate, EP Patent No. 3022720, Jan. 31, 2018, 1 pg.

Yuri Ivanov and Christopher Wren, "Toward Spatial Queries for Spatial Surveillance Tasks", May 2006, https://www._researchgate.netlprofile/Yuri lvan0v2/publication/21 5439735 Toward Spatial Queries for Spatial Surveillance Tasks/links/0c960539e6408cb328000000.pdf, p. 1-9.

Central Intelligence Agency "Words of Estimative Probability" May 25, 2018, 12 pgs.

Graph Maker, [online], graphs uploaded on Oct. 26, 2013 & Oct. 27, 2013 & Nov. 17, 2013, retrieved on Dec. 20, 2018. Retrieved from, <URL : https://forunn.unity.conn/threads/released-graph-nnaker-ugui-ngui-dfgui-line-graphs-bar-graphs-pie-graphs-etc.202437/>, all pages.

Amplification of the Antibody Response, [online], published on Mar. 15, 1999, retrieved on Dec. 20, 2018. Retrieved from, <URL: http://www.jimmunol.org/content/162/6/3647>, all pages.

Histograms, [online], publication date unknown, retrieved on Dec. 20, 2018. Retrieved from, <URL: https://root.cern.ch/root/htmldoc/guides/users-guide/Histograms.html>, all pages.

File:savedemo.png, [online], graph uploaded on Apr. 3, 2014, retrieved on Dec. 20, 2018. Retrieved from, <URL: http://wiki.freepascal.org/File:savedenno.png>, all pages.

Literature Review—Graphical Tools, [online], publication date unknown, retrieved on Dec. 20, 2018. Retrieved from <URL: https://www.stat.auckland.ac.nz/-joh024/LitReviews/LitReview GraphicalTools.pdf>, all pages.

Clustered/Stacked Filled Bar Graph Generator, [online], website crawled on Mar. 26, 2014, retrieved on Dec. 31, 2018. Retrieved from, < URL: https://web.archive.org/web/20140326054333/http://www.burningcutlery.conn:80/derek/bargraph/>, all pages.

\* cited by examiner

Event Categories 7170

| Unknown Person(s) Event 71702 |
|---|
| Known Person(s) Event 71704 |
| Zone Event 71706 |
| Animal Event 71708 |
| Vehicle Event 71710 |
| Audio Event 71712 |
| Alert Event 71714 |

Confidence Criteria 7171

| Confidence Score > 95% | 71712 |
|---|---|
| Confidence Score > 70% | 71714 |
| Confidence Score > 50% | 71716 |

Figure 7C

Motion Mask (based on one frame)
(a)

Event Mask (based on a frame sequence)
(b)

METHODS AND SYSTEMS FOR PERSON DETECTION IN A VIDEO FEED

RELATED APPLICATIONS

This application is related to U.S. patent application Ser. No. 15/207,463, filed Jul. 11, 2016, entitled "Methods and Systems for Providing Intelligent Alerts for Events," U.S. patent application Ser. No. 15/207,458, filed Jul. 11, 2016, entitled "Methods and Systems for Providing Event Alerts," and U.S. patent application Ser. No. 14/738,034, filed Jun. 12, 2015, entitled "Systems and Methods for Categorizing Motion Event Candidates," all of which are hereby incorporated by reference in their entirety.

TECHNICAL FIELD

This relates generally to providing alerts, including but not limited to, providing alerts for categorized motion events.

BACKGROUND

Video surveillance produces a large amount of continuous video data over the course of hours, days, and even months. Such video data includes many long and uneventful portions that are of no significance or interest to a reviewer. In some existing video surveillance systems, motion detection is used to trigger alerts or video recording. However, using motion detection as the only means for selecting video segments for user review may still produce too many video segments that are of no interest to the reviewer. For example, some detected motions are generated by normal activities that routinely occur at the monitored location, and it is tedious and time consuming to manually scan through all of the normal activities recorded on video to identify a small number of activities that warrant special attention. In addition, when the sensitivity of the motion detection is set too high for the location being monitored, trivial movements (e.g., movements of tree leaves, shifting of the sunlight, etc.) can account for a large amount of video being recorded and/or reviewed. On the other hand, when the sensitivity of the motion detection is set too low for the location being monitored, the surveillance system may fail to record and present video data on some important and useful events.

It is a challenge to accurately identify and categorize meaningful segments of a video stream, and to convey this information to a user in an efficient, intuitive, and convenient manner. Human-friendly techniques for discovering, categorizing, and notifying users of events of interest are in great need.

SUMMARY

Accordingly, there is a need for systems and/or devices with more efficient, accurate, and intuitive methods for event identification, categorization, and presentation. Such systems, devices, and methods optionally complement or replace conventional systems, devices, and methods for event identification, categorization, and/or presentation.

In one aspect, some implementations include a method performed at a computing system having one or more processors and memory coupled to the one or more processors. The method includes: (1) obtaining a first category of a plurality of motion categories for a first motion event, the first motion event corresponding to a first plurality of video frames from a camera; (2) sending a first alert indicative of the first category to a user associated with the camera; (3) after sending the first alert, obtaining a second category of the plurality of motion categories for a second motion event, the second motion event corresponding to a second plurality of video frames from the camera; (4) in accordance with a determination that the second category is the same as (or substantially the same as) the first category, determining whether a predetermined amount of time has elapsed since the sending of the first alert; (5) in accordance with a determination that the predetermined amount of time has elapsed, sending a second alert indicative of the second category to the user; and (6) in accordance with a determination that the predetermined amount of time has not elapsed, forgoing sending the second alert.

In another aspect, some implementations include a method performed at a computing system having one or more processors and memory coupled to the one or more processors. The method includes: (1) receiving a plurality of video frames from a camera, the plurality of video frames including a motion event candidate; (2) categorizing the motion event candidate by processing the plurality of video frames, the categorizing including: (a) associating the motion event candidate with a first category of a plurality of motion event categories; and (b) generating a confidence level (also sometimes called a confidence score) for the association of the motion event candidate with the first category; and (3) sending an alert indicative of the first category and the confidence level to a user associated with the camera.

In another aspect, some implementations include a method performed at a computing system having one or more processors and memory coupled to the one or more processors. The method includes: (1) obtaining a video feed, the video feed comprising a plurality of images; and (2) for each image in the plurality of images, analyzing the image to determine whether the image includes a person, the analyzing including: (a) determining that the image includes a potential instance of a person by analyzing the image at a first resolution; (b) in accordance with the determination that the image includes the potential instance, denoting a region around the potential instance, wherein the area of the region is less than the area of the image; (c) determining whether the region includes an instance of the person by analyzing the region at a second resolution, greater than the first resolution; and (d) in accordance with a determination that the region includes the instance of the person, determining that the image includes the person.

In yet another aspect, some implementations include a server system including one or more processors and memory coupled to the one or more processors, the memory storing one or more programs configured to be executed by the one or more processors, the one or more programs including instructions for performing any of the methods described herein.

In yet another aspect, some implementations include a computing device including one or more processors and memory coupled to the one or more processors, the memory storing one or more programs configured to be executed by the one or more processors, the one or more programs including instructions for performing any of the methods described herein. For example, the methods described herein are performed by client device 504 (FIG. 8) and/or smart device 204 (FIG. 9).

In yet another aspect, some implementations include a computing system including one or more processors and memory coupled to the one or more processors, the memory storing one or more programs configured to be executed by the one or more processors, the one or more programs including instructions for performing any of the methods described herein. For example, the methods described herein are performed by a plurality of devices coupled together to form a system, such as one or more client devices and one or more servers.

In yet another aspect, some implementations include a non-transitory computer-readable storage medium storing one or more programs for execution by one or more processors of a storage device, the one or more programs including instructions for performing any of the methods described herein.

Thus, devices, storage mediums, and computing systems are provided with methods for providing event alerts, thereby increasing the effectiveness, efficiency, and user satisfaction with such systems. Such methods may complement or replace conventional methods for providing event alerts.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 7B-7C illustrate various data structures used by some implementations.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally to any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

Figure 1:
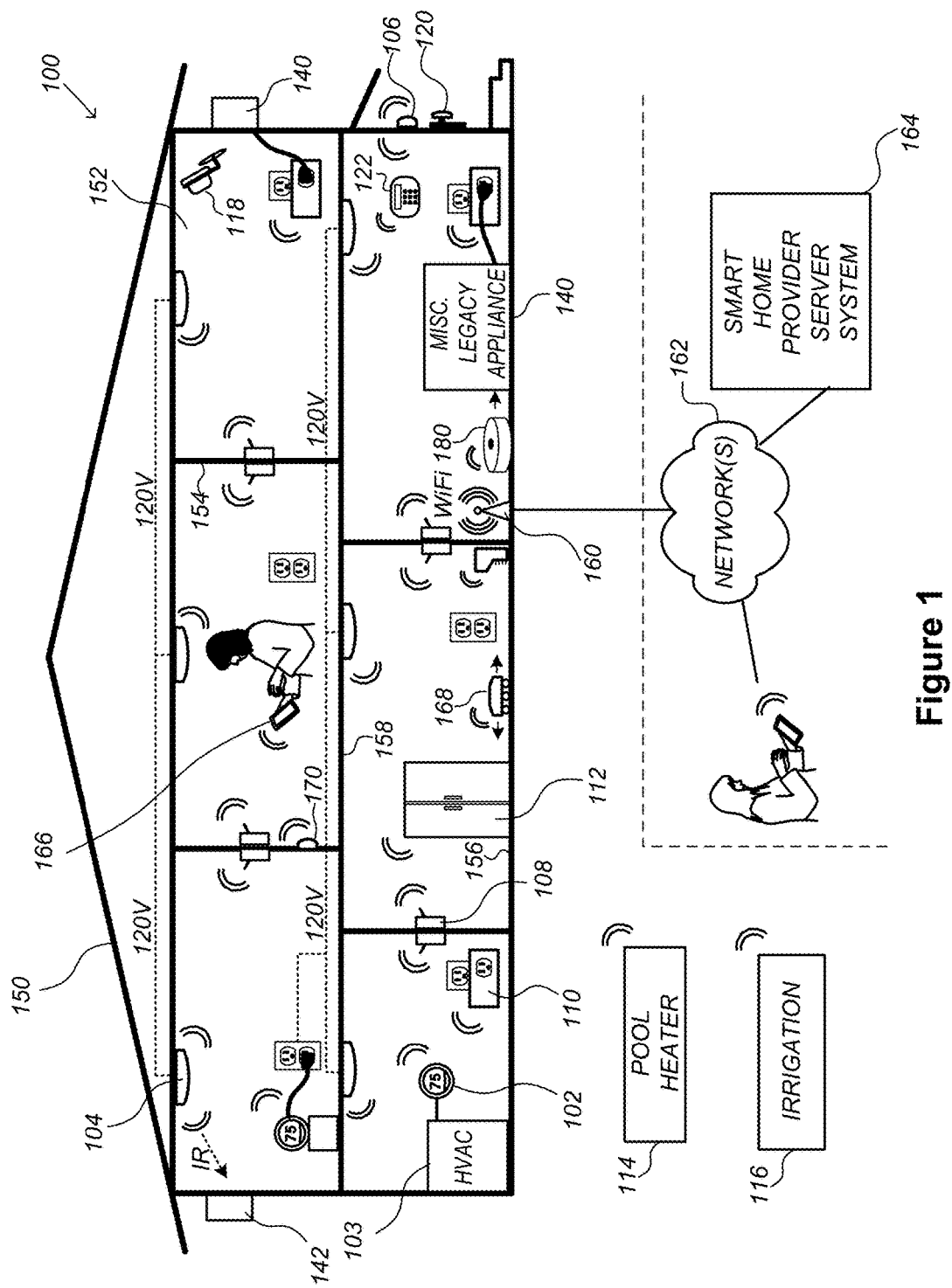
FIG. 1 is an example smart home environment, in accordance with some implementations.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device (s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network (s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view the status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to stream-line adding of new devices and commissioning of the hub device. In some implementations, hub device 180 further comprises a local storage device for storing data related to, or output by, smart devices of smart home environment 100. In some implementations, the data includes one or more of: video data output by a camera device, metadata output by a smart device, settings information for a smart device, usage logs for a smart device, and the like.

Figure 7A:
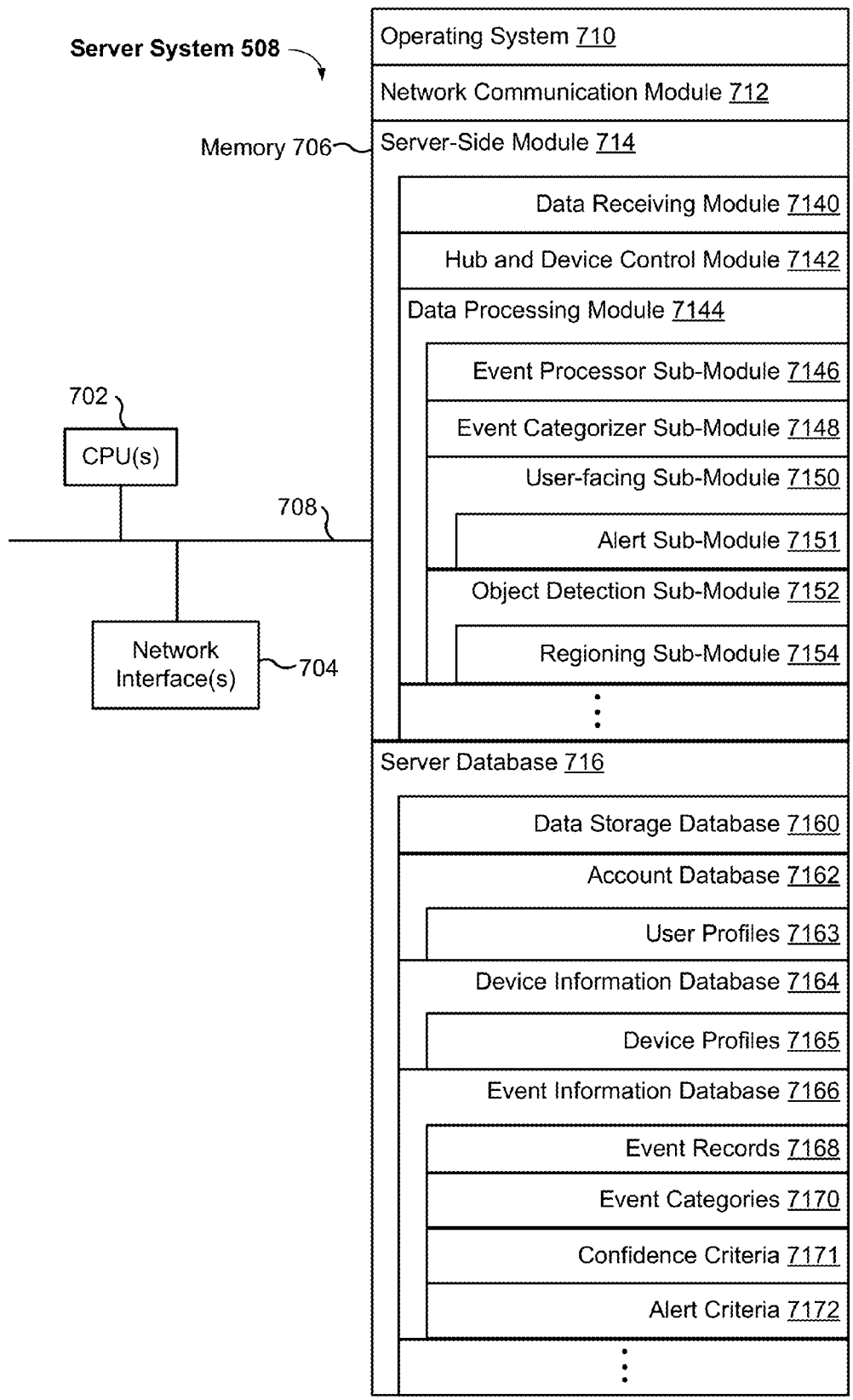
FIG. 7A is a block diagram illustrating a representative server system, in accordance with some implementations.

In some implementations, smart home environment 100 includes a local storage device for storing data related to, or output by, smart devices of smart home environment 100. In some implementations, the data includes one or more of: video data output by a camera device (e.g., camera 118), metadata output by a smart device, settings information for a smart device, usage logs for a smart device, and the like. In some implementations, the local storage device is communicatively coupled to one or more smart devices via a smart home network (e.g., smart home network 202, FIG. 2). In some implementations, the local storage device is selectively coupled to one or more smart devices via a wired and/or wireless communication network. In some implementations, the local storage device is used to store video data when external network conditions are poor. For example, the local storage device is used when an encoding bitrate of camera 118 exceeds the available bandwidth of the external network (e.g., network(s) 162). In some implementations, the local storage device temporarily stores video data from one or more cameras (e.g., camera 118) prior to transferring the video data to a server system (e.g., server system 508, FIG. 5). In some implementations, the local storage device is a component of a camera device. In some implementations, each camera device includes a local storage. In some implementations, the local storage device performs some or all of the data processing described below with respect to server system 508 (FIG. 7A). In some implementations, the local storage device stores some or all of the data described below with respect to server system 508, such as data storage database 7160, account database 7162, device information database 7164, and event information database 7166. In some implementations, the local storage device performs some or all of the operations described herein with respect to the server system 508.

Figure 2:
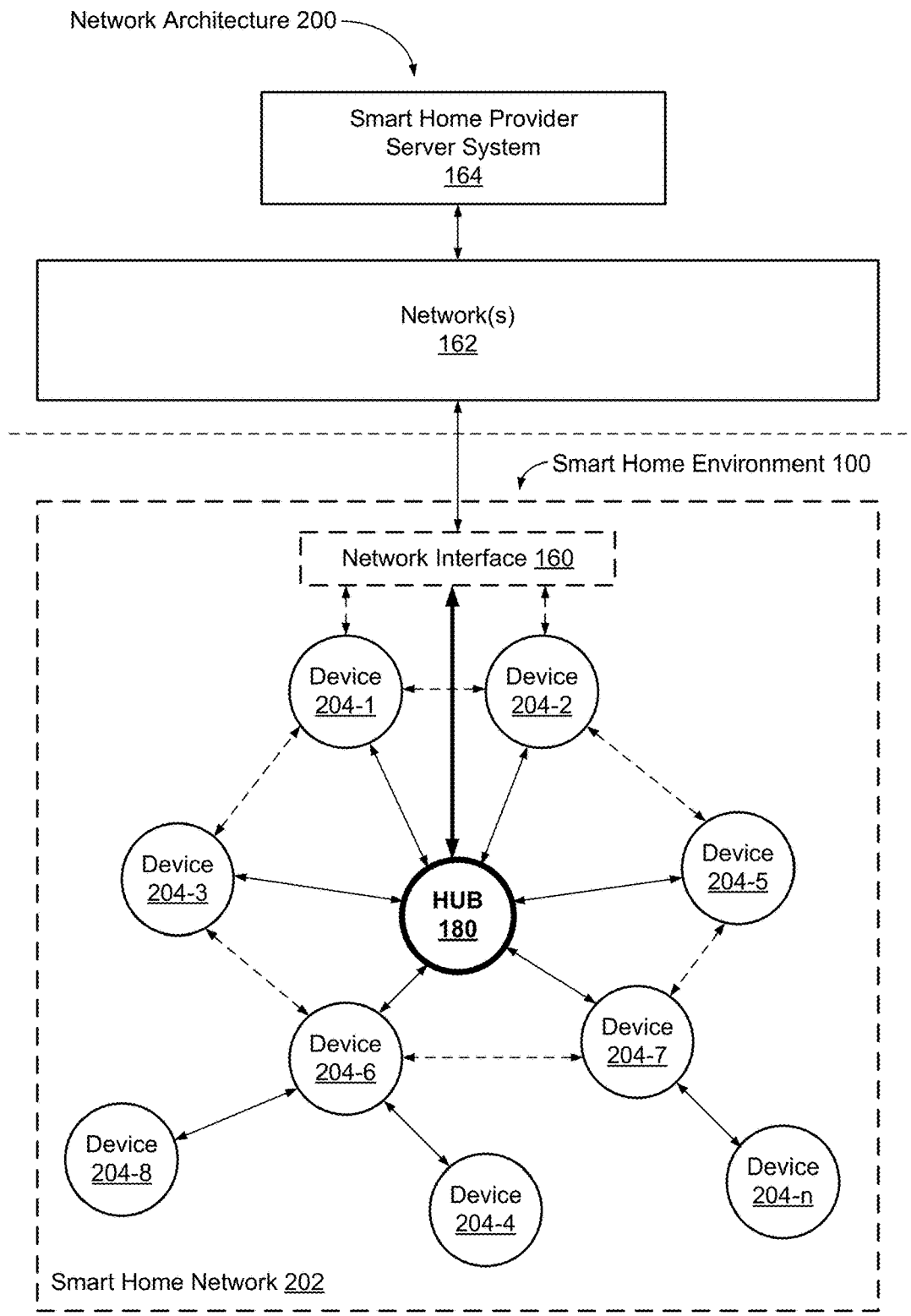
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
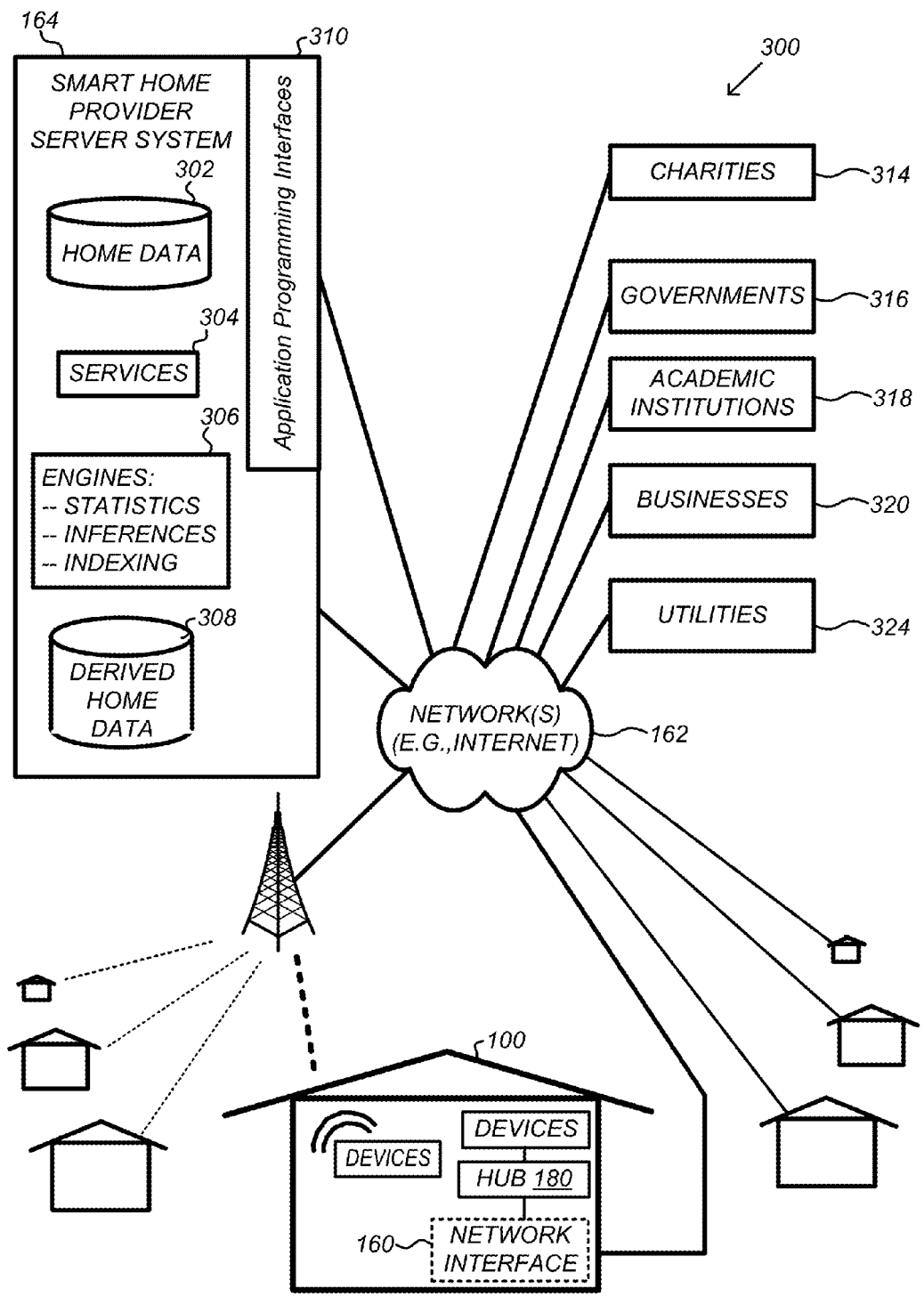
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a web page to a user of the device, or to other non-smart device entities. In some implementations, usage statistics (e.g., relative to use of other devices), usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
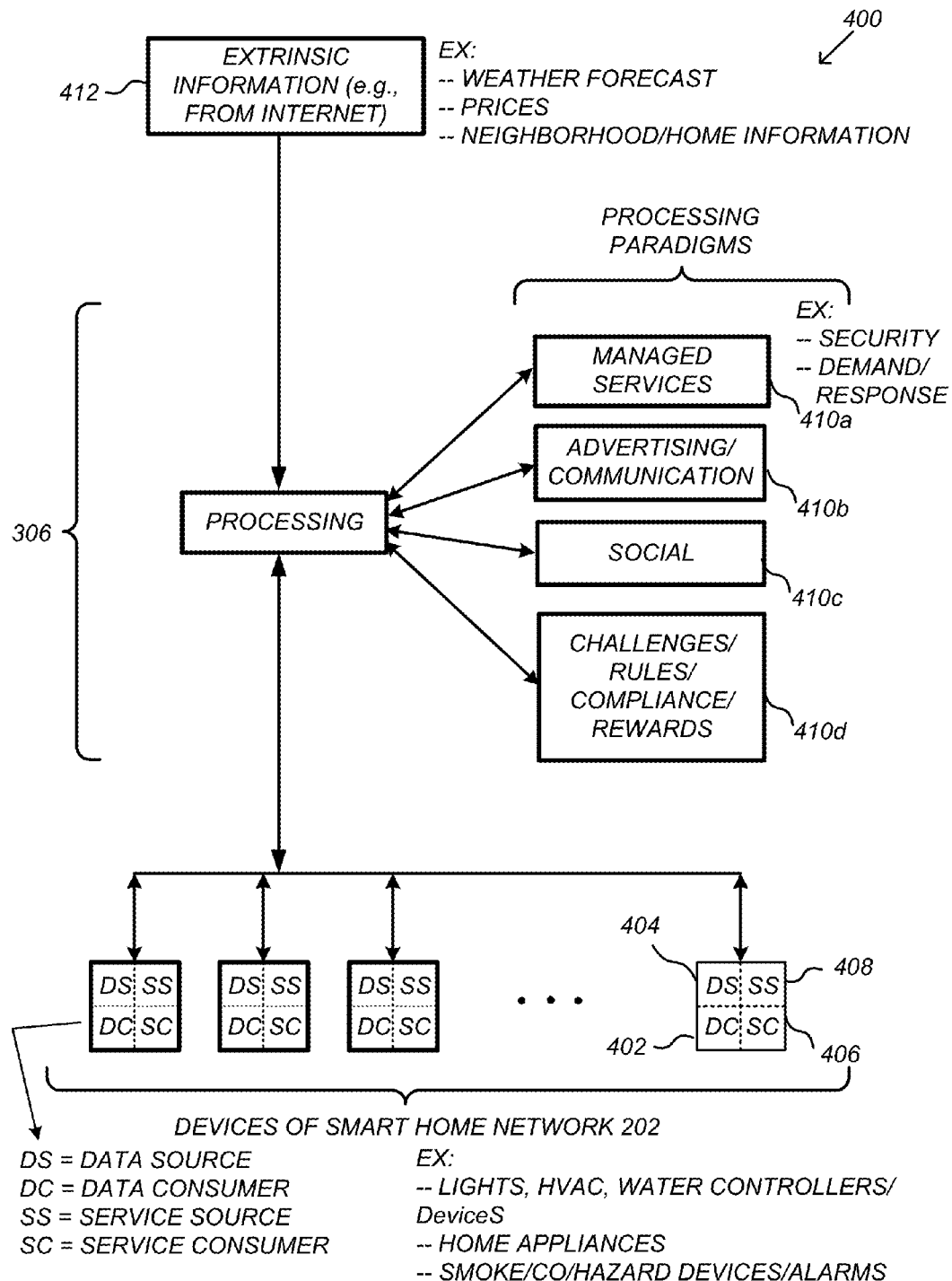
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
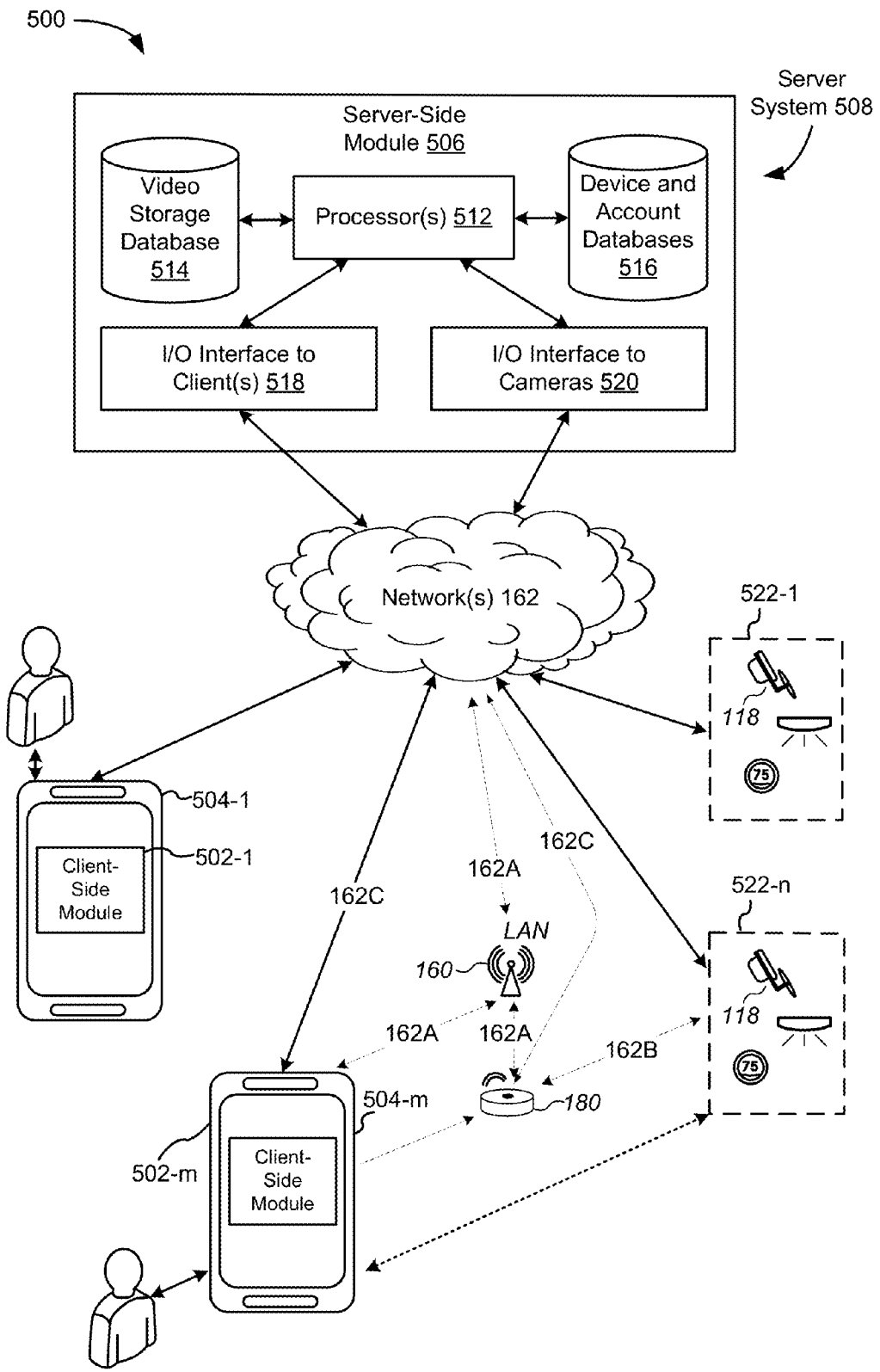
FIG. 5 is a representative operating environment in which a server system interacts with client devices and hub devices communicatively coupled to local smart devices, in accordance with some implementations.

FIG. 5 illustrates a representative operating environment 500 in which a server system 508 (also sometimes called a "hub device server system," "video server system," or "hub server system") provides data processing for monitoring and facilitating review of motion events in video streams captured by video cameras 118. As shown in FIG. 5, the server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the server system 508. In some implementations, the server system 508 is a dedicated video processing server that provides video processing services to video sources and client devices 504 independent of other services provided by the server system 508.

In some implementations, each of the video sources 522 includes one or more video cameras 118 that capture video and send the captured video to the server system 508 substantially in real-time. In some implementations, each of the video sources 522 optionally includes a controller device (not shown) that serves as an intermediary between the one or more cameras 118 and the server system 508. The controller device receives the video data from the one or more cameras 118, optionally, performs some preliminary processing on the video data, and sends the video data to the server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the server system 508.

As shown in FIG. 5, in accordance with some implementations, each of the client devices 504 includes a client-side module 502. The client-side module 502 communicates with a server-side module 506 executed on the server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 508 is implemented on one or more standalone data processing apparatuses or a distributed network of computers. In some implementations, the server system 508 also employs various virtual devices and/or services of third party service providers (e.g., third-party cloud service providers) to provide the underlying computing resources and/or infrastructure resources of the server system 508. In some implementations, the server system 508 includes, but is not limited to, a handheld computer, a tablet computer, a laptop computer, a desktop computer, or a combination of any two or more of these data processing devices, or other data processing devices.

The server-client environment 500 shown in FIG. 5 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the server system 508 can vary in different implementations. For example, in some implementations, client-side module 502 is a thin-client that provides only user-facing input and output processing functions, and delegates all other data processing functionalities to a backend server (e.g., the server system 508). Similarly, in some implementations, a respective one of the video sources 522 is a simple video capturing device that continuously captures and streams video data to the server system 508 without no or limited local preliminary processing on the video data. Although many aspects of the present technology are described from the perspective of the server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the server system 508, the client device 504, and the video sources 522 cooperatively.

It should be understood that operating environment 500 that involves the server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices, and the server system communicate with each other using the one or more communication networks 162. In an example smart home environment, two or more devices (e.g., the network interface device 160, the hub device 180, and the client devices 504-$m$) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-$n$ exchange data with the hub device 180. Alternatively, in some situations, some of the electronic devices of the video sources 522-$n$ communicate with the network interface device 160 directly via the same sub-network 162A that couples devices 160, 180 and 504-$m$. In some implementations (e.g., in the network 162C), both the client device 504-$m$ and the electronic devices of the video sources 522-$n$ communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-$n$. As explained above, the network interface device 160 and the hub device 180 optionally communicate with each other via a sub-network 162A.

Figure 6:
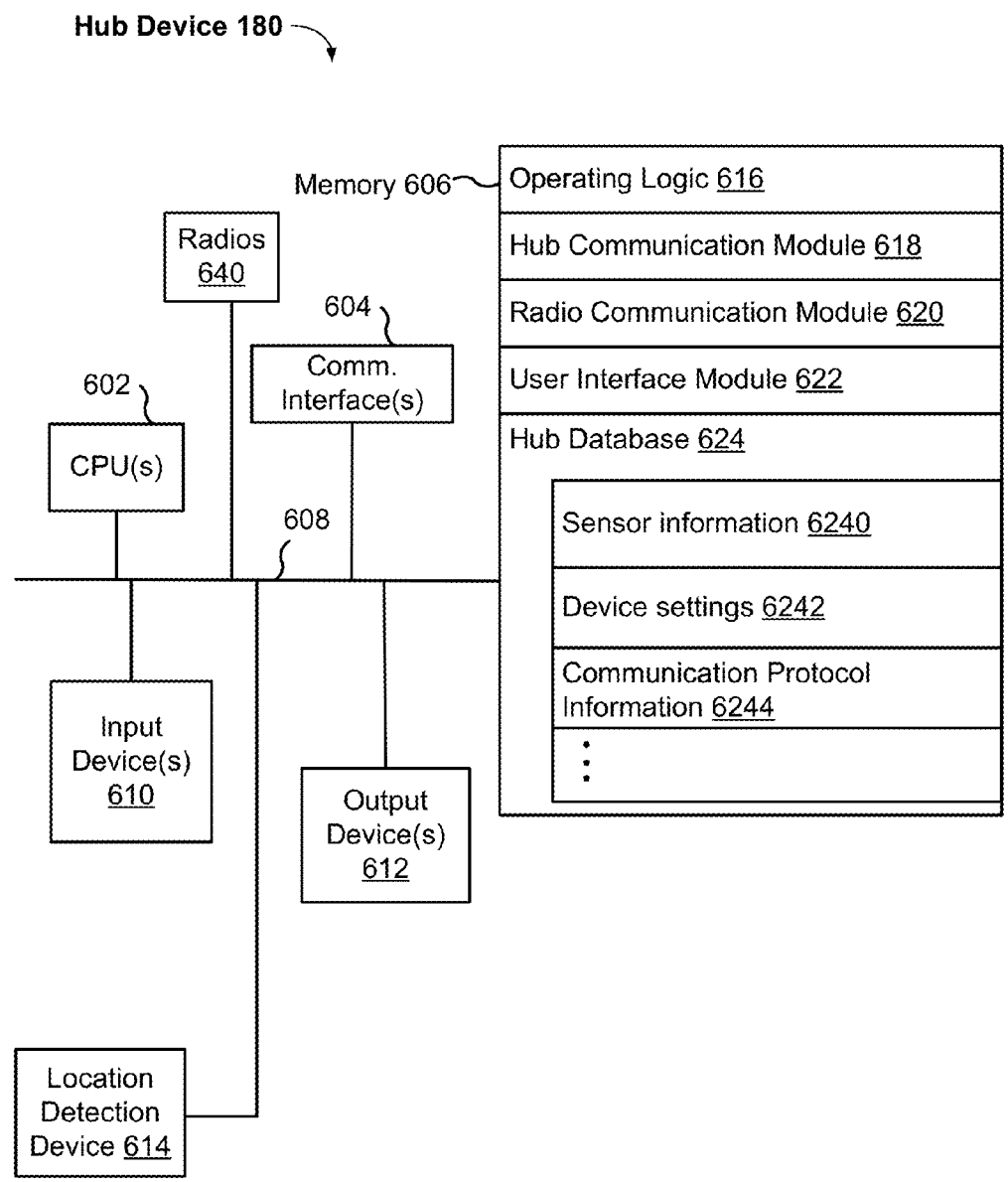
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 640 enable one or more radio communication networks in the smart home environments, and allow a hub device to communicate with smart devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating logic 616 including procedures for handling various basic system services and for performing hardware dependent tasks;
- Hub device communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);
- Radio Communication Module 620 for connecting the hub device 180 to other devices (e.g., controller devices, smart devices 204 in smart home environment 100, client devices 504) via one or more radio communication devices (e.g., radios 640);
- User interface module 622 for providing and displaying a user interface in which settings, captured data, and/or other data for one or more devices (e.g., smart devices 204 in smart home environment 100) can be configured and/or viewed; and
- Hub device database 624, including but not limited to:
  - Sensor information 6240 for storing and managing data received, detected, and/or transmitted by one or more sensors of the hub device 180 and/or one or more other devices (e.g., smart devices 204 in smart home environment 100);
  - Device settings 6242 for storing operational settings for one or more devices (e.g., coupled smart devices 204 in smart home environment 100); and
  - Communication protocol information 6244 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, memory 606, optionally, stores a subset of the modules and data structures identified above. Furthermore, memory 606, optionally, stores additional modules and data structures not described above.

FIG. 7A is a block diagram illustrating the server system 508 in accordance with some implementations. The server system 508 typically includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

- Operating system 710 including procedures for handling various basic system services and for performing hardware dependent tasks;
- Network communication module 712 for connecting the server system 508 to other systems and devices (e.g., client devices, electronic devices, and systems connected to one or more networks 162, FIGS. 1-5) via one or more network interfaces 704 (wired or wireless);
- Server-side module 714, which provides server-side functionalities for device control, data processing, and data review, including, but not limited to:
  - Data receiving module 7140 for receiving data from electronic devices (e.g., video data from a camera 118, FIG. 1) via the hub device 180, and preparing the received data for further processing and storage in the data storage database 7160;
  - Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;
  - Data processing module 7144 for processing the data provided by the electronic devices, and/or preparing and sending processed data to a device for review (e.g., client devices 504 for review by a user), including, but not limited to:
    - Event processor sub-module 7146 for processing event candidates and/or events within a received video stream (e.g., a video stream from cameras 188);
    - Event categorizer sub-module 7148 for categorizing event candidates and/or events within the received video stream;
    - User interface sub-module 7150 for communicating with a user (e.g., sending notifications and receiving user edits and zone definitions and the like), including, but not limited to:
      - Alert sub-module 7151 generating and sending alerts to a user or client device; and
    - Object detection sub-module 7152 for identifying objects and/or entities within an image and/or a video feed, including, but not limited to:
      - Regioning sub-module 7154 for selecting and/or analyzing regions around potential instance(s) of objects and/or entities; and
- Server database 716, including but not limited to:
  - Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;

Account database 7162 for storing account information for user accounts, including user account information such as user profiles 7163, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;

Device information database 7164 for storing device information related to one or more devices such as device profiles 7165, e.g., device identifiers and hub device specific secrets, independently of whether the corresponding hub devices have been associated with any user account; and Event information database 7166 for storing event information such as event records 7168, event categories 7170, confidence criteria 7171, and alert criteria 7172, e.g., event log information, event categories, confidence levels, and the like.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, memory 706, optionally, stores a subset of the modules and data structures identified above. Furthermore, memory 706, optionally, stores additional modules and data structures not described above.

Figure 7B:
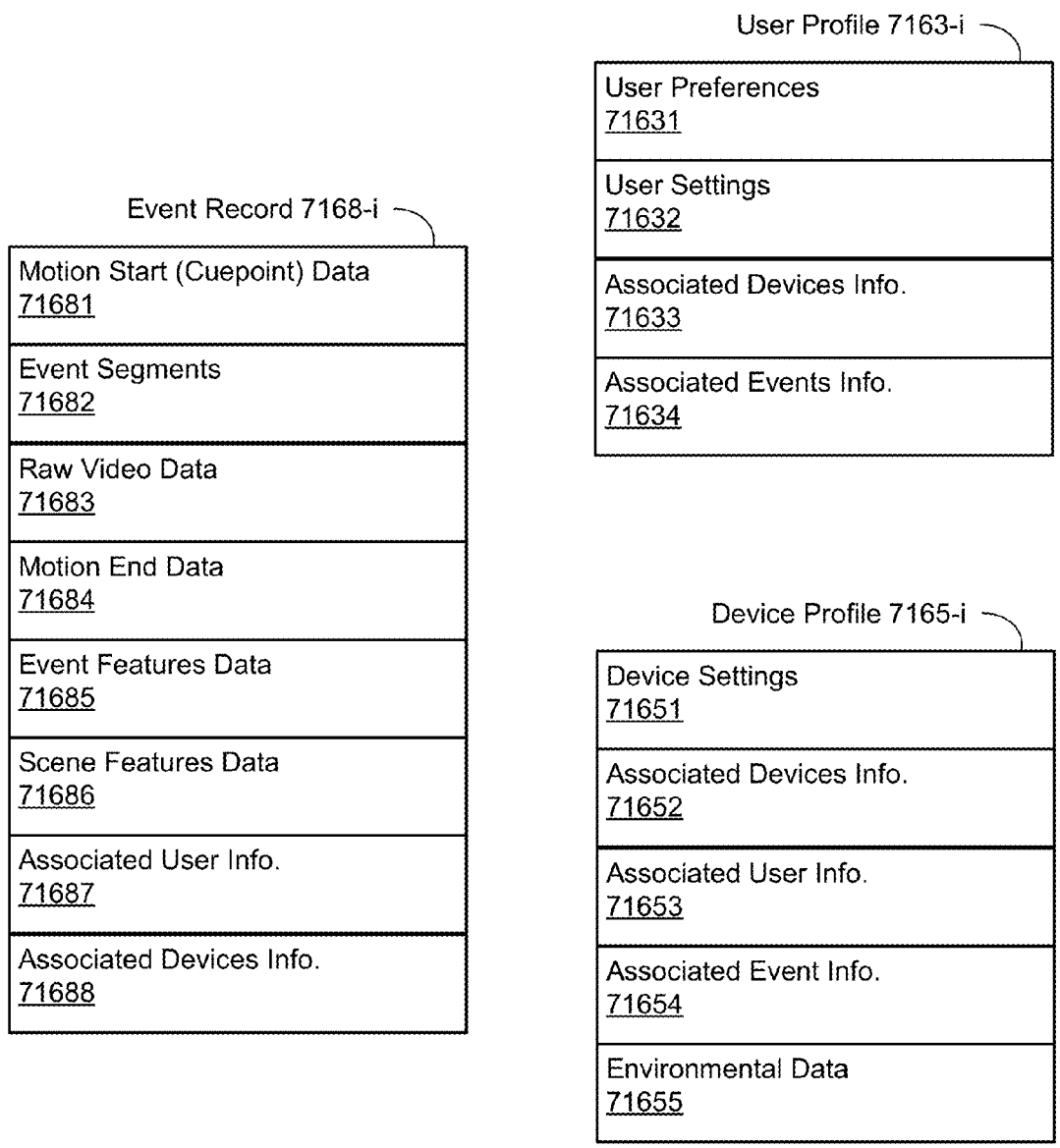

FIG. 7B illustrates various data structures used by some implementations, including an event record 7168-*i*, a user profile 7163-*i*, and a device profile 7165-*i*. The event record 7168-*i* corresponds to a motion event i and data for the motion event i. In some instances, the data for motion event i includes motion start (also sometimes called cuepoint) data 71681, event segments data 71682, raw video data 71683, motion end data 71684, event features data 71685, scene features data 71686, associated user information 71687, and associated devices information 71688. In some instances, the event record 7168-*i* includes only a subset of the above data. In some instances, the event record 7168-*i* includes additional event data not shown such as data regarding event/motion masks.

Motion start data 71681 includes date and time information such as a timestamp and optionally includes additional information such as information regarding the amount of motion present and/or the motion start location. Similarly, motion end data 71684 includes date and time information such as a timestamp and optionally includes additional information such as information regarding the amount of motion present and/or the motion end location.

Event segments 71682 includes information regarding segmentation of motion event i. In some instances, event segments are stored separately from the raw video data 71683. In some instances, the event segments are stored at a lower display resolution than the raw video data. For example, the event segments are optionally stored at 480p or 780p and the raw video data is stored at 1080 i or 1080p. Storing the event segments at a lower display resolution enables the system to devote less time and resources to retrieving and processing the event segments. In some instances, the event segments are not stored separately and the segmentation information includes references to the raw video data 71683 as well as date and time information for reproducing the event segments.

Event features data 71685 includes information regarding event features such as event categorizations/classifications, object masks, motion masks, identified/recognized/tracked motion objects (also sometimes called blobs), information regarding features of the motion objects (e.g., object color, object dimensions, velocity, size changes, etc.), information regarding activity in zones of interest, and the like. Scene features data 71686 includes information regarding the scene in which the event took place such as depth map information, information regarding the location of windows, televisions, fans, the ceiling/floor, etc., information regarding whether the scene is indoors or outdoors, information regarding zones of interest, and the like.

Associated user information 71687 includes information regarding users associated with the event such as users identified in the event, users receiving notification of the event, and the like. In some instances, the associated user information 71687 includes a link, pointer, or reference to a user profile 7163 for to the user. Associated devices information 71688 includes information regarding the device or devices involved in the event (e.g., a camera 118 that recorded the event). In some instances, the associated devices information 71688 includes a link, pointer, or reference to a device profile 7165 for the device.

The user profile 7163-*i* corresponds to a user i associated with the smart home network (e.g., smart home network 202) such as a user of a hub device 204, a user identified by a hub device 204, a user who receives notifications from a hub device 204 or from the server system 508, and the like. In some instances, the user profile 7163-*i* includes user preferences 71631, user settings 71632, associated devices information 71633, and associated events information 71634. In some instances, the user profile 7163-*i* includes only a subset of the above data. In some instances, the user profile 7163-*i* includes additional user information not shown such as information regarding other users associated with the user i.

The user preferences 71631 include explicit user preferences input by the user as well as implicit and/or inferred user preferences determined by the system (e.g., server system 508 and/or client device 504). In some instances, the inferred user preferences are based on historical user activity and/or historical activity of other users. The user settings 71632 include information regarding settings set by the user i such as notification settings, device settings, and the like. In some instances, the user settings 71632 include device settings for devices associated with the user i.

Associated devices information 71633 includes information regarding devices associated with the user i such as devices within the user's smart home environment 100 and/or client devices 504. In some instances, associated devices information 71633 includes a link, pointer, or reference to a corresponding device profile 7165. Associated events information 71634 includes information regarding events associated with user i such as events in which user i was identified, events for which user i was notified, events corresponding to user i's smart home environment 100, and the like. In some instances, the associated events information 71634 includes a link, pointer, or reference to a corresponding event record 7168.

The device profile 7165-$i$ corresponds to a device i associated with a smart home network (e.g., smart home network 202) such a hub device 204, a camera 118, a client device 504, and the like. In some instances, the device profile 7165-$i$ includes device settings 71651, associated devices information 71652, associated user information 71653, associated event information 71654, and environmental data 71655. In some instances, the device profile 7165-$i$ includes only a subset of the above data. In some instances, the device profile 7165-$i$ includes additional device information not shown such as information regarding whether the device is currently active.

Device settings 71651 include information regarding the current settings of device i such as positioning information, mode of operation information, and the like. In some instances, the device settings 71651 are user-specific and are set by respective users of the device i. Associated devices information 71652 includes information regarding other devices associated with device i such as other devices linked to device i and/or other devices in the same smart home network as device i. In some instances, associated devices information 71652 includes a link, pointer, or reference to a respective device profile 7165 corresponding to the associated device.

Associated user information 71653 includes information regarding users associated with the device such as users receiving notifications from the device, users registered with the device, users associated with the smart home network of the device, and the like. In some instances, associated user information 71653 includes a link, pointer, or reference to a user profile 7163 corresponding to the associated user.

Associated event information 71654 includes information regarding events associated with the device i such as historical events involving the device i. In some instances, associated event information 71654 includes a link, pointer, or reference to an event record 7168 corresponding to the associated event.

Environmental data 71655 includes information regarding the environment of device i such as information regarding whether the device is outdoors or indoors, information regarding the light level of the environment, information regarding the amount of activity expected in the environment (e.g., information regarding whether the device is in a private residence versus a busy commercial property), information regarding environmental objects (e.g., depth mapping information for a camera), and the like.

FIG. 7C illustrates various data structures used by some implementations, including event categories 7170 and confidence criteria 7171. Event categories 7170 include a plurality of categories, such as an unknown person(s) event category 71702, a known person(s) event category 71704, a zone event category 71706, an animal event category 71708, a vehicle event category 71710, an audio event category 71712, and an alert event category 71714. In some implementations, the event categories 7170 are predetermined or preset. In some implementations, the event categories 7170 are generated based on event clustering, such as described below with respect to FIG. 11D. In some implementations, the event categories 7170 are arranged into an event category hierarchy (e.g., with the most important or most urgent categories at the top). For example, the event categories 7170 are optionally arranged into an event category hierarchy such that unknown person(s) event 71702 is at the top of the hierarchy and alert event 71714 is at the bottom of the hierarchy.

In some implementations, the unknown person(s) event category 71702 is assigned to events involving an unknown or unidentified person. In some implementations, the known person(s) event category 71704 is assigned to events involving a known (e.g., identified) person. In some implementations, the zone event category 71706 is assigned to events involving a zone of interest (e.g., a zone of interest defined by a user). In some implementations, the animal event category 71708 is assigned to events involving an animal, such as a pet or livestock. In some implementations, the animal event category 71708 is divided into two categories, one for known animals and one for unknown animals. In some implementations, the vehicle event category 71710 is assigned to events involving a vehicle, such as a car, truck, boat, or airplane. In some implementations, the vehicle event category 71710 is divided into two categories, one for recognized vehicles and one for unrecognized vehicles. In some implementations, the audio event category 71712 is assigned to events involving audio (e.g., audio captured by a smart device in the smart home environment 100). In some implementations, the audio event category 71712 is divided into multiple categories based on various characteristics of the audio event. For example, a category for human voices and a category for music.

In some implementations, event categories 7170 include additional event categories not shown in FIG. 7C. In some implementations, event categories 7170 include event categories that are a combination of the event categories shown in FIG. 7C. For example, an event involving an unknown person in a zone of interest is optionally assigned to an event category for unknown person(s) and zone(s) of interest. In some implementations, an event involving multiple categories is assigned to the event category with the highest position in the event category hierarchy.

In some implementations, the confidence criteria 7171 include a plurality of thresholds, such as 50% threshold 71716, 70% threshold 71714, and 95% threshold 71712. In some implementations, each threshold is associated with a particular type of alert. In some implementations, each threshold is associated with a particular descriptive phrase for use in an alert. In some implementations, the system determines whether a confidence score exceeds a particular threshold, such as threshold 71716. In some implementations, the system determines whether the confidence score meets or exceeds the particular threshold.

As an example of linking particular alerts to particular confidence levels, a 'general' alert is associated with a confidence score for person detection below the confidence threshold 71716. In this example, the 'general' alert states "Activity detected." Further, a 'possible' alert is associated with a confidence score for person detection above confidence threshold 71716, but below confidence threshold 71714. In this example, the 'possible' alert states "Activity, possibly involving a person, detected." Further, a 'likely' alert is associated with a confidence score for person detection above confidence threshold 71714, but below confidence threshold 71712. In this example, the 'likely' alert states "Activity, likely involving a person, detected." Further, a 'person' alert is associated with a confidence score for person detection above confidence threshold 71712. In this example, the 'person' alert states "Activity involving a person detected."

Figure 8:
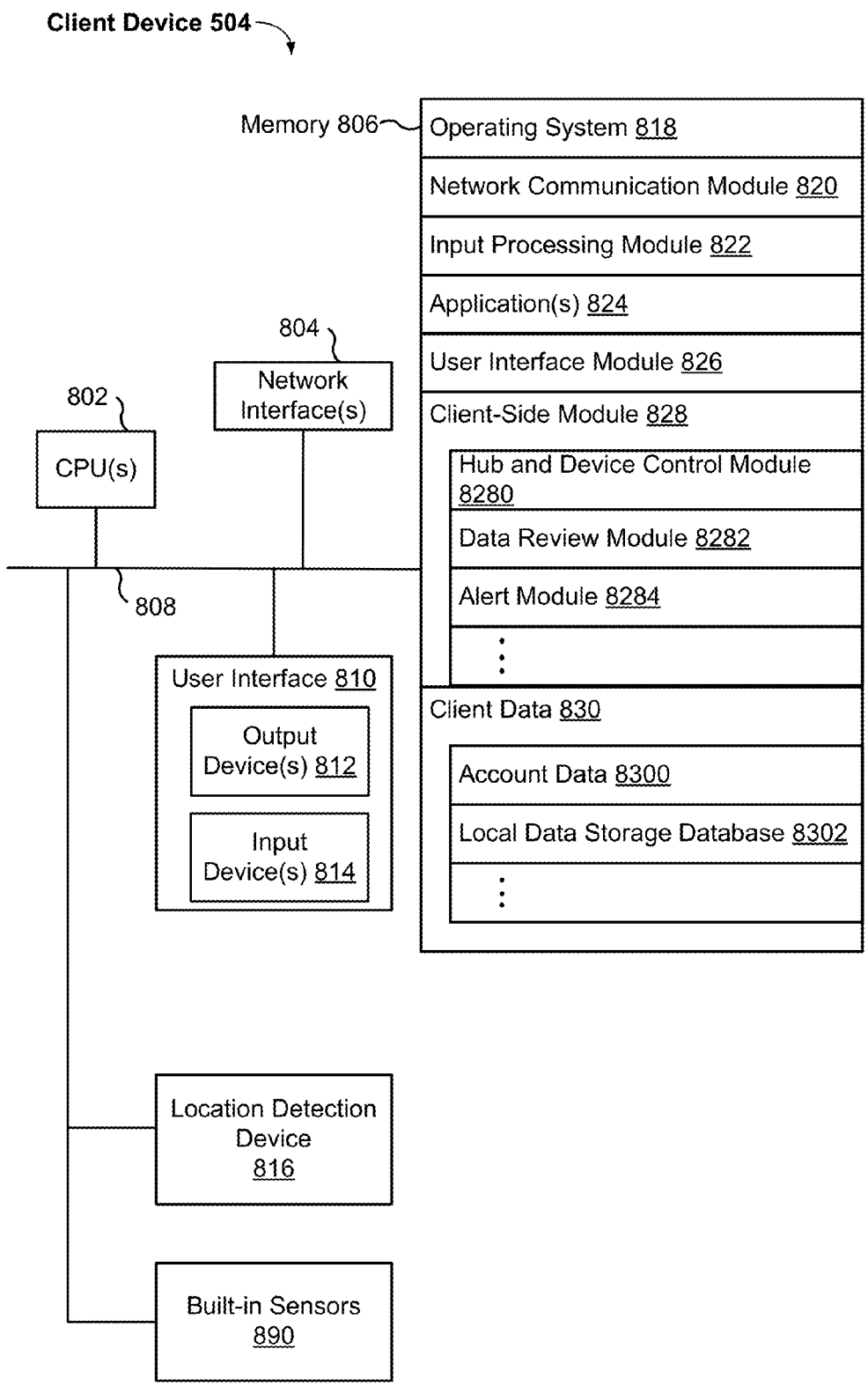
FIG. 8 is a block diagram illustrating a representative client device, in accordance with some implementations.

FIG. 8 is a block diagram illustrating a representative client device 504 associated with a user account in accordance with some implementations. The client device 504, typically, includes one or more processing units (CPUs) 802, one or more network interfaces 804, memory 806, and one or more communication buses 808 for interconnecting these components (sometimes called a chipset). Optionally, the client device also includes a user interface 810 and one or more built-in sensors 890 (e.g., accelerometer and gyroscope). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 816, such as a GPS (global positioning satellite) or other geo-location receiver, for determining the location of the client device.

Memory 806 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

Operating system 818 including procedures for handling various basic system services and for performing hardware dependent tasks;

Network communication module 820 for connecting the client device 504 to other systems and devices (e.g., client devices, electronic devices, and systems connected to one or more networks 162, FIGS. 1-5) via one or more network interfaces 804 (wired or wireless);

Input processing module 822 for detecting one or more user inputs or interactions from one of the one or more input devices 814 and interpreting the detected input or interaction;

One or more applications 824 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);

User interface module 826 for providing and displaying a user interface in which settings, captured data, and/or other data for one or more devices (e.g., smart devices 204 in smart home environment 100) can be configured and/or viewed;

Client-side module 828, which provides client-side functionalities for device control, data processing and data review, including but not limited to:
Hub device and device control module 8280 for generating control commands for modifying an operating mode of the hub device or the electronic devices in accordance with user inputs; and
Data review module 8282 for providing user interfaces for reviewing data processed by the server system 508;
Alert module 8284 for generating and/or presenting alerts for events occurring within the smart home environment, such as motion events, audio events, and alarm events; and Client data 830 storing data associated with the user account and electronic devices, including, but is not limited to:
Account data 8300 storing information related to both user accounts loaded on the client device and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and
Local data storage database 8302 for selectively storing raw or processed data associated with electronic devices (e.g., of the video sources 522, such as a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various implementations. In some implementations, memory 806, optionally, stores a subset of the modules and data structures identified above. Furthermore, memory 806, optionally, stores additional modules and data structures not described above.

Figure 9:
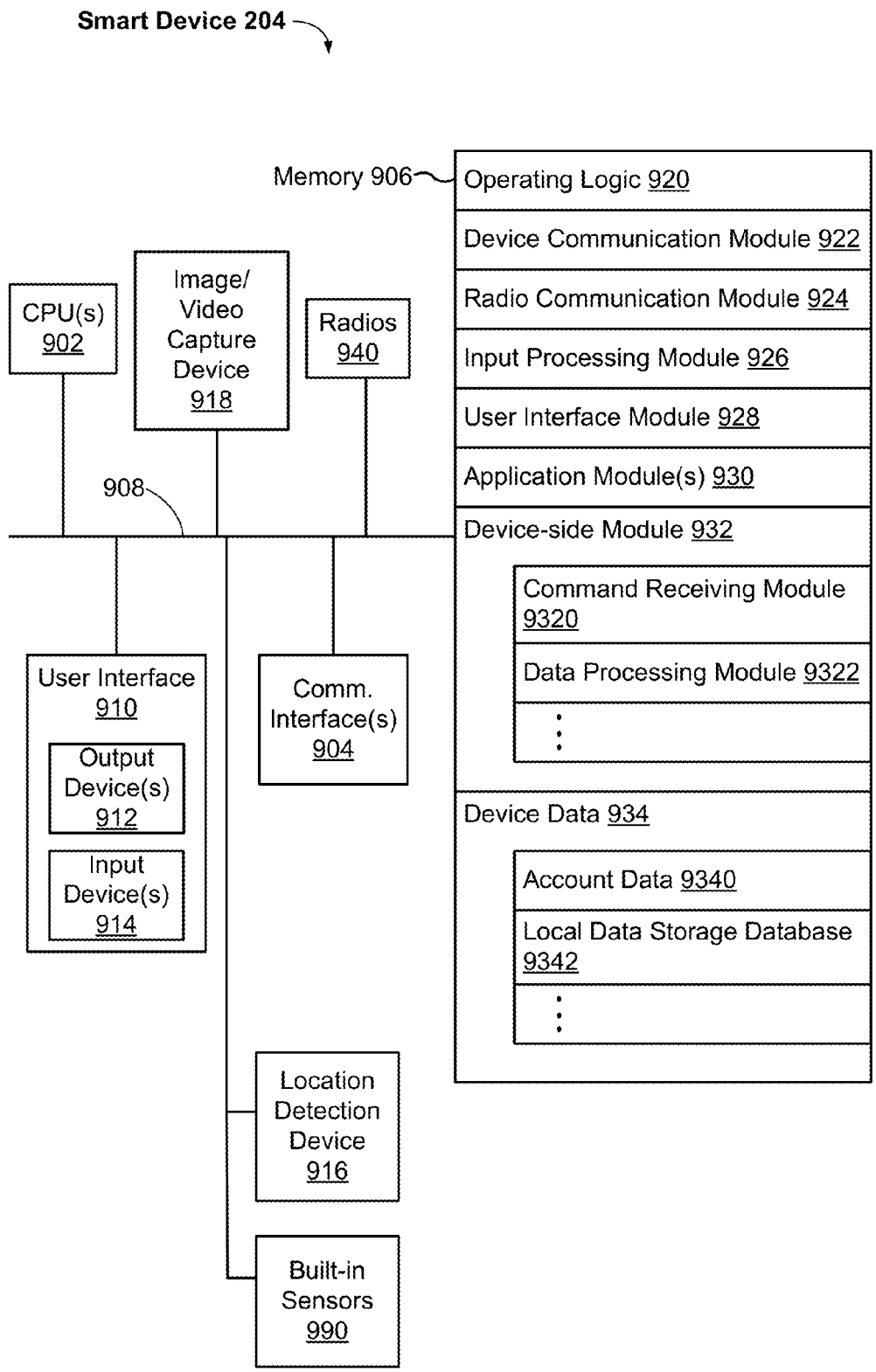
FIG. 9 is a block diagram illustrating a representative smart device, in accordance with some implementations.

FIG. 9 is a block diagram illustrating a representative smart device 204 in accordance with some implementations. In some implementations, the smart device 204 (e.g., any devices of a smart home environment 100, FIGS. 1 and 2) includes one or more processing units (e.g., CPUs, ASICs, FPGAs, microprocessors, and the like) 902, one or more communication interfaces 904, memory 906, radios 940, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 940 enable one or more radio communication networks in the smart home environments, and allow a smart device 204 to communicate with other devices. In some implementations, the radios 940 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 904 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

- Operating logic 920 including procedures for handling various basic system services and for performing hardware dependent tasks;
- Device communication module 922 for connecting to and communicating with other network devices (e.g., network interface 160, such as a router that provides Internet connectivity, networked storage devices, network routing devices, server system 508, etc.) connected to one or more networks 162 via one or more communication interfaces 904 (wired or wireless);
- Radio Communication Module 924 for connecting the smart device 204 to other devices (e.g., controller devices, smart devices 204 in smart home environment 100, client devices 504) via one or more radio communication devices (e.g., radios 940)
- Input processing module 926 for detecting one or more user inputs or interactions from the one or more input devices 914 and interpreting the detected inputs or interactions;
- User interface module 928 for providing and displaying a user interface in which settings, captured data, and/or other data for one or more devices (e.g., the smart device 204, and/or other devices in smart home environment 100) can be configured and/or viewed;
- One or more applications 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);
- Device-side module 932, which provides device-side functionalities for device control, data processing and data review, including but not limited to:
  - Command receiving module 9320 for receiving, forwarding, and/or executing instructions and control commands (e.g., from a client device 504, from a smart home provider server system 164, from user inputs detected on the user interface 910, etc.) for operating the smart device 204;
  - Data processing module 9322 for processing data captured or received by one or more inputs (e.g., input devices 914, image/video capture devices 918, location detection device 916), sensors (e.g., built-in sensors 990), interfaces (e.g., communication interfaces 904, radios 940), and/or other components of the smart device 204, and for preparing and sending processed data to a device for review (e.g., client devices 504 for review by a user); and
- Device data 934 storing data associated with devices (e.g., the smart device 204), including, but is not limited to:
  - Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and
  - Local data storage database 9342 for selectively storing raw or processed data associated with the smart device 204 (e.g., video surveillance footage captured by a camera 118).

In some implementations, a smart device 204, such as a camera 118, performs some or all of the data processing described above with respect to data processing module 7144 of server system 508 (FIG. 7A). In some implementations, data processing module 9322 performs some or all of the data processing described above with respect to data processing module 7144 of server system 508. In some implementations, device data 934 includes data described above with respect to server database 716, such as event categories 7170, confidence criteria 7171, and alert criteria 7172.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, memory 906, optionally, stores a subset of the modules and data structures identified above. Furthermore, memory 906, optionally, stores additional modules and data structures not described above.

Figure 10:
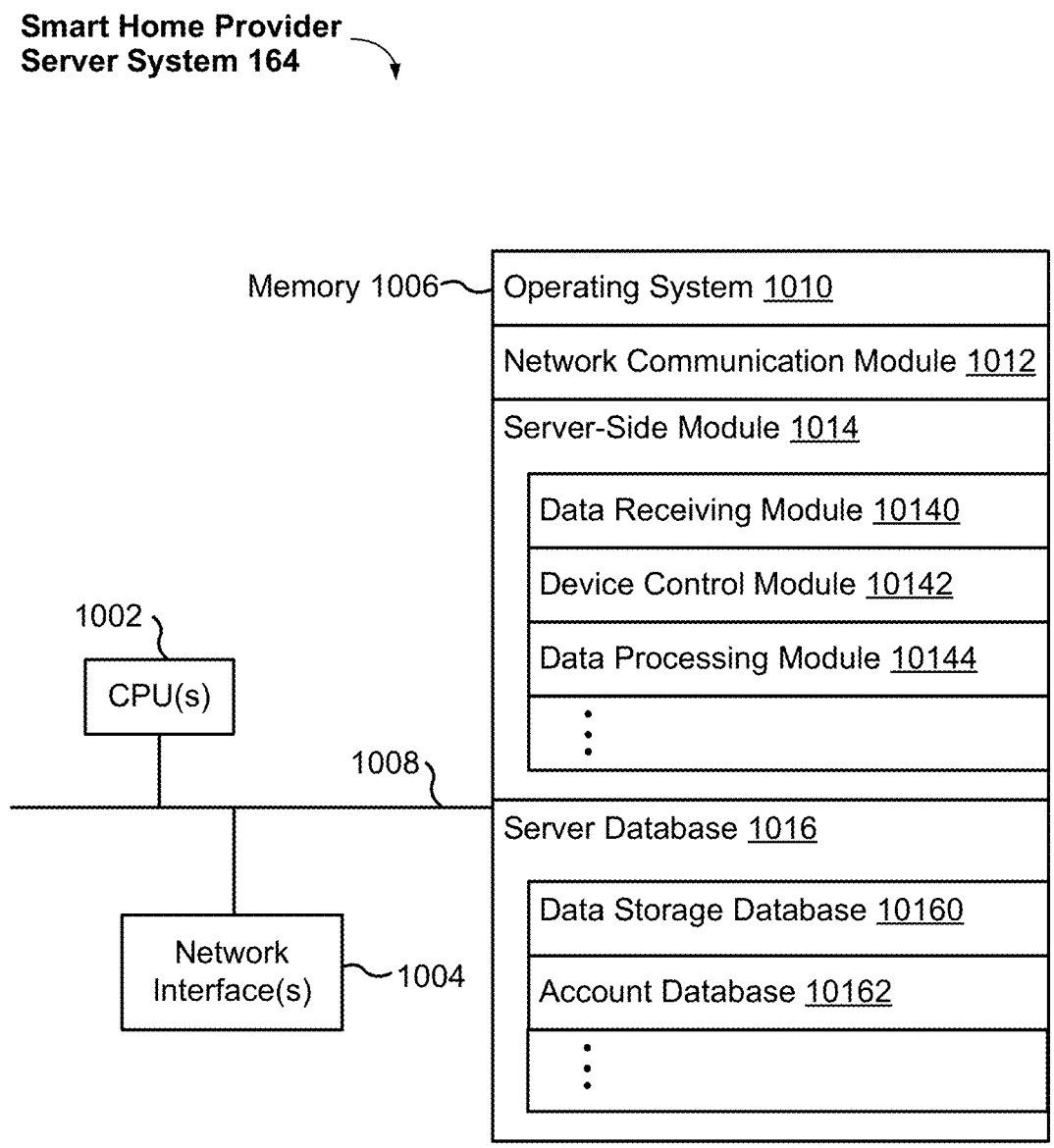
FIG. 10 is a block diagram illustrating a representative smart home provider server system, in accordance with some implementations.

FIG. 10 is a block diagram illustrating the smart home provider server system 164 in accordance with some implementations. In some implementations, the smart home provider server system is part of the server system 508. In some implementations, the smart home provider server system comprises server system 508. The smart home provider server system 164, typically, includes one or more processing units (CPUs) 1002, one or more network interfaces 1004 (e.g., including an I/O interface to one or more client devices and an I/O interface to one or more electronic devices), memory 1006, and one or more communication buses 1008 for interconnecting these components (sometimes called a chipset). Memory 1006 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

Operating system 1010 including procedures for handling various basic system services and for performing hardware dependent tasks;

Network communication module 1012 for connecting the smart home provider server system 164 to other systems and devices (e.g., client devices, electronic devices, and systems connected to one or more networks 162, FIGS. 1-5) via one or more network interfaces 1004 (wired or wireless);

Server-side module 1014, which provides server-side functionalities for device control, data processing and data review, including but not limited to:

Data receiving module 10140 for receiving data from electronic devices (e.g., video data from a camera 118, FIG. 1), and preparing the received data for further processing and storage in the data storage database 10160;

Device control module 10142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 10144 for processing the data provided by the electronic devices, and/or preparing and sending processed data to a device for review (e.g., client devices 504 for review by a user); and Server database 1016, including but not limited to:

Data storage database 10160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the electronic devices are stored securely; and Account database 10162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, memory 1006, optionally, stores a subset of the modules and data structures identified above. Furthermore, memory 1006, optionally, stores additional modules and data structures not described above.

Furthermore, in some implementations, the functions of any of the devices and systems described herein (e.g., hub device 180, server system 508, client device 504, smart device 204, smart home provider server system 164) are interchangeable with one another and may be performed by any of the other devices or systems, where the corresponding sub-modules of these functions may additionally and/or alternatively be located within and executed by any of the devices and systems. As one example, a hub device 180 may determine when a motion event candidate has started and generate corresponding motion start information, or the server system 508 may make the determination and generate the information instead. The devices and systems shown in and described with respect to FIGS. 6-10 are merely illustrative, and different configurations of the modules for implementing the functions described herein are possible in various implementations.

Figure 11A:
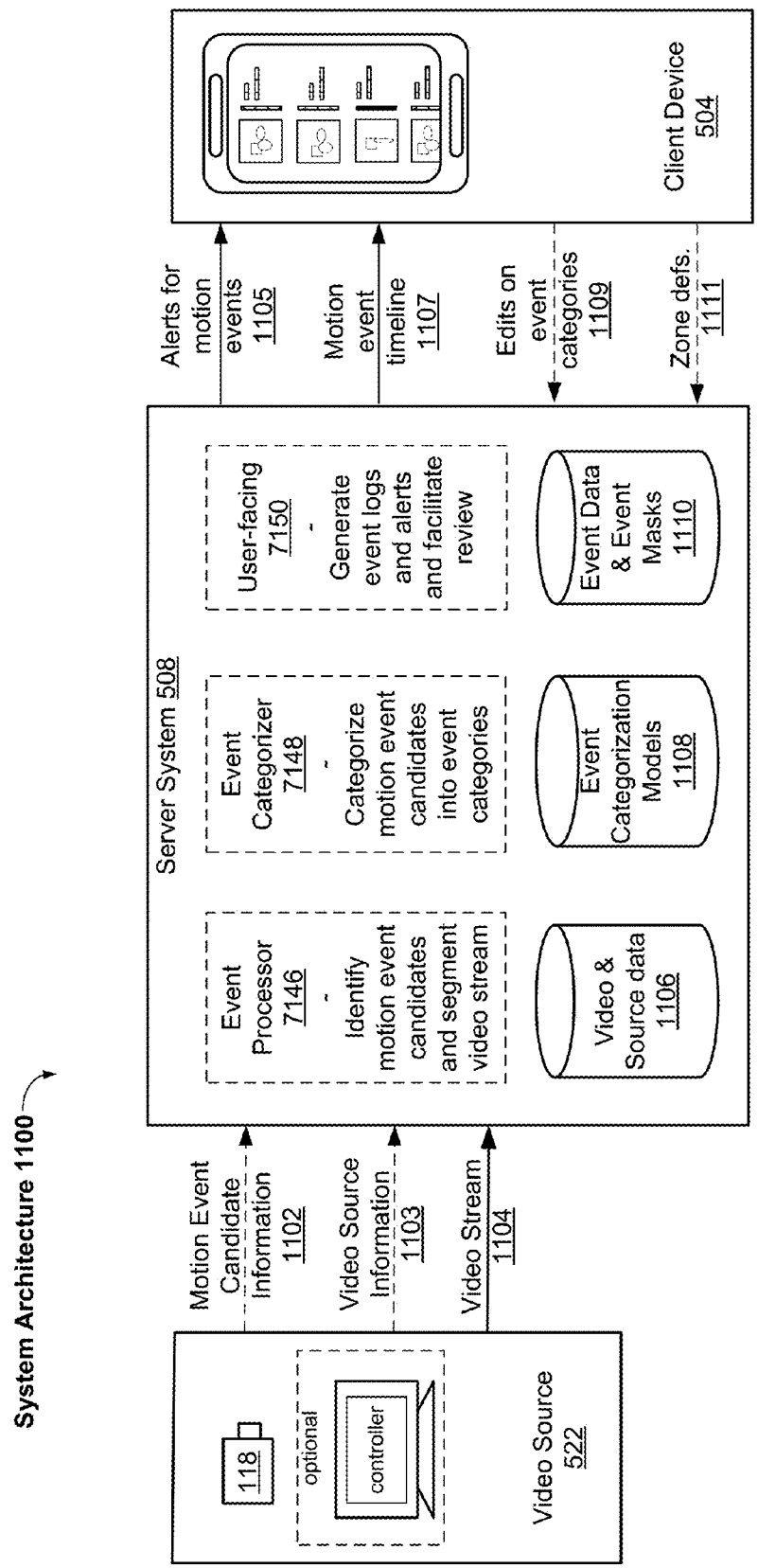
FIG. 11A illustrates a representative system architecture for video analysis and categorization, in accordance with some implementations.
Figure 11B:
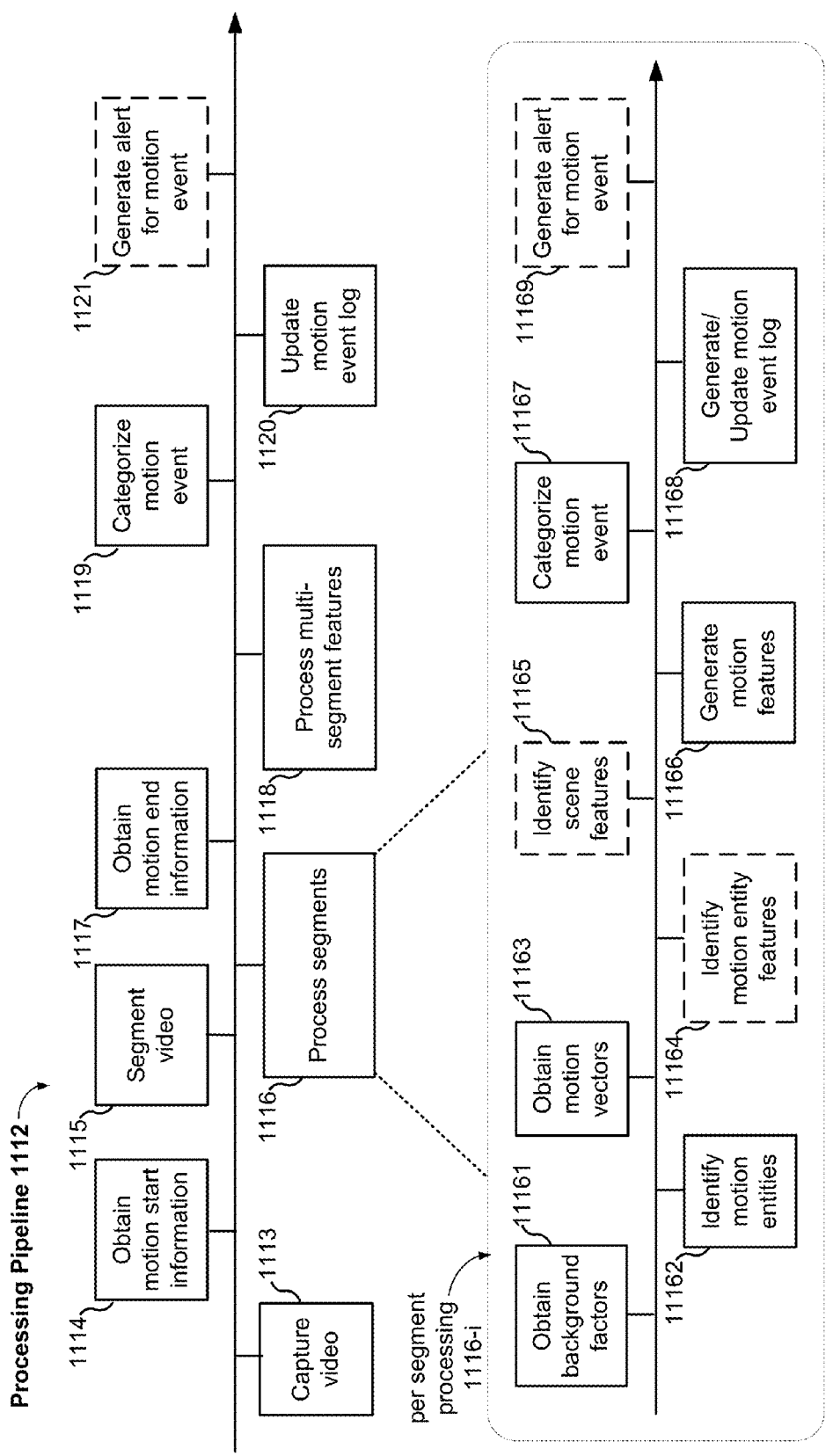
FIG. 11B illustrates a representative processing pipeline for video analysis and categorization, in accordance with some implementations.

FIG. 11A illustrates a representative system architecture 1100 and FIG. 11B illustrates a corresponding data processing pipeline 1112. In some implementations, the server system 508 includes functional modules for an event processor 7146, an event categorizer 7148, and a user-facing frontend 7150, as discussed above with respect to FIG. 7A. The event processor 7146 obtains the motion event candidates (e.g., by processing the video stream or by receiving the motion start information from the video source 522). The event categorizer 7148 categorizes the motion event candidates into different event categories. The user-facing frontend 7150 generates event alerts and facilitates review of the motion events by a reviewer through a review interface on a client device 504. The client facing frontend also receives user edits on the event categories, user preferences for alerts and event filters, and zone definitions for zones of interest. The event categorizer optionally revises event categorization models and results based on the user edits received by the user-facing frontend. The server system 508 also includes a video and source data database 1106, event categorization modules database 1108, and event data and event masks database 1110. In some implementations, each of these databases is part of the server database 716 (e.g., part of data storage database 7160).

The server system 508 receives the video stream 1104 from the video source 522 and optionally receives motion event candidate information 1102 such as motion start information and video source information 1103 such as device settings for camera 118 (e.g., a device profile 7165 for camera 118). In some implementations, the event processor sub-module 7146 communicates with the video source 522. In some implementations, the server system sends alerts for motion events 1105 and motion event timeline information 1107 to the client device 504. In some implementations, the client device 504 receives the alerts 1105 and presents them to a user of the client device. In some implementations, the server system sends alert information to the client device 504 and the client device generates the alert based on the alert information. The server system 508 optionally receives user information from the client device 504 such as edits on event categories 1109 and zone definitions 1111.

The data processing pipeline 1112 processes a live video feed received from a video source 522 (e.g., including a camera 118 and an optional controller device) in real-time to identify and categorize motion events in the live video feed, and sends real-time event alerts and a refreshed event timeline to a client device 504 associated with a reviewer account bound to the video source 522. The data processing pipeline 1112 also processes stored video feeds from a video source 522 to reevaluate and/or re-categorize motion events as necessary, such as when new information is obtained regarding the motion event and/or when new information is obtained regarding motion event categories (e.g., a new activity zone is obtained from the user).

After video data is captured at the video source 522 (1113), the video data is processed to determine if any potential motion event candidates are present in the video stream. A potential motion event candidate detected in the video data is also sometimes referred to as a cuepoint. Thus, the initial detection of a motion event candidate is referred to as motion start detection and/or cuepoint detection. Motion start detection (1114) triggers performance of a more thorough event identification process on a video segment (also sometimes called a "video slice" or "slice") corresponding to the motion event candidate. In some implementations, the video data is initially processed at the video source 522. Thus, in some implementations, the video source sends motion event candidate information, such as motion start information, to the server system 508. In some implementations, the video data is processed at the server system 508 for motion start detection. In some implementations, the video stream is stored on server system 508 (e.g., in video and source data database 1106). In some implementations, the video stream is stored on a server distinct from server system 508. In some implementations, after a cuepoint is detected, the relevant portion of the video stream is retrieved from storage (e.g., from video and source data database 1106).

In some implementations, the more thorough event identification process includes segmenting (1115) the video stream into multiple segments then categorizing the motion event candidate within each segment (1116). In some implementations, categorizing the motion event candidate includes an aggregation of background factors, motion entity detection identification, motion vector generation for each motion entity, motion entity features, and scene features to generate motion features (11166) for the motion event candidate. In some implementations, the event identification process further includes categorizing each segment (11167), generating or updating a motion event log (11168) based on categorization of a segment, generating an alert for the motion event (11169) based on categorization of a segment, categorizing the complete motion event (1119), updating the motion event log (1120) based on the complete motion event, and generating an alert for the motion event (1121) based on the complete motion event. In some implementations, a categorization is based on a determination that the motion event candidate is within a particular zone of interest. In some implementations, a categorization is based on a determination that the motion event candidate involves one or more particular zones of interest. In some implementations, the categorization is based on detection of one or more objects (e.g., a particular vehicle) and/or one or more entities (e.g., a family member or a family pet). In some implementations, the categorization is based on a confidence level for the detection of the one or more objects and/or the one or more entities. For example, a first category is utilized for a confidence level that meets or exceeds a particular threshold and a second category is utilized for a confidence level that does not meet or exceed the particular threshold.

The event analysis and categorization process may be performed by the video source 522 and the server system 508 cooperatively, and the division of the tasks may vary in different implementations, for different equipment capability configurations, and/or for different network and server load situations. After the server system 508 categorizes the motion event candidate, the result of the event detection and categorization may be sent to a reviewer associated with the video source 522.

In some implementations, the server system 508 also determines an event mask for each motion event candidate and caches the event mask for later use in event retrieval based on selected zone(s) of interest.

In some implementations, the server system 508 stores raw or compressed video data (e.g., in a video and source data database 1106), event categorization models (e.g., in an event categorization model database 1108), and event masks and other event metadata (e.g., in an event data and event mask database 1110) for each of the video sources 522. In some implementations, the video data is stored at one or more display resolutions such as 480p, 780p, 1080 i, 1080p, and the like.

The above is an overview of the system architecture 1100 and the data processing pipeline 1112 for event processing in video monitoring. More details of the processing pipeline and processing techniques are provided below.

As shown in FIG. 11A, the system architecture 1100 includes the video source 522. The video source 522 transmits a live video feed to the remote server system 508 via one or more networks (e.g., the network(s) 162). In some implementations, the transmission of the video data is continuous as the video data is captured by the camera 118. In some implementations, the transmission of video data is irrespective of the content of the video data, and the video data is uploaded from the video source 522 to the server system 508 for storage irrespective of whether any motion event has been captured in the video data. In some implementations, the video data may be stored at a local storage device of the video source 522 by default, and only video portions corresponding to motion event candidates detected in the video stream are uploaded to the server system 508 (e.g., in real-time).

In some implementations, the video source 522 dynamically determines at what display resolution the video stream is to be uploaded to the server system 508. In some implementations, the video source 522 dynamically determines which parts of the video stream are to be uploaded to the server system 508. For example, in some implementations, depending on the current server load and network conditions, the video source 522 optionally prioritizes the uploading of video portions corresponding to newly detected motion event candidates ahead of other portions of the video stream that do not contain any motion event candidates; or the video source 522 uploads the video portions corresponding to newly detected motion event candidates at higher display resolutions than the other portions of the video stream. This upload prioritization helps to ensure that important motion events are detected and alerted to the reviewer in real-time, even when the network conditions and server load are less than optimal. In some implementations, the video source 522 implements two parallel upload connections, one for uploading the continuous video stream captured by the camera 118, and the other for uploading video portions corresponding to detected motion event candidates. At any given time, the video source 522 determines whether the uploading of the continuous video stream needs to be suspended temporarily to ensure that sufficient bandwidth is given to the uploading of the video segments corresponding to newly detected motion event candidates.

In some implementations, the video stream uploaded for cloud storage is at a lower quality (e.g., lower resolution, lower frame rate, higher compression, etc.) than the video segments uploaded for motion event processing.

As shown in FIG. 11A, the video source 522 includes a camera 118, and an optional controller device. In some implementations, the camera 118 includes sufficient on-board processing power to perform all necessary local video processing tasks (e.g., cuepoint detection for motion event candidates, video uploading prioritization, network connection management, etc.), and the camera 118 communicates with the server system 508 directly, without any controller device acting as an intermediary. In some implementations, the camera 118 captures the video data and sends the video data to the controller device for the necessary local video processing tasks. The controller device optionally performs the local processing tasks for multiple cameras. For example, there may be multiple cameras in one smart home environment (e.g., the smart home environment 100, FIG. 1), and a single controller device receives the video data from each camera and processes the video data to detect motion event candidates in the video stream from each camera. The controller device is responsible for allocating sufficient outgoing network bandwidth to transmitting video segments containing motion event candidates from each camera to the server before using the remaining bandwidth to transmit the video stream from each camera to the server system 508. In some implementations, the continuous video stream is sent and stored at one server facility while the video segments containing motion event candidates are send to and processed at a different server facility.

As shown in FIG. 11A, after video data is captured by the camera 118, the video data is optionally processed locally at the video source 522 in real-time to determine whether there are any cuepoints in the video data that warrant performance of a more thorough event identification process. Thus, in some implementations, the video source 522 sends motion event candidate information, such as cuepoint detections, to the server system 508. In some implementations, the video source 522 sends additional metadata, such as the amount of motion between frames, to the server system 508.

Cuepoint detection is a first layer motion event identification which is intended to be slightly over-inclusive, such that real motion events are a subset of all identified cuepoints. In some implementations, cuepoint detection is based on the number of motion pixels in each frame of the video stream. In some implementations, any method of identifying motion pixels in a frame may be used. For example, a Gaussian mixture model is optionally used to determine the number of motion pixels in each frame of the video stream. In some implementations, when the total number of motion pixels in a current image frame exceeds a predetermined threshold, a cuepoint is detected. In some implementations, a running sum of total motion pixel count is calculated for a predetermined number of consecutive frames as each new frame is processed, and a cuepoint is detected when the running sum exceeds a predetermined threshold. In some implementations, a profile of total motion pixel count over time is obtained. In some implementations, a cuepoint is detected when the profile of total motion pixel count for a current frame sequence of a predetermined length (e.g., 30 seconds) meets a predetermined trigger criterion (e.g., total pixel count under the profile > a threshold motion pixel count). In some implementations, the cuepoint detection calculations are based on where in the scene the motion occurs. For example, a lower threshold is required for motion occurring in or near a preset zone of interest. In some implementations, a higher threshold is required for motion occurring in or near a preset zone that has been denoted as likely containing less significant motion events (e.g., a zone of interest where notifications are disabled). In some implementations, cuepoints are suppressed for motion occurring within a zone of interest where notifications are disabled.

In some implementations, cuepoint detection is based on one or more additional inputs such as audio inputs to an associated microphone. For example, a cuepoint may be based at least in-part on the sound of breaking glass and/or a human voice.

In some implementations, the beginning of a cuepoint is the time when the total motion pixel count meets a predetermined threshold (e.g., 50 motion pixels). In some implementations, the start of the motion event candidate corresponding to a cuepoint is the beginning of the cuepoint. In some implementations, the start of the motion event candidate is a predetermined lead time (e.g., 5 seconds) before the beginning of the cuepoint. In some implementations, the start of a motion event candidate is used to process a video portion corresponding to the motion event candidate for a more thorough event identification process.

In some implementations, the thresholds for detecting cuepoints are adjusted over time based on performance feedback. For example, if too many false positives are detected, the threshold for motion pixel count is optionally increased. If too many motion events are missed, the threshold for motion pixel count is optionally decreased. In some implementations, the thresholds for detecting cuepoints are based on where in the scene the motion is detected. In some implementations, the thresholds are based on whether the motion is detected within a particular zone of interest. In some implementations, the threshold are set and/or adjusted by users (e.g., a user of client device 504, FIG. 5). For example, a threshold is adjusted by adjusting a corresponding motion sensitivity slider within a user interface.

In some implementations, before the profile of the total motion pixel count for a frame sequence is evaluated for cuepoint detection, the profile is smoothed to remove short dips in total motion pixel count. In general, once motion has started, momentary stops or slowing downs may occur during the motion, and such momentary stops or slowing downs are reflected as short dips in the profile of total motion pixel count. Removing these short dips from the profile helps to provide a more accurate measure of the extent of motion for cuepoint detection. Since cuepoint detection is intended to be slightly over-inclusive, by smoothing out the motion pixel profile, cuepoints for motion events that contain momentary stops or slowing downs of the moving objects would less likely be missed by the cuepoint detection.

In some implementations, a change in camera state (e.g., IR mode, AE mode, DTPZ settings, etc.) may change pixel values in the image frames drastically even though no motion has occurred in the scene captured in the video stream. In some implementations, each camera state change is noted in the cuepoint detection process, and a detected cuepoint is optionally suppressed if its occurrence overlaps with one of the predetermined camera state changes. In some implementations, the total motion pixel count in each frame is weighed differently if accompanied with a camera state change. For example, the total motion pixel count is optionally adjusted by a fraction (e.g., 10%) if it is accompanied by a camera state change, such as an IR mode switch. In some implementations, the motion pixel profile is reset after each camera state change.

Sometimes, a fast initial increase in total motion pixel count may indicate a global scene change or a lighting change, e.g., when the curtain is drawn, or when the camera is pointed in a different direction or moved to a different location by a user. In some implementations, when the initial increase in total motion pixel count in the profile of total motion pixel count exceeds a predetermined rate, a detected cuepoint is optionally suppressed. In some implementations, the suppressed cuepoint undergoes an edge case recovery process to determine whether the cuepoint is in fact not due to lighting change or camera movement, but rather a valid motion event candidate that needs to be recovered and reported for subsequent event processing. In some implementations, the profile of motion pixel count is reset when such fast initial increase in total motion pixel count is detected and a corresponding cuepoint is suppressed.

In some implementations, a cuepoint is evaluated based on an importance score associated with the cuepoint. The importance score is generated based on factors such as whether one or more zones of interest are involved, the amount of motion detected, the type of motion detected (e.g., velocity, angle, etc.), and the like. In some implementations, if the cuepoint is associated with motion occurring within a zone of interest where notifications are disabled, the importance score is decreased. In some implementations, if the cuepoint is associated with motion occurring in a zone of interest where notifications are enabled, the importance score is increased.

In some implementations, the cuepoint detection generally occurs at the video source 522, and immediately after a cuepoint is detected in the live video stream, the video source 522 sends an event alert to the server system 508 to trigger the subsequent event processing. In some implementations, the video source 522 includes a video camera with very limited on-board processing power and no controller device, and the cuepoint detection described herein is performed by the server system 508 on the continuous video stream transmitted from the camera to the server system 508.

In some implementations, the video source 522 sends additional video source information 1103 to the server system 508. This additional video source information 1103 may include information regarding a camera state (e.g., IR mode, AE mode, DTPZ settings, etc.) and/or information regarding the environment in which the video source 522 is located (e.g., indoors, outdoors, night-time, day-time, etc.). In some implementations, the video source information 1103 is used by the server system 508 to perform cuepoint detection and/or to categorize motion event candidates within the video stream 1104.

Figure 11C:
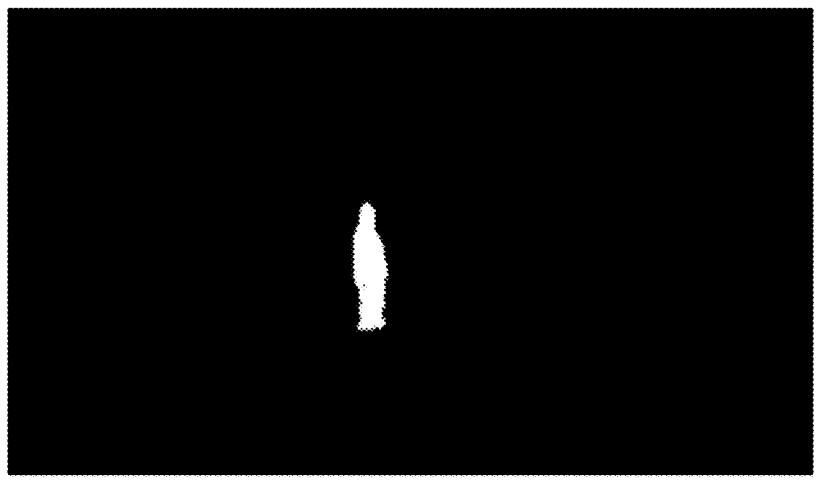
FIG. 11C illustrates an example motion mask and an example event mask generated based on video data, in accordance with some implementations.
Figure 11C:
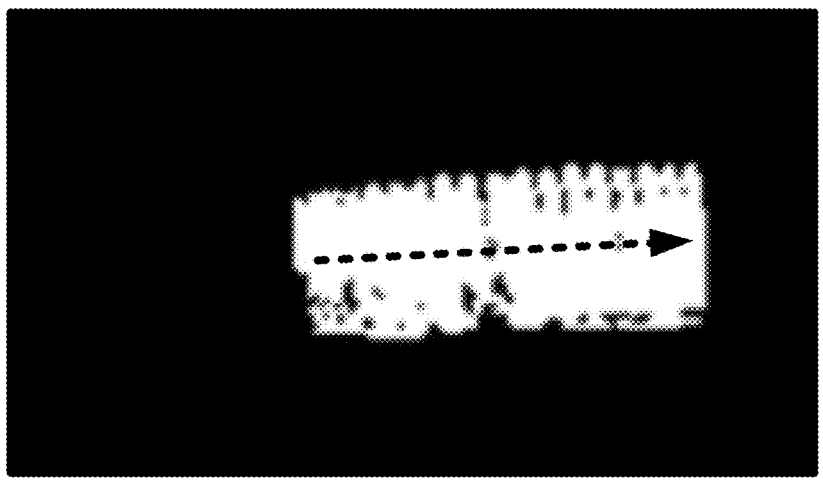
Figure 11D:
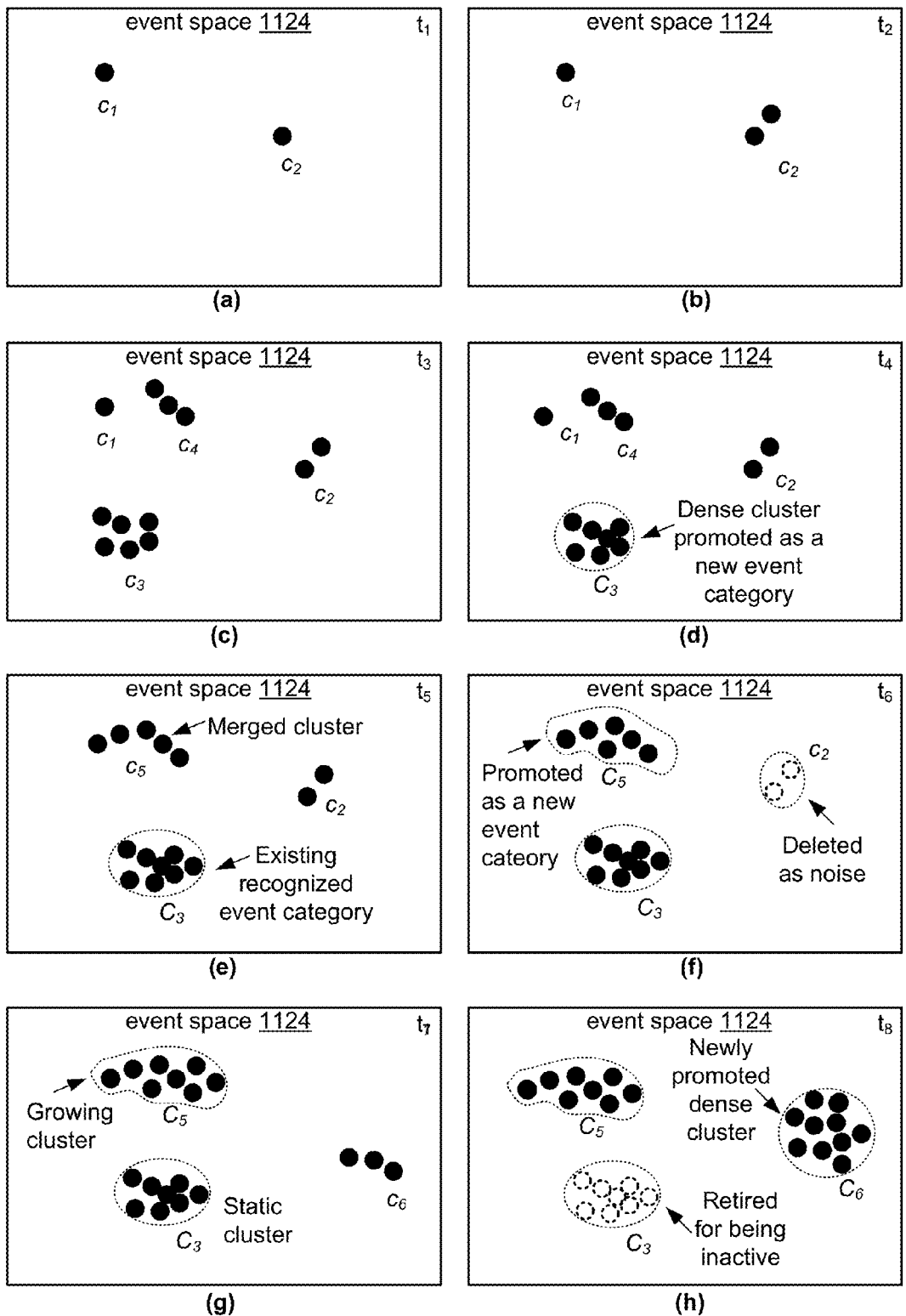
FIG. 11D illustrates a representative process for learning event categories and categorizing motion events, in accordance with some implementations.
Figure 11E:
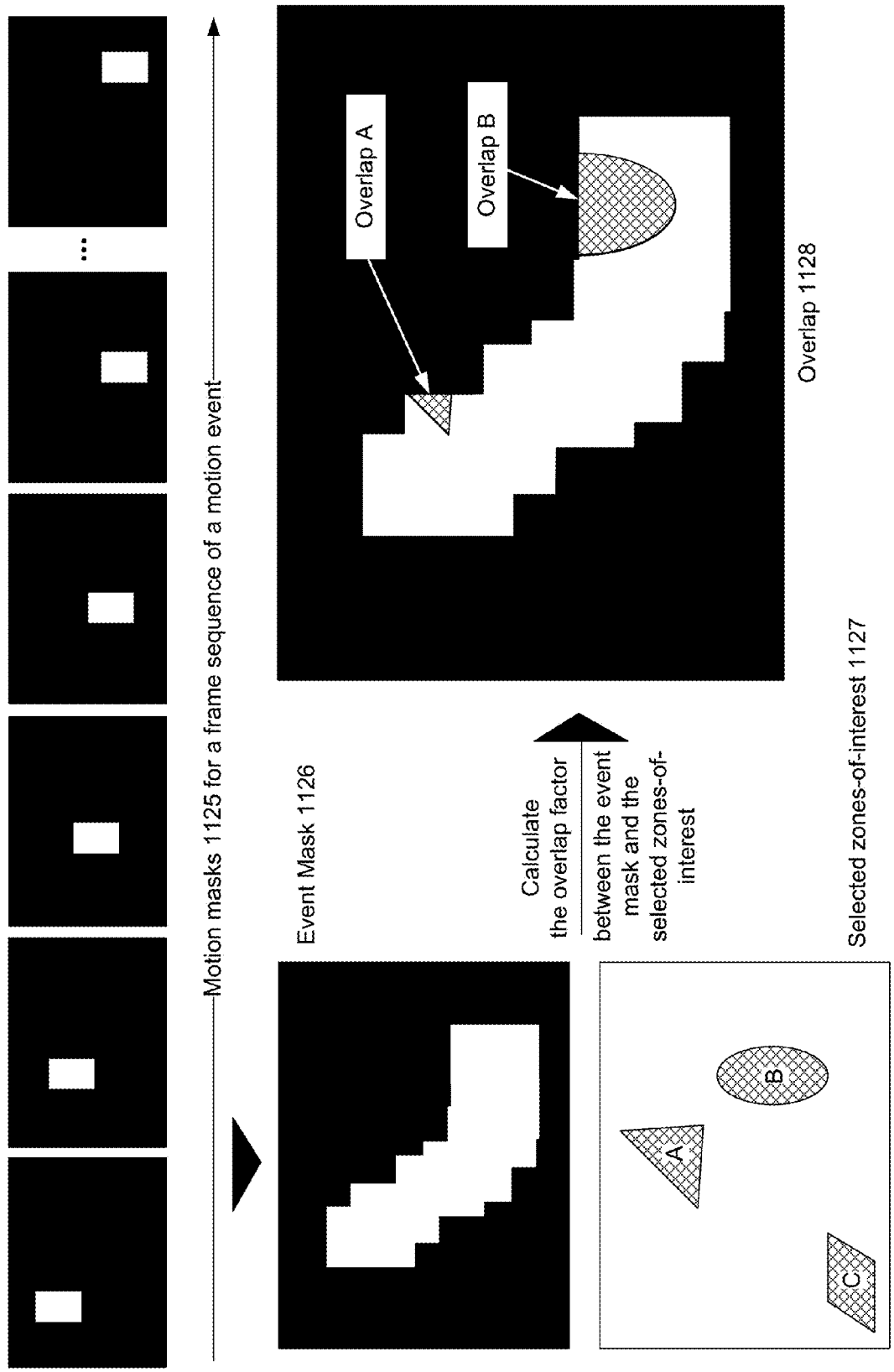
FIG. 11E illustrates a representative process for identifying an event of interest based on selected zones of interest, in accordance with some implementations.
Figure 11F:
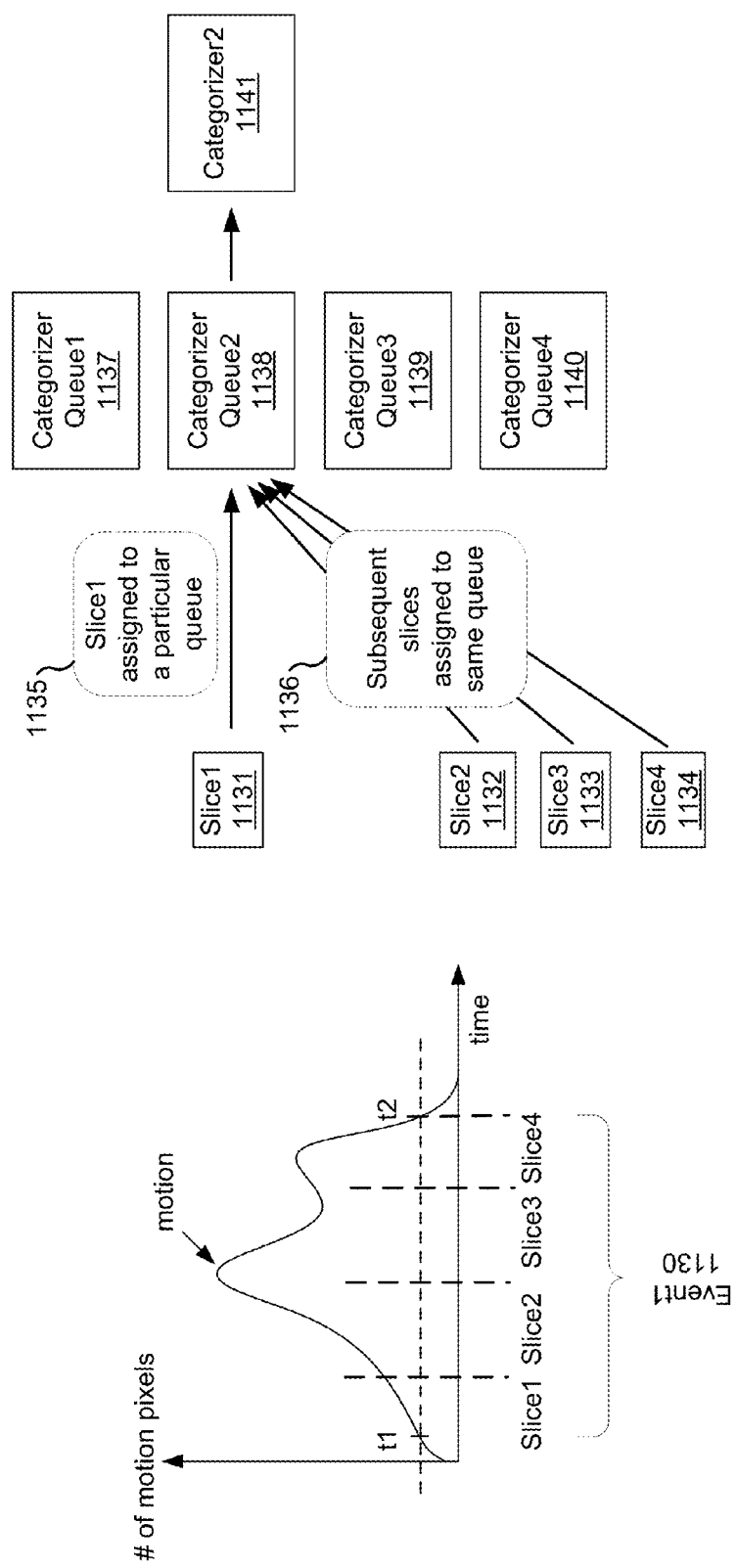
FIG. 11F illustrates a representative process for segmenting and categorizing a motion event candidate, in accordance with some implementations.

In some implementations, after the cuepoint detection, the video portion after the detected cuepoint is divided into multiple segments, as shown in FIG. 11F. In some implementations, the segmentation continues until motion end information (sometimes also called an "end-of-motion signal") is obtained. In some implementations, the segmentation occurs within the server system 508 (e.g., by the event processor module 7146).

In some implementations, each of the multiple segments is of the same or similar duration (e.g., each segment has a 10-12 second duration). In some implementations, the first segment has a shorter duration than the subsequent segments. Keeping the first segment short allows for real time initial categorization and alerts based on processing the first segment. The initial categorization may then be revised based on processing of subsequent segments. In some implementations, a new segment is generated if the motion entity enters a new zone of interest.

In some implementations, the motion end information is based on a change in the motion detected within the video stream. The motion end information is, optionally, generated when the amount of motion detected within the video stream falls below a threshold amount or declines steeply. In some implementations, the motion end information is generated by the video source 522, while in other implementations, the motion end information is generated by the server system 508 (e.g., the event processor module 7146). In some implementations, the motion end information is generated based on a particular amount of time passing since the motion start information was generated (e.g., a time-out event). For example, motion end information may be generated for a particular motion event candidate if either the amount of motion meets predetermined criterion (e.g., 1%, 5%, or 15% of the pixels in the scene) or the duration of the motion event candidate meets predetermined criterion (e.g., 30, 60, or 120 seconds), whichever occurs first.

As shown in FIG. 11B, in some implementations, the video stream is captured (1113) and the motion start information corresponding to a motion event candidate is obtained (1114). After the motion start information is obtained, the video stream is segmented (1115) as discussed above. Next, each segment is processed and categorized (1116). As will be discussed in greater detail below, this processing includes obtaining information about the background in the scene (e.g., background factors) (11161), identifying motion entities (11162), and obtaining motion vectors (11163). In some implementations, the processing also includes identifying additional features of each motion entity (motion entity features), such as the amount of a particular color within the motion entity and/or the height-to-width ratio of the motion entity (11164). In some implementations, identifying motion entities (11162) includes performing object and/or entity recognition on the motion entities. In some implementations, the motion features include information regarding what, if any, zones of interest were involved with the motion entity. In some implementations, the processing also includes identifying additional features of the scene, such as the ratio of particular colors within the scene, audio information corresponding to the scene, and/or the total amount of motion within the scene (11165). In some implementations, the scene features include information regarding zones of interest within the scene. Next, the background factors, motion entities, motion vectors, and any additional motion entity and/or scene features are aggregated to generate resulting motion features (11166). The resulting motion features are categorized and a category is assigned to the motion event candidate (11167). In some implementations, a log entry is generated for the motion event candidate (11168), and the assigned category is stored within. In some implementations, an alert is generated and sent to the client device 504 (11169). Once the motion end information is obtained, the final segment is processed and categorized (1116). In some implementations, after all segments are categorized, multi-segment features are processed (1118). These multi-segment features optionally include features generated by comparing motion event categories, event masks, motion entity features, and the like from the various segments comprising the event. For example, motion event masks for individual segments are combined to form a single motion event mask across all segments. In some implementations, after the multi-segment features are processed, an event category is assigned based on the multi-segment features (1119). In some implementations, the event category is assigned based on the multi-segment features and the categories assigned to the individual segments. In some implementations, the event log corresponding to the motion event candidate is updated (1120). In some implementations, an alert is generated based on the event category (1121). In some implementations, the alert is based on a confidence level for the event category.

In some implementations, after a motion event candidate is detected in the video stream, a video portion corresponding to the motion event candidate, or a particular segment within the video portion, is used to identify a motion track of a motion entity in the video segment. The identification of motion track is optionally performed locally at the video source 522 or remotely at the server system 508. In some implementations, motion track information is included in the motion event candidate information 1102 sent from the video source 522 to the server system 508. In some implementations, the identification of the motion track based on a video segment corresponding to a motion event candidate is performed at the server system 508 by an event processor module. In some implementations, the event processor module receives an alert for a cuepoint detected in the video stream, and retrieves the video portion corresponding to the cuepoint from cloud storage (e.g., the video data database 1106, FIG. 11A) or from the video source 522. In some implementations, the video portion used to identify the motion track may be of higher quality than the video uploaded for cloud storage, and the video portion is retrieved from the video source 522 separately from the continuous video feed uploaded from the video source 522.

In some implementations, after the event processor module obtains the video portion corresponding to a motion event candidate, the event processor module 7146 obtains background factors and performs motion entity detection identification, motion vector generation for each motion entity, and feature identification. Once the event processor module 7146 completes these tasks, the event categorizer module 7148 aggregates all of the information and generates a categorization for the motion event candidate. In some implementations, false positive suppression is optionally performed to reject some motion event candidates before the motion event candidates are submitted for event categorization. In some implementations, determining whether a motion event candidate is a false positive includes determining whether the motion event candidate occurred in a particular zone. In some implementations, determining whether a motion event candidate is a false positive includes analyzing an importance score for the motion event candidate. The importance score for the motion event candidate is optionally the same as the importance score for the corresponding cuepoint, or incorporates the importance score for the corresponding cuepoint. The importance score for a motion event candidate is optionally based on zones of interest involved with the motion event candidate, background features, motion vectors, scene features, entity features, motion features, motion tracks, and the like.

In some implementations, the video source 522 has sufficient processing capabilities to perform, and does perform, the background estimation, motion entity identification, the motion vector generation, and/or the feature identification.

In some implementations, the motion vector representing a motion event candidate is a simple two-dimensional linear vector defined by a start coordinate and an end coordinate of a motion entity (also sometimes called a "motion object") in a scene depicted in the video portion, and the motion event categorization is based on the motion vector. In some implementations, a motion vector for a motion event candidate is independently generated for each segment. In some implementations, a single motion vector is used for all segments and the motion vector is revised as each segment is processed. The advantage of using the simple two-dimensional linear motion vector for event categorization is that the event data is very compact, and fast to compute and transmit over a network. When network bandwidth and/or server load is constrained, simplifying the representative motion vector and off-loading the motion vector generation from the event processor module of the video server system 508 to the video source 522 can help to realize the real-time event categorization and alert generation for many video sources in parallel.

In some implementations, after motion tracks in a video segment corresponding to a motion event candidate are determined, track lengths for the motion tracks are determined. In some implementations, the track lengths are independently determined for each segment. In some implementations, the track lengths are revised as each subsequent segment is processed. In some implementations, "short tracks" with track lengths smaller than a predetermined threshold (e.g., 8 frames) are suppressed, as they are likely due to trivial movements, such as leaves shifting in the wind, water shimmering in the pond, etc. In some implementations, pairs of short tracks that are roughly opposite in direction are suppressed as "noisy tracks." In some implementations, after the track suppression, if there are no motion tracks remaining for the video segment, the cuepoint is determined to be a false positive, and no motion event candidate is sent to the event categorizer for event categorization. In some implementations, after the track suppression, if there are no motion tracks remaining, the motion event candidate is categorized as a non-event. If at least one motion track remains after the false positive suppression is performed, a motion vector is generated for each remaining motion track. In other words, multiple motion entities may be identified within a particular video segment. The false positive suppression occurring after the cuepoint detection and before the motion vector generation is the second layer false positive suppression, which removes false positives based on the characteristics of the motion tracks.

In some implementations, motion entity identification is performed by subtracting the estimated background from each frame of the video segment. A foreground motion mask is then obtained by masking all pixel locations that have no motion pixels. In some implementations, the background factors obtained by the event processor module include a foreground motion mask. An example of a motion mask is shown in FIG. 11C-(a). The example motion mask shows the motion pixels in one frame of the video segment in white, and the rest of the pixels in black. Once motion entities are identified in each frame, the same motion entity across multiple frames of the video segment are correlated through a matching algorithm (e.g., a Hungarian matching algorithm), and a motion track for the motion entity is determined based on the "movement" of the motion entity across the multiple frames of the video segment.

In some implementations, the motion track is used to generate a two-dimensional linear motion vector which only takes into account the beginning and end locations of the motion track (e.g., as shown by the dotted arrow in FIG. 11C-(b)). In some implementations, the beginning and end locations are determined on a per segment basis. In some implementations, the beginning location is determined based on the first segment and the end location is determined based on the last segment. In some implementations, the motion vector is a non-linear motion vector that traces the entire motion track from the first frame to the last frame of the frame sequence in which the motion entity has moved.

In some implementations, the motion masks corresponding to each motion entity detected in the video segment are aggregated across all frames of the video segment to create an event mask for the motion event involving the motion entity. In some implementations, an event mask is created for each individual segment. In some implementations, an event mask is created from a first segment and is updated as subsequent segments are processed. As shown in FIG. 11C-(b), in the event mask, all pixel locations containing motion pixels in less than a threshold number of frames (and/or less than a threshold fraction of frames) are masked and shown in black, while all pixel locations containing motion pixels in at least the threshold number of frames (and/or at least a threshold fraction of frames) are shown in white. The active portion of the event mask (e.g., shown in white) indicates all areas in the scene depicted in the video segment that have been accessed by the motion entity during its movement in the scene. In some implementations, the event mask for each motion event is stored at the server system 508 or a component thereof (e.g., the event information database 7166, FIG. 7A), and used to selectively retrieve motion events that enter or touch a particular zone of interest within the scene depicted in the video stream of a camera. In some implementations, when a new zone of interest is created, the event masks for previous event candidates are retrieved and compared to the new zone of interest to generate and/or re-categorize events.

In some implementations, a motion mask is created based on an aggregation of motion pixels from a short frame sequence in the video segment. The pixel count at each pixel location in the motion mask is the sum of the motion pixel count at that pixel location from all frames in the short frame sequence. All pixel locations in the motion mask with less than a threshold number of motion pixels (e.g., motion pixel count >4 for 10 consecutive frames) are masked. Thus, the unmasked portions of the motion mask for each such short frame sequence indicates a dominant motion region for the short frame sequence. In some implementations, a motion track is optionally created based on the path taken by the dominant motion regions identified from a series of consecutive short frame sequences.

In some implementations, an event mask is optionally generated by aggregating all motion pixels from all frames of the video segment at each pixel location, and masking all pixel locations that have less than a threshold number of motion pixels. The event mask generated this way is no longer a binary event mask, but is a two-dimensional histogram. The height of the histogram at each pixel location is the sum of the number of frames that contain a motion pixel at that pixel location. This type of non-binary event mask is also referred to as a motion energy map, and illustrates the regions of the video scene that are most active during a motion event. The characteristics of the motion energy maps for different types of motion events are optionally used to differentiate them from one another. Thus, in some implementations, the motion energy map of a motion event candidate is vectorized to generate the representative motion vector for use in event categorization. In some implementations, the motion energy map of a motion event is generated and cached by the video server system and used for real-time zone monitoring and/or retroactive event identification for newly created zones of interest.

In some implementations, a live event mask is generated based on the motion masks of frames that have been processed, and is continuously updated until all frames (or segments) of the motion event have been processed. In some implementations, the live event mask of a motion event in progress is used to determine if the motion event is an event of interest for a particular zone of interest.

In some implementations, after the server system 508 obtains the representative motion vector for a new motion event candidate (e.g., either by generating the motion vector from the video segment corresponding to a newly detected cuepoint, or by receiving the motion vector from the video source 522), the server system 508 proceeds to categorize the motion event candidate based at least in part on its representative motion vector.

In some implementations, the categorization of motion events (also sometimes referred to as "activity recognition") is performed by training a categorizer and/or a categorization model based on a training data set containing motion vectors corresponding to various known event categories. For example, known event categories may include: a person running, a person jumping, a person walking, a dog running, a bird flying, a car passing by, a door opening, a door closing, leaves rustling, etc.). The common characteristics of each known event category that distinguish the motion events of the event category from motion events of other event categories are extracted through the training. Thus, when a new motion vector corresponding to an unknown event category is received, the event categorizer module 7148 examines the new motion vector in light of the common characteristics of each known event category (e.g., based on a Euclidean distance between the new motion vector and a canonical vector representing each known event type), and determines the most likely event category for the new motion vector from among the known event categories.

Although motion event categorization based on pre-established motion event categories is an acceptable way to categorize motion events, this categorization technique may only be suitable for use when the variety of motion events handled by the server system 508 is relatively few in number and already known before any motion event is processed. In some instances, the server system 508 serves a large number of clients with cameras used in many different environmental settings, resulting in motion events of many different types. In addition, each reviewer may be interested in different types of motion events, and may not know what types of events they would be interested in before certain real world events have happened (e.g., some object has gone missing in a monitored location). Thus, it is desirable to have an event categorization technique that can handle any number of event categories based on actual camera use, and automatically adjust (e.g., create and retire) event categories through machine learning based on the actual video data that is received over time.

In some implementations, the categorization of motion events is based at least in part on a density-based clustering technique (e.g., DBscan) that forms clusters based on density distributions of motion events (e.g., motion events as represented by their respective motion vectors) in a vector event space. Regions with sufficiently high densities of motion vectors are promoted as recognized vector categories, and all motion vectors within each promoted region are deemed to belong to a respective recognized vector category associated with that promoted region. In contrast, regions that are not sufficiently dense are not promoted or recognized as vector categories. Instead, such non-promoted regions are collectively associated with a category for unrecognized vector, and all motion vectors within such non-promoted regions are optionally deemed to be unrecognized motion events at the present time.

In some implementations, each time a new motion vector is to be categorized, the event categorizer places the new motion vector into the vector event space according to its value. If the new motion vector is sufficiently close to or falls within an existing dense cluster, the vector category associated with the dense cluster is assigned to the new motion vector. If the new motion vector is not sufficiently close to any existing cluster, the new motion vector forms its own cluster of one member, and is assigned to the category of unrecognized events. If the new motion vector is sufficiently close to or falls within an existing sparse cluster, the cluster is updated with the addition of the new motion vector. If the updated cluster is now a dense cluster, the updated cluster is promoted, and all motion vectors (including the new motion vector) in the updated cluster are assigned to a new vector category created for the updated cluster. If the updated cluster is still not sufficiently dense, no new category is created, and the new motion vector is assigned to the category of unrecognized events. In some implementations, clusters that have not been updated for at least a threshold expiration period are retired. The retirement of old static clusters helps to remove residual effects of motion events that are no longer valid, for example, due to relocation of the camera that resulted in a scene change.

FIG. 11D illustrates an example process for the event categorizer of the server system 508 to (1) gradually learn new vector categories based on received motion events, (2) assign newly received motion vector to recognized vector categories or an unrecognized vector category, and (3) gradually adapt the recognized vector categories to the more recent motion events by retiring old static clusters and associated vector categories, if any. The example process is provided in the context of a density-based clustering algorithm (e.g., sequential DBscan). However, a person skilled in the art will recognize that other clustering algorithms that allow growth of clusters based on new vector inputs can also be used in various implementations.

For reference, sequential DBscan allows growth of a cluster based on density reachability and density connectedness. A point q is directly density-reachable from a point p if it is not farther away than a given distance $\epsilon$ (i.e., is part of its $\epsilon$-neighborhood) and if p is surrounded by sufficiently many points M such that one may consider p and q to be part of a cluster. q is called density-reachable from p if there is a sequence $p_1, \ldots p_n$ of points with $p_1=p$ and $p_n=p$ where each $p_{i+1}$ is directly density-reachable from $p_i$. Since the relation of density-reachable is not symmetric, another notion of density-connectedness is introduced. Two points p and q are density-connected if there is a point o such that both p and q are density-reachable from o. Density-connectedness is symmetric. A cluster is defined by two properties: (1) all points within the cluster are mutually density-connected, and (2) if a point is density-reachable from any point of the cluster, it is part of the cluster as well. The clusters formed based on density connectedness and density reachability can have all shapes and sizes, in other words, motion event candidates from a video source (e.g., as represented by motion vectors in a dataset) can fall into non-linearly separable clusters based on this density-based clustering algorithm, when they cannot be adequately clustered by K-means or Gaussian Mixture EM clustering techniques. In some implementations, the values of $\epsilon$ and M are adjusted by the server system 508 for each video source and/or video stream, such that clustering quality can be improved for different camera usage settings.

In some implementations, during the categorization process, four parameters are stored and sequentially updated for each cluster. The four parameters include: (1) cluster creation time, (2) cluster weight, (3) cluster center, and (4) cluster radius. The creation time for a given cluster records the time when the given cluster was created. The cluster weight for a given cluster records a member count for the cluster. In some implementations, a decay rate is associated with the member count parameter, such that the cluster weight decays over time if an insufficient number of new members are added to the cluster during that time. This decaying cluster weight parameter helps to automatically fade out old static clusters that are no longer valid. The cluster center of a given cluster is the weighted average of points in the given cluster. The cluster radius of a given cluster is the weighted spread of points in the given cluster (analogous to a weighted variance of the cluster). It is defined that clusters have a maximum radius of $\epsilon/2$. A cluster is considered to be a dense cluster when it contains at least M/2 points. When a new motion vector comes into the event space, if the new motion vector is density-reachable from any existing member of a given cluster, the new motion vector is included in the existing cluster; and if the new motion vector is not density-reachable from any existing member of any existing cluster in the event space, the new motion vector forms its own cluster. Thus, at least one cluster is updated or created when a new motion vector comes into the event space.

FIG. 11D-(a) shows the early state of the event vector space 1124. At time $t_1$, two motion vectors (e.g., represented as two points) have been received by the event categorizer. Each motion vector forms its own cluster (e.g., $c_1$ and $c_2$, respectively) in the event space 1124. The respective creation time, cluster weight, cluster center, and cluster radius for each of the two clusters are recorded. At this time, no recognized vector category exists in the event space, and the motion events represented by the two motion vectors are assigned to the category of unrecognized vectors. In some implementations, on the frontend, the event indicators of the two events indicate that they are unrecognized events on the event timeline, for example, in the manner shown in FIG. 13A, discussed below.

After some time, a new motion vector is received and placed in the event space 1124 at time $t_2$. As shown in FIG. 11D-(b), the new motion vector is density-reachable from the existing point in cluster $c_2$ and thus falls within the existing cluster $c_2$. The cluster center, cluster weight, and cluster radius of cluster $c_2$ are updated based on the entry of the new motion vector. The new motion vector is also assigned to the category of unrecognized vectors. In some implementations, the event indicator of the new motion event is added to the event timeline in real-time, and has the appearance associated with the category for unrecognized events.

FIG. 11D-(c) illustrates that, at time $t_3$, two new clusters $c_3$ and $c_4$ have been established and grown in size (e.g., cluster weight and radius) based on a number of new motion vectors received during the time interval between $t_2$ and $t_3$. In the meantime, neither cluster $c_1$ nor cluster $c_2$ have seen any growth. The cluster weights for clusters $c_1$ and $c_2$ have decayed gradually due to the lack of new members during this period of time. Up to this point, no recognized vector category has been established, and all motion events are assigned to the category of unrecognized vectors. In some implementations, if the motion events are reviewed in a review interface on the client device 504, the event indicators of the motion events have an appearance associated with the category for unrecognized events (e.g., as the event indicator 1322B shows in FIG. 13A). In some implementations, each time a new motion event is added to the event space 1124, a corresponding event indicator for the new event is added to the timeline associated with the present video source.

FIG. 11D-(d) illustrates that, at time $t_4$, another new motion vector has been added to the event space 1124, and the new motion vector falls within the existing cluster $c_3$. The cluster center, cluster weight, and cluster radius of cluster $c_3$ are updated based on the addition of the new motion vector, and the updated cluster $c_3$ has become a dense cluster based on a predetermined density requirement (e.g., a cluster is considered dense when it contains at least M/2 points). Once cluster $c_3$ has achieved the dense cluster status (and relabeled as $C_3$), a new vector category is established for cluster $C_3$. When the new vector category is established for cluster $C_3$, all the motion vectors currently within cluster $C_3$ are associated with the new vector category. In other words, the previously unrecognized events in cluster $C_3$ are now recognized events of the new vector category. In some implementations, as soon as the new vector category is established, the event categorizer notifies the user-facing frontend of the video server system 508 about a corresponding new event category. The user-facing frontend determines whether a reviewer interface for the video stream corresponding to the event space 1124 is currently displayed on a client device 504. If a reviewer interface is currently displayed, the user-facing frontend causes the client device 504 to retroactively modify the display characteristics of the event indicators for the motion events in cluster $C_3$ to reflect the newly established vector category in the review interface. For example, as soon as the new event category corresponding to the new vector category is established by the event categorizer, the user-facing frontend will cause the event indicators for the motion events previously within cluster $c_3$ (and now in cluster $C_3$) to take on a color assigned to the new event category). In addition, the event indicator of the new motion event will also take on the color assigned to the new event category. This is illustrated in the review interface 1308 in FIG. 13A by the striping of the event indicators 1322F, 1322H, 1322J, 1322K, and 1322L to reflect the established event category (supposing that cluster $C_3$ corresponds to Event Cat. B here).

FIG. 11D-(e) illustrates that, at time $t_5$, two new motion vectors have been received in the interval between $t_4$ and $t_5$. One of the two new motion vectors falls within the existing dense cluster $C_3$, and is associated with the recognized vector category of cluster $C_3$. Once the motion vector is assigned to cluster $C_3$, the event categorizer notifies the user-facing frontend regarding the event categorization result. Consequently, the event indicator of the motion event represented by the newly categorized motion vector is given the appearance associated with the recognized event category of cluster $C_3$. Optionally, a pop-up notification for the newly recognized motion event is presented over the timeline associated with the event space.

FIG. 11D-(e) further illustrates that, at time $t_5$, one of the two new motion vectors is density reachable from both of the existing clusters $c_1$ and $c_5$, and thus qualifies as a member for both clusters. The arrival of this new motion vector halts the gradual decay in cluster weight that cluster $c_1$ that has sustained since time $t_1$. The arrival of the new motion vector also causes the existing clusters $c_1$ and $c_5$ to become density-connected, and as a result, to merge into a larger cluster $c_5$. The cluster center, cluster weight, cluster radius, and optionally the creation time for cluster $c_5$ are updated accordingly. At this time, cluster $c_2$ remains unchanged, and its cluster weight decays further over time.

FIG. 11D-(f) illustrates that, at time $t_6$, the weight of the existing cluster $c_2$ has reached below a threshold weight, and is thus deleted from the event space 1124 as a whole. The pruning of inactive sparse clusters allows the event space to remain fairly noise-free and keeps the clusters easily separable. In some implementations, the motion events represented by the motion vectors in the deleted sparse clusters (e.g., cluster $c_2$) are retroactively removed from the event timeline on the review interface. In some implementations, the motion events represented by the motion vectors in the deleted sparse clusters (e.g., cluster $c_2$) are kept in the timeline and given a new appearance associated with a category for trivial or uncommon events. In some implementations, the motion events represented by the motion vectors in the deleted sparse cluster (e.g., cluster $c_2$) are optionally gathered and presented to the user or an administrator to determine whether they should be removed from the event space and the event timeline.

FIG. 11D-(f) further illustrates that, at time $t_6$, a new motion vector is assigned to the existing cluster $c_5$, which causes the cluster weight, cluster radius, and cluster center of cluster $c_5$ to be updated accordingly. The updated cluster $c_5$ now reaches the threshold for qualifying as a dense cluster, and is thus promoted to a dense cluster status (and relabeled as cluster $C_5$). A new vector category is created for cluster $C_5$. All motion vectors in cluster $C_5$ (which were previously in clusters $c_1$ and $c_4$) are removed from the category for unrecognized motion events, and assigned to the newly created vector category for cluster $C_5$. The creation of the new category and the retroactive appearance change for the event indicators of the motion events in the new category are reflected in the reviewer interface, and optionally notified to the reviewer.

FIG. 11D-(g) illustrates that, at time $t_7$, cluster $C_5$ continues to grow with some of the subsequently received motion vectors. A new cluster $c_6$ has been created and has grown with some of the subsequently received motion vectors. Cluster $C_3$ has not seen any growth since time $t_5$, and its cluster weight has gradually decayed over time.

FIG. 11D-(h) shows that, at a later time $t_8$, dense cluster $C_3$ is retired (deleted from the event space 1124) when its cluster weight has fallen below a predetermined cluster retirement threshold. In some implementations, motion events represented by the motion vectors within the retired cluster $C_3$ are removed from the event timeline for the corresponding video source. In some implementations, the motion events represented by the motion vectors as well as the retired event category associated with the retired cluster $C_3$ are stored as obsolete motion events, apart from the other more current motion events. For example, the video data and motion event data for obsolete events are optionally compressed and archived, and require a recall process to reload into the timeline. In some implementations, when an event category is retired, the event categorizer 7148 notifies the user-facing frontend 7150 to remove the event indicators for the motion events in the retired event category from the timeline. In some implementations, when a vector category is retired, the motion events in the retired category are assigned to a category for retired events and their event indicators are retroactively given the appearance associated with the category for retired events in the timeline.

FIG. 11D-(h) further illustrates that, at time $t_8$, cluster $c_6$ has grown substantially, and has been promoted as a dense cluster (relabeled as cluster $C_6$) and given its own vector category. Thus, on the event review interface, a new vector category is provided, and the appearance of the event indicators for motion events in cluster $C_6$ is retroactively changed to reflect the newly recognized vector category.

In some implementations, the categorization of each segment (11167) is based in part on the event categories associated with each motion vector within the segment. For example, the event categories associated with each motion vector are aggregated with other factors/features to generate motion features (11166) for a segment. In some implementations, the categorization of the motion event (1119) is based in part on the event categories associated with each motion vector.

Based on the above process, as motion vectors are collected in the event space over time, the most common event categories emerge gradually without manual intervention. In some implementations, the creation of a new category causes real-time changes in the review interface provided to a client device 504 associated with the video source 522. For example, in some implementations, motion events are first represented as uncategorized motion events, and as each vector category is created over time, the characteristics of event indicators for past motion events in that vector category are changed to reflect the newly recognized vector category. Subsequent motion events falling within the recognized categories also have event indicators showing their respective categories. The currently recognized categories are optionally presented in the review interface for user selection as event filters. The user may choose any subset of the currently known categories (e.g., each recognized event categories and respective categories for trivial events, rare events, obsolete events, and unrecognized events) to selectively view or receive notifications for motion events within the subset of categories.

In some implementations, a user may review past motion events and their categories on the event timeline. In some implementations, the user is allowed to edit the event category assignments 1109, for example, by removing one or more past motion events from a known event category. When the user has edited the event category composition of a particular event category by removing one or more past motion events from the event category, the user-facing frontend notifies the event categorizer of the edits. In some implementations, the event categorizer removes the motion vectors of the removed motion events from the cluster corresponding to the event category, and re-computes the cluster parameters (e.g., cluster weight, cluster center, and cluster radius). In some implementations, the removal of motion events from a recognized cluster optionally causes other motion events that are similar to the removed motion events to be removed from the recognized cluster as well. In some implementations, manual removal of one or more motion events from a recognized category may cause one or more motion events to be added to event category due to the change in cluster center and cluster radius. In some implementations, the event category models are stored in the event category models database 1108 (FIG. 11A), and is retrieved and updated in accordance with the user edits.

In some implementations, one event category model is established for one camera. In some implementations, a composite model based on the motion events from multiple related cameras (e.g., cameras reported to serve a similar purpose, or have a similar scene, etc.) is created and used to categorize motion events detected in the video stream of each of the multiple related cameras. In such implementations, the timeline for one camera may show event categories discovered based on motion events in the video streams of its related cameras, even though no event for such categories have been seen in the camera's own video stream.

In some implementations, event data and event masks of past motion events are stored in the event data and event mask database 1110 (FIG. 11A). In some implementations, the client device 504 receives user input to select one or more filters to selectively review past motion events, and selectively receive event alerts for future motion events.

In some implementations, the client device 504 passes the user selected filter(s) to the user-facing frontend 7150, and the user-facing frontend retrieves the events of interest based on the information in the event data and event mask database 1110. In some implementations, the selectable filters include one or more recognized event categories, and optionally any of the categories for unrecognized motion events, rare events, and/or obsolete events. When a recognized event category is selected as a filter, the user-facing frontend retrieves all past motion events associated with the selected event category, and present them to the user (e.g., on the timeline, or in an ordered list shown in a review interface). For example, when the user selects one of the two recognized event categories in the review interface, the past motion events associated with the selected event category (e.g., Event Cat. B) are shown on the timeline, while the past motion events associated with the unselected event category (e.g., Event Cat. A) are removed from the timeline. In some implementations, when the user selects to edit a particular event category (e.g., Event Cat. B), the past motion events associated with the selected event categories (e.g., Event Cat. B) are presented in the first region of the editing user interface, while motion events in the unselected event categories (e.g., Event Cat. A) are not shown.

In some implementations, in addition to event categories, other types of event filters can also be selected individually or combined with selected event categories. For example, in some implementations, the selectable filters also include a human filter, which can be one or more characteristics associated with events involving a human being. For example, the one or more characteristics that can be used as a human filter include a characteristic shape (e.g., aspect ratio, size, shape, and the like) of the motion entity, audio comprising human speech, motion entities having human facial characteristics, etc. In some implementations, the selectable filters also include a filter based on similarity. For example, the user can select one or more example motion events, and be presented one or more other past motion events that are similar to the selected example motion events. In some implementations, the aspect of similarity is optionally specified by the user. For example, the user may select "color content," "number of moving objects in the scene," "shape and/or size of motion entity," and/or "length of motion track," etc, as the aspect(s) by which similarity between two motion events are measured. In some implementations, the user may choose to combine two or more filters and be shown the motion events that satisfy all of the filters combined. In some implementations, the user may choose multiple filters that will act separately, and be shown the motion events that satisfy at least one of the selected filters.

In some implementations, the user may be interested in past motion events that have occurred within a zone of interest. The zone of interest can also be used as an event filter to retrieve past events and generate notifications for new events. In some implementations, the user may define one or more zones of interest in a scene depicted in the video stream. The zone of interest may enclose an object, for example, a chair, a door, a window, or a shelf, located in the scene. Once a zone of interest is created, it is included as one of the selectable filters for selectively reviewing past motion events that had entered or touched the zone. In addition, the user may also choose to receive alerts for future events that enter a zone of interest, for example, by selecting an alert affordance associated with zone.

In some implementations, the server system 508 (e.g., the user-facing frontend of the server system 508) receives the definitions of zones of interest from the client device 504, and stores the zones of interest in association with the reviewer account currently active on the client device 504. When a zone of interest is selected as a filter for reviewing motion events, the user-facing frontend searches the event data database 1110 (FIG. 11A) to retrieve all past events that have motion entity(s) within the selected zone of interest. This retrospective search of event of interest can be performed irrespective of whether the zone of interest had existed before the occurrence of the retrieved past event(s). In other words, the user does not need to know where in the scene he/she may be interested in monitoring before hand, and can retroactively query the event database to retrieve past motion events based on a newly created zone of interest. There is no requirement for the scene to be divided into predefined zones first, and past events be tagged with the zones in which they occur when the past events were first processed and stored.

In some implementations, the retrospective zone search based on newly created or selected zones of interest is implemented through a regular database query where the relevant features of each past event (e.g., which regions the motion entity had entered during the motion event) are determined on the fly, and compared to the zones of interest. In some implementations, the server optionally defines a few default zones of interest (e.g., eight (2×4) predefined rectangular sectors within the scene), and each past event is optionally tagged with the particular default zones of interest that the motion entity has entered. In such implementations, the user can merely select one or more of the default zones of interest to retrieve the past events that touched or entered the selected default zones of interest.

In some implementations, event masks (e.g., the example event mask shown in FIG. 11C) each recording the extent of a motion region accessed by a motion entity during a given motion event are stored in the event data and event masks database 1110 (FIG. 11A). The event masks provide a faster and more efficient way of retrieving past motion events that have touched or entered a newly created zone of interest.

In some implementations, the scene of the video stream is divided into a grid, and the event mask of each motion event is recorded as an array of flags that indicates whether motion had occurred within each grid location during the motion event. When the zone of interest includes at least one of the grid location at which motion has occurred during the motion event, the motion event is deemed to be relevant to the zone of interest and is retrieved for presentation. In some implementations, the user-facing frontend imposes a minimum threshold on the number of grid locations that have seen motion during the motion event, in order to retrieve motion events that have at least the minimum number of grid locations that included motion. In other words, if the motion region of a motion event barely touched the zone of interest, it may not be retrieved for failing to meet the minimum threshold on grid locations that have seen motion during the motion event.

In some implementations, an overlap factor is determined for the event mask of each past motion event and a selected zone of interest, and if the overlapping factor exceeds a predetermined overlap threshold, the motion event is deemed to be a relevant motion event for the selected zone of interest.

In some implementations, the overlap factor is a simple sum of all overlapping grid locations or pixel locations. In some implementations, more weight is given to the central region of the zone of interest than the peripheral region of the zone of interest during calculation of the overlap factor. In some implementations, the event mask is a motion energy mask that stores the histogram of pixel count at each pixel location within the event mask. In some implementations, the overlap factor is weighted by the pixel count at the pixel locations that the motion energy map overlaps with the zone of interest.

By storing the event mask at the time that the motion event is processed, the retrospective search for motion events that are relevant to a newly created zone of interest can be performed relatively quickly, and makes the user experience for reviewing the events-of-interest more seamless. Creation of a new zone of interest, or selecting a zone of interest to retrieve past motion events that are not previously associated with the zone of interest provides many usage possibilities, and greatly expands the utility of stored motion events. In other words, motion event data (e.g., event categories, event masks) can be stored in anticipation of different uses, without requiring such uses to be tagged and stored at the time when the event occurs. Thus, wasteful storage of extra metadata tags may be avoided in some implementations.

In some implementations, the filters can be used for not only past motion events, but also new motion events that have just occurred or are still in progress. For example, when the video data of a detected motion event candidate is processed, a live motion mask is created and updated based on each frame of the motion event as the frame is received by the server system 508. In other words, after the live event mask is generated, it is updated as each new frame of the motion event is processed. In some implementations, the live event mask is compared to the zone of interest on the fly, and as soon as a sufficient overlap factor is accumulated, an alert is generated, and the motion event is identified as an event of interest for the zone of interest. In some implementations, an alert is presented on the review interface (e.g., as a pop-up) as the motion event is detected and categorized, and the real-time alert optionally is formatted to indicate its associated zone of interest. This provides real-time monitoring of the zone of interest in some implementations.

In some implementations, the event mask of the motion event is generated after the motion event is completed, and the determination of the overlap factor is based on a comparison of the completed event mask and the zone of interest. Since the generation of the event mask is substantially in real-time, real-time monitoring of the zone of interest may also be realized this way in some implementations.

In some implementations, if multiple zones of interest are selected at any given time for a scene, the event mask of a new and/or old motion event is compared to each of the selected zones of interest. For a new motion event, if the overlap factor for any of the selected zones of interest exceeds the overlap threshold, an alert is generated for the new motion event as an event of interest associated with the zone(s) that are triggered. For a previously stored motion event, if the overlap factor for any of the selected zones of interest exceeds the overlap threshold, the stored motion event is retrieved and presented to the user as an event of interest associated with the zone(s) that are triggered.

In some implementations, if a live event mask is used to monitor zones of interest, a motion entity in a motion event may enter different zones at different times during the motion event. In some implementations, a single alert (e.g., a pop-up notification over the timeline) is generated at the time that the motion event triggers a zone of interest for the first time, and the alert can be optionally updated to indicate the additional zones that are triggered when the live event mask touches those zones at later times during the motion event. In some implementations, one alert is generated for each zone of interest when the live event mask of the motion event touches the zone of interest.

FIG. 11E illustrates an example process by which respective overlapping factors are calculated for a motion event and several zones of interest. The zones of interest may be defined after the motion event has occurred and the event mask of the motion event has been stored, such as in the scenario of retrospective zone search. Alternatively, the zones of interest may also be defined before the motion event has occurred in the context of zone monitoring. In some implementations, zone monitoring can rely on a live event mask that is being updated as the motion event is in progress. In some implementations, zone monitoring relies on a completed event mask that is formed immediately after the motion event is completed.

As shown in the upper portion of FIG. 11E, motion masks 1125 for a frame sequence of a motion event are generated as the motion event is processed for motion vector generation. Based on the motion masks 1125 of the frames, an event mask 1126 is created. The creation of an event mask based on motion masks has been discussed earlier with respect to FIG. 11C, and is not repeated herein.

Suppose that the motion masks 1125 shown in FIG. 11E are all the motion masks of a past motion event, thus, the event mask 1126 is a complete event mask stored for the motion event. After the event mask has been stored, when a new zone of interest (e.g., Zone B among the selected zones of interest 1127) is created later, the event mask 1126 is compared to Zone B, and an overlap factor between the event mask 1126 and Zone B is determined. In this particular example, Overlap B (within Overlap 1128) is detected between the event mask 1126 and Zone B, and an overlap factor based on Overlap B also exceeds an overlap threshold for qualifying the motion event as an event of interest for Zone B. As a result, the motion event will be selectively retrieved and presented to the reviewer, when the reviewer selects Zone B as a zone of interest for a present review session.

In some implementations, a zone of interest is created and selected for zone monitoring. During the zone monitoring, when a new motion event is processed in real-time, an event mask is created in real-time for the new motion event and the event mask is compared to the selected zone of interest. For example, if Zone B is selected for zone monitoring, when the Overlap B is detected, an alert associated with Zone B is generated and sent to the reviewer in real-time.

In some implementations, when a live event mask is used for zone monitoring, the live event mask is updated with the motion mask of each new frame of a new motion event that has just been processed. The live motion mask is compared to the selected zone(s) of interest 1127 at different times (e.g., every 5 frames) during the motion event to determine the overlap factor for each of the zones of interest. For example, if all of zones A, B, and C are selected for zone monitoring, at several times during the new motion event, the live event mask is compared to the selected zones of interest 1127 to determine their corresponding overlap factors. In this example, eventually, two overlap regions are found: Overlap A is an overlap between the event mask 1126 and Zone A, and Overlap B is an overlap between the event mask 1126 and Zone B. No overlap is found between the event mask 1126 and Zone C. Thus, the motion event is identified as an event of interest for both Zone A and Zone B, but not for Zone C. As a result, alerts will be generated for the motion event for both Zone A and Zone B. In some implementations, if the live event mask is compared to the selected zones as the motion mask of each frame is added to the live event mask, Overlap A will be detected before Overlap B, and the alert for Zone A will be triggered before the alert for Zone B.

In some implementations, the motion event is detected and categorized independently of the existence of the zones of interest. In some implementations, the importance score for a motion event is based on the involvement of zones of interest. In some implementations, the importance score for a motion event is recalculated when new zones are obtained and/or activated. In some implementations, the zone monitoring does not rely on raw image information within the selected zones; instead, the zone monitoring can take into account the raw image information from the entire scene. Specifically, the motion information during the entire motion event, rather than the motion information confined within the selected zone, is abstracted into an event mask, before the event mask is used to determine whether the motion event is an event of interest for the selected zone. In other words, the context of the motion within the selected zones is preserved, and the event category of the motion event can be provided to the user to provide more meaning to the zone monitoring results.

FIG. 11F shows an event being segmented and processed in accordance with some implementations. In some implementations, each segment is processed by server system 508 (FIG. 11A). As shown in FIG. 11F, motion start information for Event1 1130 is obtained and an initial segment 1131, denoted as Slice1, is generated. Slice1 is then assigned to a queue (also sometimes called a "pipeline") associated with a particular categorizer (1135). FIG. 11F shows Slice1 assigned to categorizer queue 1138, denoted as categorizer queue2. Categorizer queue2 corresponds to categorizer 1141, denoted as categorizer2. In some implementations, the assignment is based on a load balancing scheme. For example, the relative amount of data assigned to each of categorizer queue1 1137, categorizer queue2 1138, categorizer queue3 1139, and categorizer queue4 1140 is compared and the system determines that categorizer queue2 has the least amount of data currently assigned. Therefore, Slice1 is assigned to categorizer queue2. In some implementations, Slice1 is assigned to an idle queue. As shown, once Slice1 has been assigned to a particular queue, all subsequent segments from Event 1 (e.g., Slice2 1132, Slice3 1333, and Slice4 1334) are assigned to the same queue (1136). This allows for information such as background factors to be shared across segments.

Figure 11G:
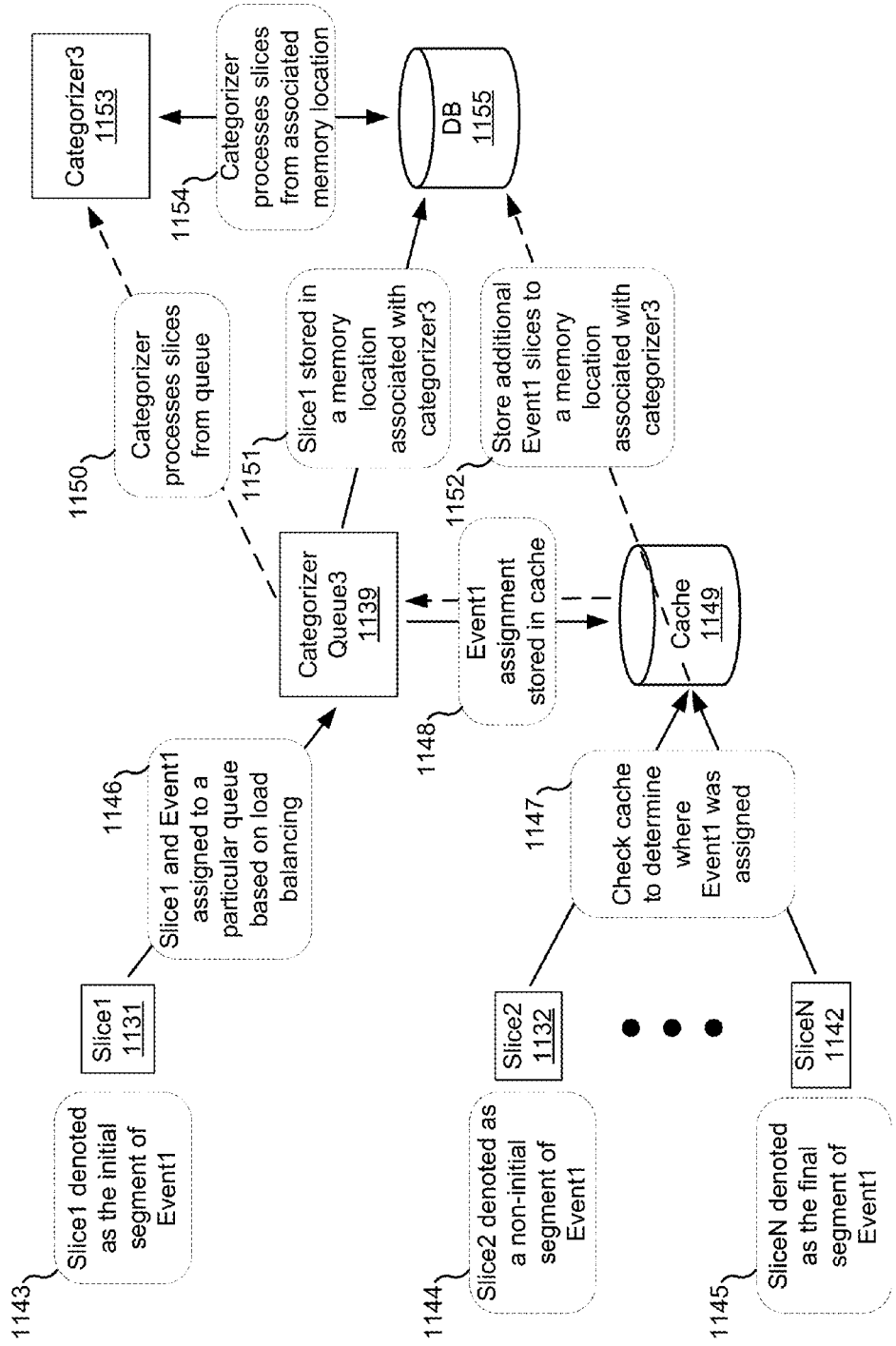
FIG. 11G illustrates a representative process for categorizing a motion event candidate, in accordance with some implementations.

FIG. 11G shows segments of a particular event (Event1 1130) being assigned to a categorizer and processed in accordance with some implementations. As shown in FIG. 11G, Slice1, denoted as an initial segment (1143), is assigned to categorizer queue 3 based on load balancing (1146). Since Slice1 is denoted as an initial segment, the event comprising Slice1 (Event1) is also assigned to categorizer queue 3 and this assignment in stored (1148) in a cache 1149. Slice1 is stored in memory (e.g., a location within database 1155) associated with categorizer 3 (1151) and is eventually processed (1154) by categorizer3 1153 (e.g., when it reaches the top of the queue). Next, Slice2 1132, denoted as a non-initial segment of Event1 (1144), is obtained and the cache is checked to determine which queue Event1 was assigned (1147). In accordance with the determination that Event1 was assigned to categorizer queue 3, Slice2 is stored in memory associated with categorizer 3 (1152) and is processed in turn (1154). One or more additional segments are optionally processed in a similar manner as Slice2. Once SliceN 1142, denoted as the final segment of Event1 (1145), is obtained, it is processed in a similar manner as Slice2, and Event1 is marked as completed. In some implementations, as SliceN is being processed (or upon completion of it being processed) the assignment of Event1 in the cache 1149, and the memory locations used to store the segments of Event1 in the database 1155, are cleared and/or marked as available (e.g., available to be used for subsequent events).

Figure 12A:
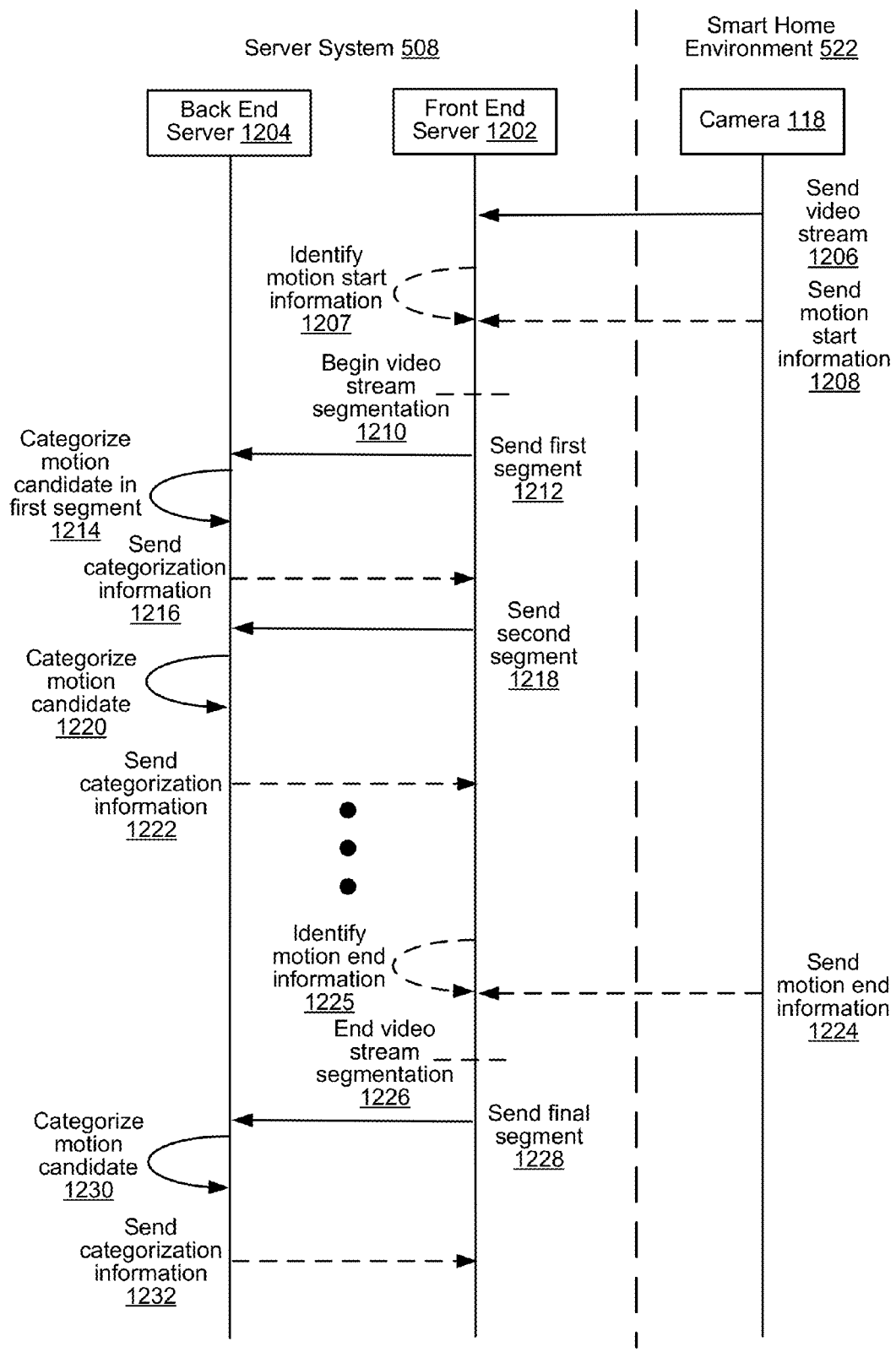
FIG. 12A illustrates a representative system and process for segmenting and categorizing a motion event candidate, in accordance with some implementations.

FIG. 12A illustrates a representative system and process for segmenting and categorizing a motion event candidate, in accordance with some implementations. As shown in FIG. 12A, server system 508 optionally includes a front end server 1202 and a back end server 1204 and smart home environment 522 includes a camera 118. In some implementations, the back end server is separate and distinct from the server system 508 (not shown). In some implementations, the back end server 1204 includes the event categorizer 7148 and the front end server 1202 includes the event processor 7146 (FIG. 7A).

To start the process, the camera sends a video stream to the front end server 1202 of server system 508 (1206). Next, either the front end server 1202 identifies motion start information (1207) or the camera 118 identifies the motion start information and sends it to the front end server 1202 (1208). Once the motion start information is obtained, the front end server 1202 begins segmenting the video stream (1210) and sends the first segment to the back end server 1204 to be categorized (1212). The back end server 1204 categorizes the motion event candidate within the first segment (1214). Once the motion event candidate is categorized, the back end server 1204 either sends the categorization information back to the front end server (1216), or stores the categorization information locally, or both. This process is repeated for the second segment (1218, 1220, 1222) and any subsequent segments. Next, either the front end server 1202 identifies motion end information (1225) or the camera 118 identifies the motion end information and sends it to the front end server 1202 (1224). Once the motion end information is obtained, the front end server 1202 ends the video segmentation (1226) and sends the final segment to the back end server 1204 to be processed (1228). The back end server 1204 categorizes the motion event candidate in the final segment (1230) and optionally sends the categorization information back to the front end server (1232). In some implementations, after all individual segments have been categorized, multi-segment categorization is performed by either the front end server 1202 or the back end server 1204.

Figure 12B:
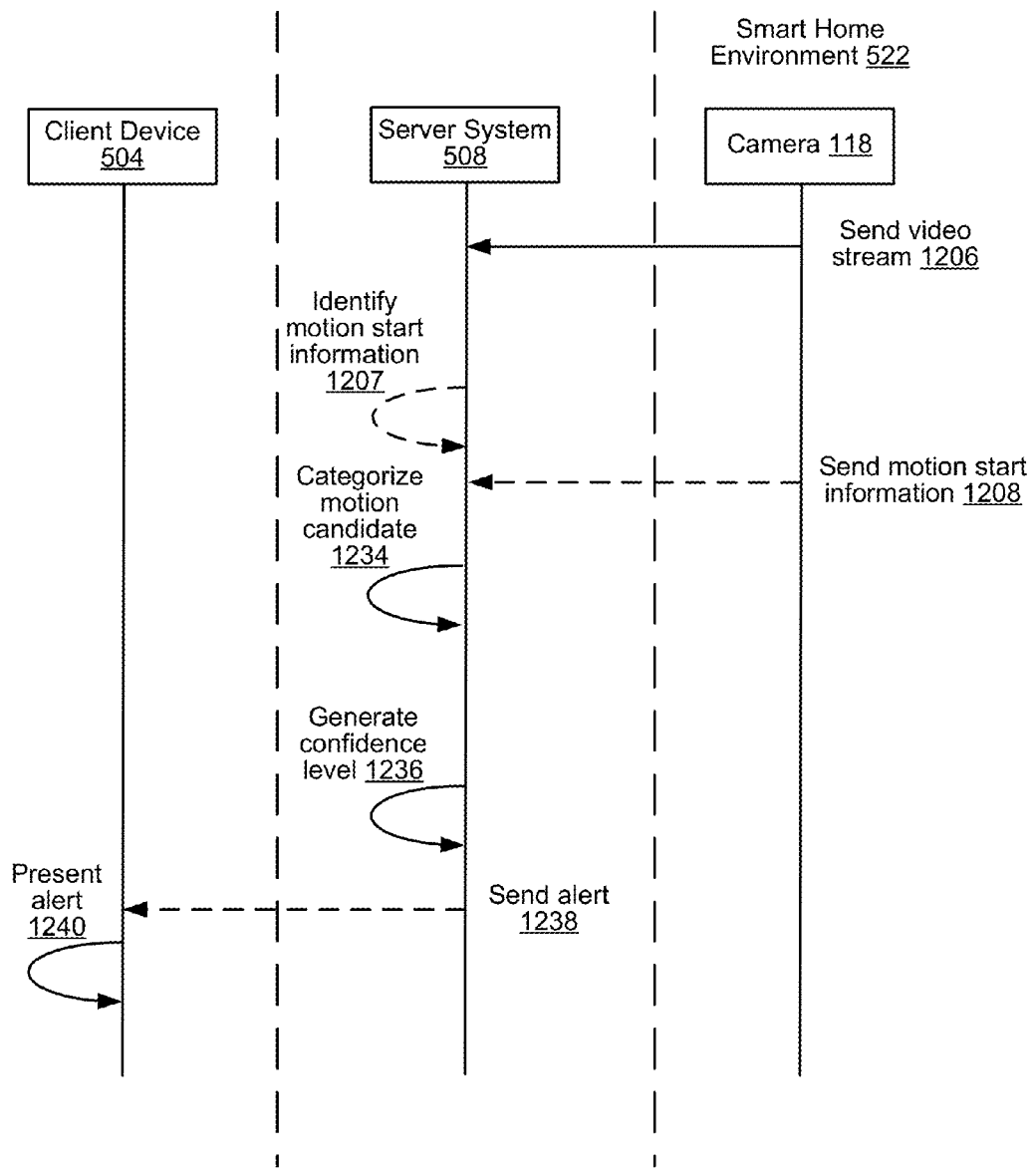
FIG. 12B illustrates a representative system and process for providing an alert for a motion event candidate, in accordance with some implementations.

FIG. 12B illustrates a representative system and process for providing an alert for a motion event candidate, in accordance with some implementations. As shown in FIG. 12B, smart home environment 522 includes a camera 118. Camera 118 is communicatively coupled to server system 508, which in turn is communicatively coupled to client device 504. In some implementations, client device 504 is communicatively coupled to camera 118. In some implementations, camera 118 performs the operations shown in FIG. 12B to be performed by server system 508. In some implementations, server system 508 includes a front end server 1202 and a back end server 1204 as shown in FIG. 12A.

As discussed above with respect to FIG. 12A, the camera sends a video stream to the server system 508 (1206). Next, either the front end server 1202 identifies motion start information (1207) or the camera 118 identifies the motion start information and sends it to the front end server 1202 (1208). In some implementations, camera 118 detects a motion start event and sends video stream (1206) to server system 508 in response to detecting the motion start event. The server system 508 categorizes (1234) the motion event candidate and generates (1236) a confidence level for the categorization. For example, the server system 508 categorizes an event candidate as "a person walking past the living room window" and generates a confidence level of 84% for the categorization. In this example, the confidence level is based on a person detection algorithm accurately recognizing the motion entity as a person walking. After categorizing (1234) the motion event candidate and generating the confidence level (1236), the server system 508 sends (1238) an alert, or alert information such as the assigned category and confidence level, to the client device 504. In some implementations, the server system 508 sends the alert, or alert information, to multiple client devices. The client device 504 receives the alert, or alert information, and presents (1240) an alert to a user of the client device. In some implementations, presenting the alert comprises displaying a user interface such as user interface 1400 in FIG. 14A. In some implementations, presenting the alert includes generating an audio alert. In some implementations, presenting the alert includes causing the client device to vibrate. In some implementations, presenting the alert includes activing one or more lights on the client device. In some implementations, server system 508 sends updated alert information and the client device either presents a new alert or updates a previous alert based on the updated alert information.

Figure 13A:
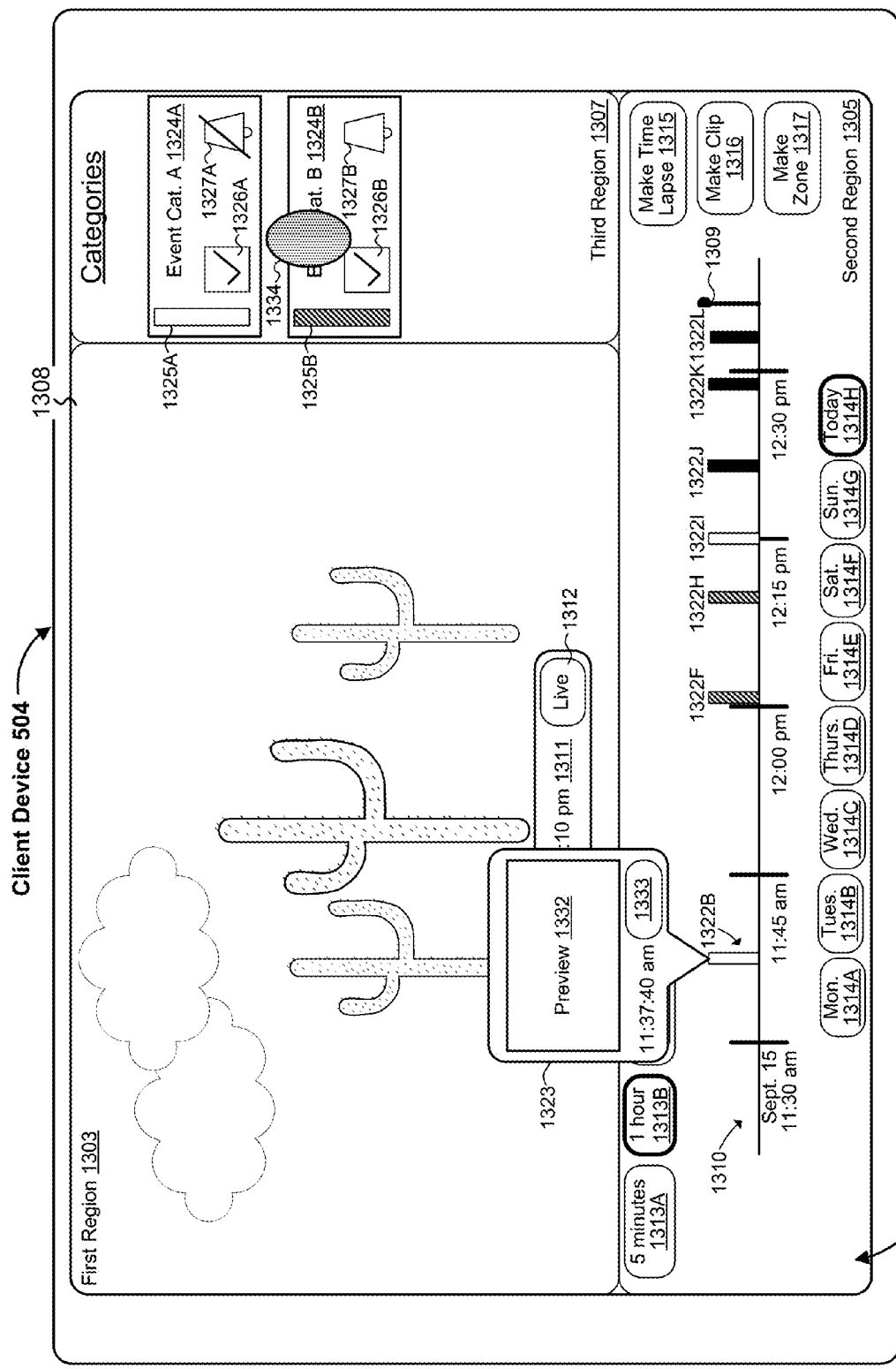
FIGS. 13A-13C illustrate example user interfaces on a client device for reviewing and revising motion events, in accordance with some implementations.
Figure 13B:
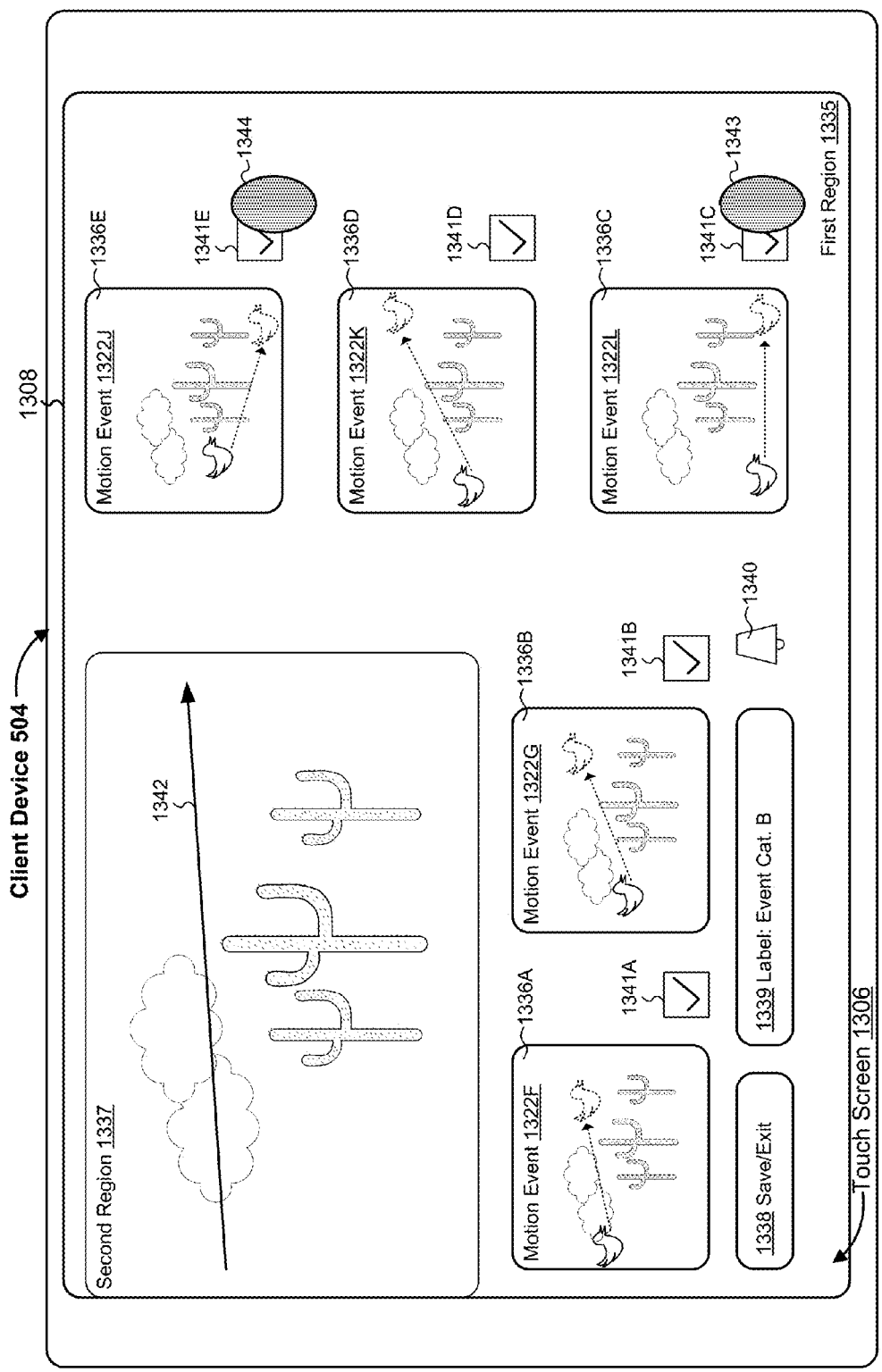
Figure 13C:
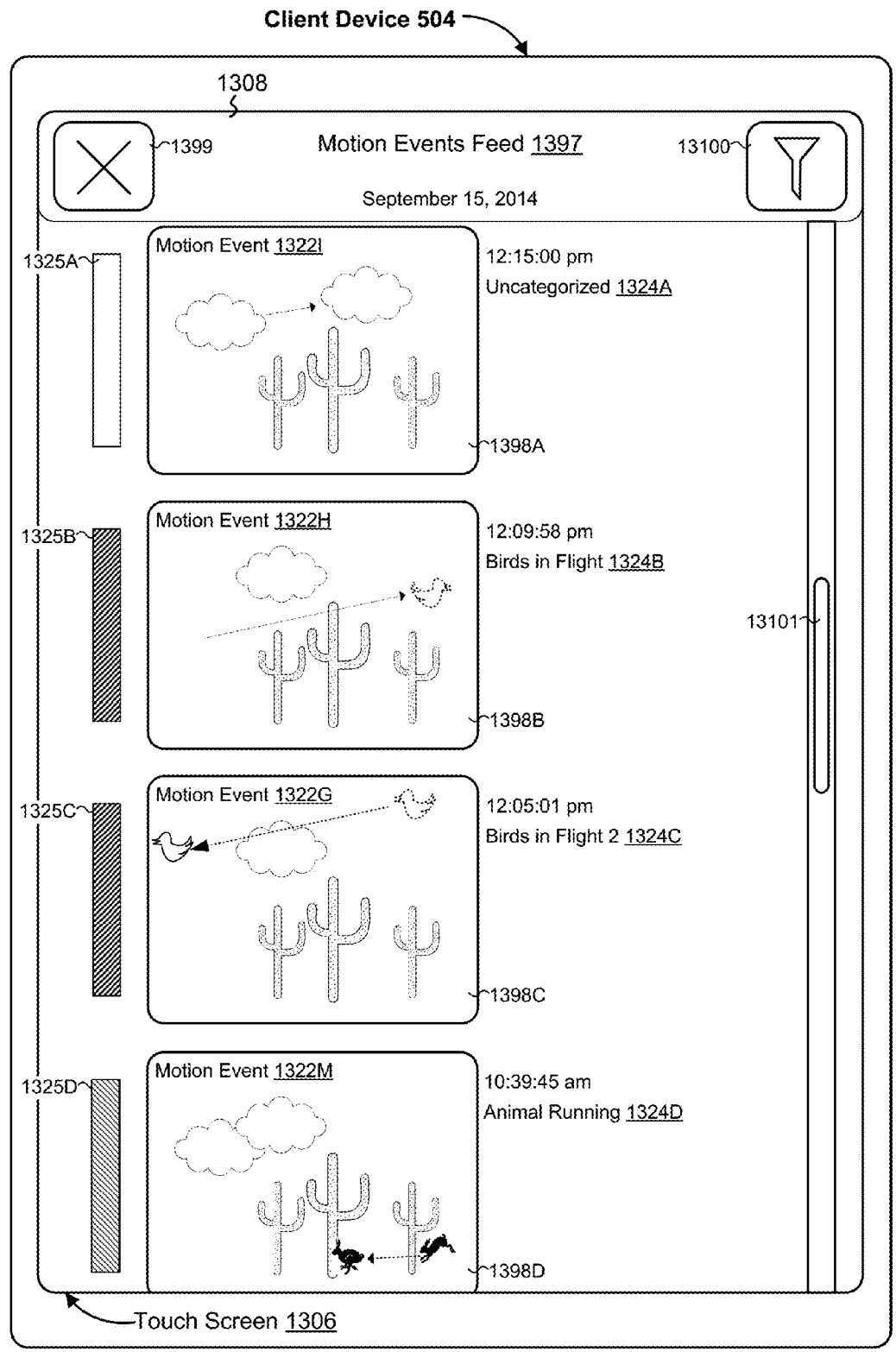

Attention is now directed towards implementations of user interfaces and associated processes that may be implemented on a respective client device 504. In some implementations, the client device 504 includes one or more speakers enabled to output sound, zero or more microphones enabled to receive sound input, and a touch screen 1306 enabled to receive one or more contacts and display information (e.g., media content, webpages and/or user interfaces for an application). FIGS. 13A-13C illustrate example user interfaces for monitoring and facilitating review of motion events in accordance with some implementations.

Although some of the examples that follow will be given with reference to inputs on touch screen 1306 (where the touch sensitive surface and the display are combined), in some implementations, the device detects inputs on a touch-sensitive surface that is separate from the display. In some implementations, the touch sensitive surface has a primary axis that corresponds to a primary axis on the display. In accordance with these implementations, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some implementations, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIGS. 13A-13C show user interface 1308 displayed on client device 504 (e.g., a tablet, laptop, mobile phone, or the like); however, one skilled in the art will appreciate that the user interfaces shown in FIGS. 13A-13C may be implemented on other similar computing devices.

For example, the client device 504 is the portable electronic device 166 (FIG. 1) such as a laptop, tablet, or mobile phone. Continuing with this example, the user of the client device 504 (sometimes also herein called a "reviewer") executes an application (e.g., the client-side module 502, FIG. 5) used to monitor and control the smart home environment 100 and logs into a user account registered with the smart home provider system 164 or a component thereof (e.g., the server system 508, FIGS. 5 and 7). In this example, the smart home environment 100 includes the one or more cameras 118, whereby the user of the client device 504 is able to control, review, and monitor video feeds from the one or more cameras 118 with the user interfaces for the application displayed on the client device 504 shown in FIGS. 13A-13C.

FIG. 13A illustrates the client device 504 displaying a first implementation of a video monitoring user interface (UI) of the application on the touch screen 1306. In FIG. 13A, the video monitoring UI includes three distinct regions: a first region 1303, a second region 1305, and a third region 1307. In FIG. 13A, the first region 1303 includes a video feed from a respective camera among the one or more camera 118 associated with the smart home environment 100. For example, the respective camera is located on the back porch of the user's domicile or pointed out of a window of the user's domicile. The first region 1303 includes the time 1311 of the video feed being displayed in the first region 1303 and also an indicator 1312 indicating that the video feed being displayed in the first region 1303 is a live video feed.

In FIG. 13A, the second region 1305 includes an event timeline 1310 and a current video feed indicator 1309 indicating the temporal position of the video feed displayed in the first region 1303 (i.e., the point of playback for the video feed displayed in the first region 1303). In FIG. 13A, the video feed displayed in the first region 1303 is a live video feed from the respective camera. In some implementations, the video feed displayed in the first region 1303 may be previously recorded video footage. For example, the user of the client device 504 may drag the indicator 1309 to any position on the event timeline 1310 causing the client device 504 to display the video feed from that point in time forward in the first region 1303. In another example, the user of the client device 504 may perform a substantially horizontal swipe gesture on the event timeline 1310 to scrub between points of the recorded video footage causing the indicator 1309 to move on the event timeline 1310 and also causing the client device 504 to display the video feed from that point in time forward in the first region 1303.

The second region 1305 also includes affordances 1313 for changing the scale of the event timeline 1310: a 5 minute affordance 1313A for changing the scale of the event timeline 1310 to 5 minutes and a 1 hour affordance 1313B for changing the scale of the event timeline 1310 to 1 hour. In FIG. 13A, the scale of the event timeline 1310 is 1 hour as evinced by the darkened border surrounding the 1 hour affordance 1313B and also the temporal tick marks shown on the event timeline 1310. The second region 1305 also includes affordances 1314 for changing the date associated with the event timeline 1310 to any day within the preceding week: Monday affordance 1314A, Tuesday affordance 1314B, Wednesday affordance 1314C, Thursday affordance 1314D, Friday affordance 1314E, Saturday affordance 1314F, Sunday affordance 1314G, and Today affordance 1314H. In FIG. 13A, the event timeline 1310 is associated with the video feed from today as evinced by the darkened border surrounding Today affordance 1314H. In some implementations, an affordance is a user interface element that is user selectable or manipulable on a graphical user interface.

In FIG. 13A, the second region 1305 further includes: "Make Time-Lapse" affordance 1315, which, when activated (e.g., via a tap gesture), enables the user of the client device 504 to select a portion of the event timeline 1310 for generation of a time-lapse video clip; "Make Clip" affordance 1316, which, when activated (e.g., via a tap gesture), enables the user of the client device 504 to select a motion event or a portion of the event timeline 1310 to save as a video clip; and "Make Zone" affordance 1317, which, when activated (e.g., via a tap gesture), enables the user of the client device 504 to create a zone of interest on the current field of view of the respective camera. In some embodiments, the time-lapse video clip and saved non-time-lapse video clips are associated with the user account of the user of the client device 504 and stored by the server system 508 (e.g., in the video storage database 516, FIG. 5). In some embodiments, the user of the client device 504 is able to access his/her saved time-lapse video clip and saved non-time-lapse video clips by entering the login credentials for his/her for user account. In FIG. 13A, the video monitoring UI also includes a third region 1307 with a list of categories with recognized event categories and created zones of interest.

In some implementations, the time-lapse video clip is generated by the client device 504, the server system 508, or a combination thereof. In some implementations, motion events within the selected portion of the event timeline 1310 are played at a slower speed than the balance of the selected portion of the event timeline 1310. In some implementations, motion events within the selected portion of the event timeline 1310 that are assigned to enabled event categories and motion events within the selected portion of the event timeline 1310 that touch or overlap enabled zones are played at a slower speed than the balance of the selected portion of the event timeline 1310 including motion events assigned to disabled event categories and motion events that touch or overlap disabled zones.

FIG. 13A also illustrates the client device 504 displaying the event timeline 1310 in the second region 1305 with event indicators 1322B, 1322F, 1322H, 1322I, 1322J, 1322K, and 1322L corresponding to detected motion events. In some implementations, the location of a respective event indicator 1322 on the event timeline 1310 correlates with the time at which a motion event corresponding to the respective event indicator 1322 was detected. The detected motion events corresponding to the event indicators 1322B and 1322I are categorized as Cat. A events (as denoted by the indicators' solid white fill) and the detected motion events corresponding to event indicators 1322F, 1322H, 1322J, 1322K, and 1322L are categorized as Cat. B events (as denoted by the indicators' striping). In some implementations, for example, the list of categories in the third region 1307 includes an entry for categorized motion events with a filter affordance for enabling/disabling display of event indicators for the corresponding categories of motion events on the event timeline 1310.

In FIG. 13A, the list of categories in the third region 1307 includes an entry 1324A for event category A and an entry for event category B. Each entry includes: a display characteristic indicator (1325A and 1325B) representing the display characteristic for event indicators corresponding to motion events assigned to the respective event category; an indicator filter (1326A and 1326B) for enabling/disabling display of event indicators on the event timeline 1310 for motion events assigned to the respective event category; and a notifications indicator (1327A and 1327B) for enabling/disabling notifications sent in response to detection of motion events assigned to the respective event category. In FIG. 13A, display of event indicators for motion events corresponding to event categories A and B are enabled, as evinced by the check mark in indicator filters 1326A and 1326B. FIG. 13A further shows the notifications indicator 1327A in the third region 1307 as disabled, shown by the line through the notifications indicator 1327A. In some implementations, the notifications are messages sent by the server system 508 (FIG. 5) via email to an email address linked to the user's account and/or via a SMS or voice call to a phone number linked to the user's account. In some implementations, the notifications are audible tones or vibrations provided by the client device 504.

FIG. 13A further illustrates the client device 504 displaying a dialog box 1323 for a respective motion event correlated with the event indicator 1322B (e.g., in response to detecting selection of the event indicator 1322B). In some implementations, the dialog box 1323 may be displayed in response to sliding or hovering over the event indicator 1322B. In FIG. 13A, the dialog box 1323 includes the time the respective motion event was detected (e.g., 11:37:40 am) and a preview 1332 of the respective motion event (e.g., a static image, a series of images, or a video clip). In FIG. 13A, the dialog box 1323 also includes an affordance 1333, which, when activated (e.g., with a tap gesture), causes the client device 504 to display an editing user interface (UI) for the event category to which the respective motion event is assigned (if any) and/or the zone or interest which the respective motion event touches or overlaps (if any). FIG. 13A also illustrates the client device 504 detecting a contact 1334 (e.g., a tap gesture) at a location corresponding to the entry 1324B for event category B on the touch screen 1306.

FIG. 13B illustrates the client device 504 displaying an editing user interface (UI) for event category B in response to detecting selection of the entry 1324B in FIG. 13A. In FIG. 13B, the editing UI for event category B includes two distinct regions: a first region 1335; and a second region 1337. The first region 1335 includes representations 1336 (sometimes also herein called "sprites") of motion events assigned to event category B, where a representation 1336A corresponds to the motion event correlated with the event indicator 1322F, a representation 1336B corresponds to the motion event correlated with an event indicator 1322G, a representation 1336C corresponds to the motion event correlated with the event indicator 1322L, a representation 1336D corresponds to the motion event correlated with the event indicator 1322K, and a representation 1336E corresponds to the motion event correlated with the event indicator 1322J. In some implementations, each of the representations 1336 is a series of frames or a video clip of a respective motion event assigned to event category B. For example, in FIG. 13B, each of the representations 1336 corresponds to a motion event of a bird flying from left to right across the field of view of the respective camera. In FIG. 13B, each of the representations 1336 is associated with a checkbox 1341. In some implementations, when a respective checkbox 1341 is unchecked (e.g., with a tap gesture) the motion event corresponding to the respective checkbox 1341 is removed from the event category B and, in some circumstances, the event category B is re-computed based on the removed motion event. For example, the checkboxes 1341 enable the user of the client device 504 to remove motion events incorrectly assigned to an event category so that similar motion events are not assigned to the event category in the future.

In FIG. 13B, the first region 1335 further includes: a save/exit affordance 1338 for saving changes made to event category B or exiting the editing UI for event category B; a label text entry box 1339 for renaming the label for the event category from the default name ("event category B") to a custom name; and a notifications indicator 1340 for enabling/disabling notifications sent in response to detection of motion events assigned to event category B. In FIG. 13B, the second region 1337 includes a representation of the video feed from the respective camera with a linear motion vector 1342 representing the typical path of motion for motion events assigned event category B. In some implementations, the representation of the video feed is a static image recently captured from the video feed or the live video feed. FIG. 13B also illustrates the client device 504 detecting a contact 1343 (e.g., a tap gesture) at a location corresponding to the checkbox 1341C on the touch screen 1306 and a contact 1344 (e.g., a tap gesture) at a location corresponding to the checkbox 1341E on the touch screen 1306. For example, the user of the client device 504 intends to remove the motion events corresponding to the representations 1336C and 1336E as neither shows a bird flying in a west to northeast direction.

FIG. 13C illustrates the client device 504 displaying a first portion of a motion events feed 1397 (e.g., in response to detecting selection of the "Motion Events Feed" affordance). In FIG. 13C, the motion events feed 1397 includes representations 1398 of motion events. In FIG. 13C, each of the representations 1398 is associated with a time at which the motion event was detected, and each of the representations 1398 is associated with an event category to which it is assigned to the motion event (if any) and/or a zone which it touches or overlaps (if any). In FIG. 13C, each of the representations 1398 is associated with a unique display characteristic indicator 1325 representing the display characteristic for the event category to which it is assigned (if any) and/or the zone which it touches or overlaps (if any). For example, the representation 1398A corresponds to a respective motion event that was detected at 10:39:45 am.

In FIG. 13C, the motion events feed 1397 also includes: an exit affordance 1399, which, when activated (e.g., via a tap gesture), causes the client device 504 to display a previous user interface (e.g., the video monitoring UI in FIG. 13A); and a filtering affordance 13100, which, when activated (e.g., via a tap gesture), causes the client device 504 to display a filtering pane. In FIG. 13C, the motion events feed 1397 further includes a scroll bar 13101 for viewing the balance of the representations 1398 in the motion events feed 1397.

Figure 14A:
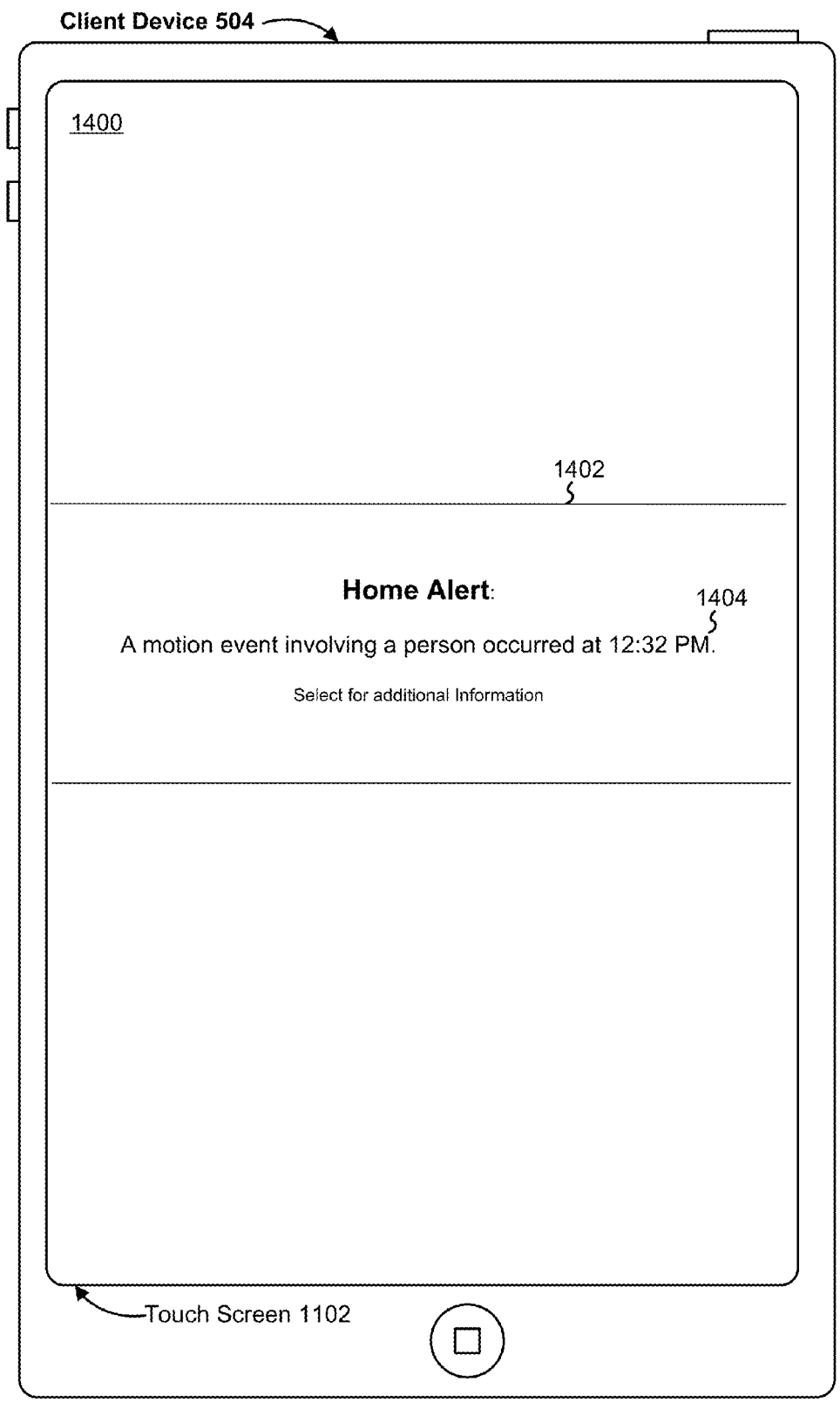
FIG. 14A illustrates a representative user interface for providing event alerts, in accordance with some implementations.

FIG. 14A illustrates user interface 1400 for providing event alerts, in accordance with some implementations. FIG. 14A shows client device 504 displaying user interface 1400 on touch screen 1102. The user interface 1400 includes alert section 1402 displaying a home alert. The home alert includes an alert message 1404 indicating the category of the motion event (e.g., a person event category) and the time the motion event occurred (12:32 PM). In some implementations, user interface 1400 comprises a home screen. In some implementations, user interface 1400 comprises a lock screen. In some implementations, in response to a user selection of alert section 1402, a smart home application is opened or launched (e.g., utilizing user interface module 826, FIG. 8). In some implementations, in response to a user selection of alert section 1402, a video monitoring user interface is displayed, such as user interface 1308 in FIG. 13A. In some implementations, the user selection of the alert section 1402 comprises a user swipe gesture over the portion of the touch screen 1102 corresponding to the alert section 1402. In some implementations, the user selection of the alert section 1402 comprises a user tap gesture, or double-tap gesture, over the portion of the touch screen 1102 corresponding to the alert section 1402. In some implementations, the alert includes additional information not shown in FIG. 14A, such as information regarding the smart devices involved in the motion event (e.g., the camera that captured the motion event) and/or information regarding the duration of the motion event. In some implementations, alert section 1402 includes one or more of: an affordance for opening a smart home application that presented to the alert, an affordance for initiating playback of the motion event, an affordance for ignoring or cancelling the alert, and an affordance for snoozing the alert.

In some implementations, user interface 1400 includes a plurality of alert sections, each alert section corresponding to a distinct event. For example, user interface 1400 includes a first alert section for a first alert corresponding to a motion event that occurred at 12:10 PM, and a second alert section for a second alert corresponding to an audio event that occurred at 12:45 PM. In some implementations, the plurality of alert sections is sorted chronologically (e.g., with most recent alerts displayed on top). In some implementations, the plurality of alert sections is sorted by importance.

Figure 14B:
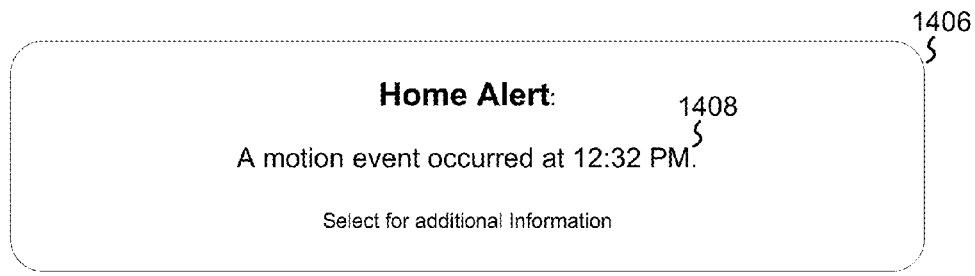
FIGS. 14B-14C illustrate example event alerts, in accordance with some implementations.
Figure 14B:
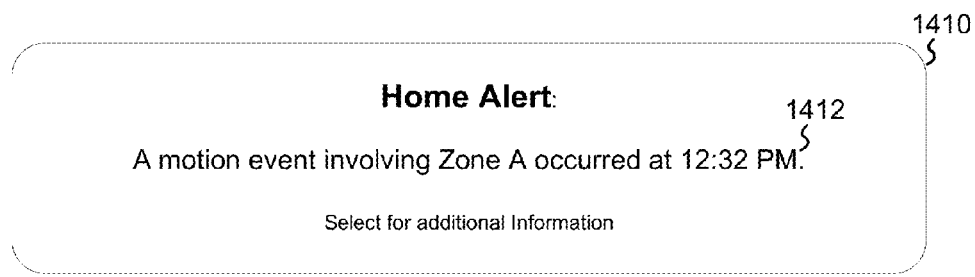
Figure 14B:
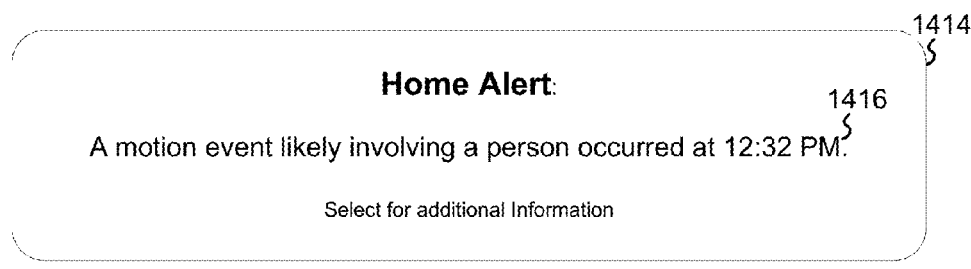
Figure 14B:
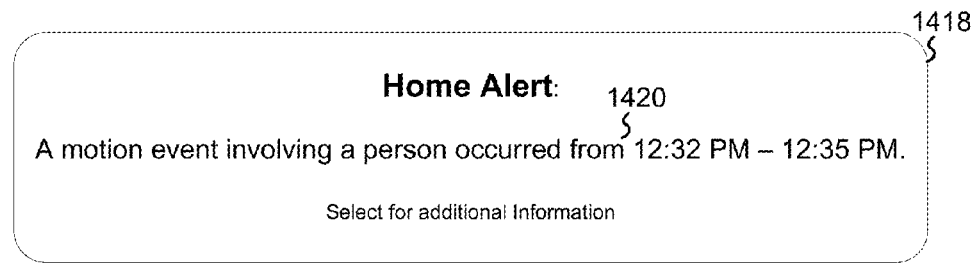
Figure 14B:
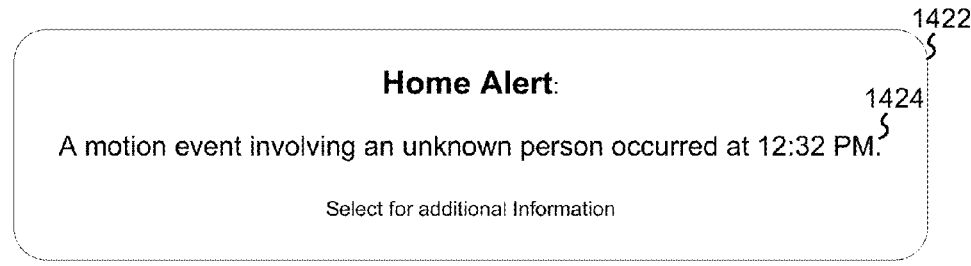
Figure 14C:
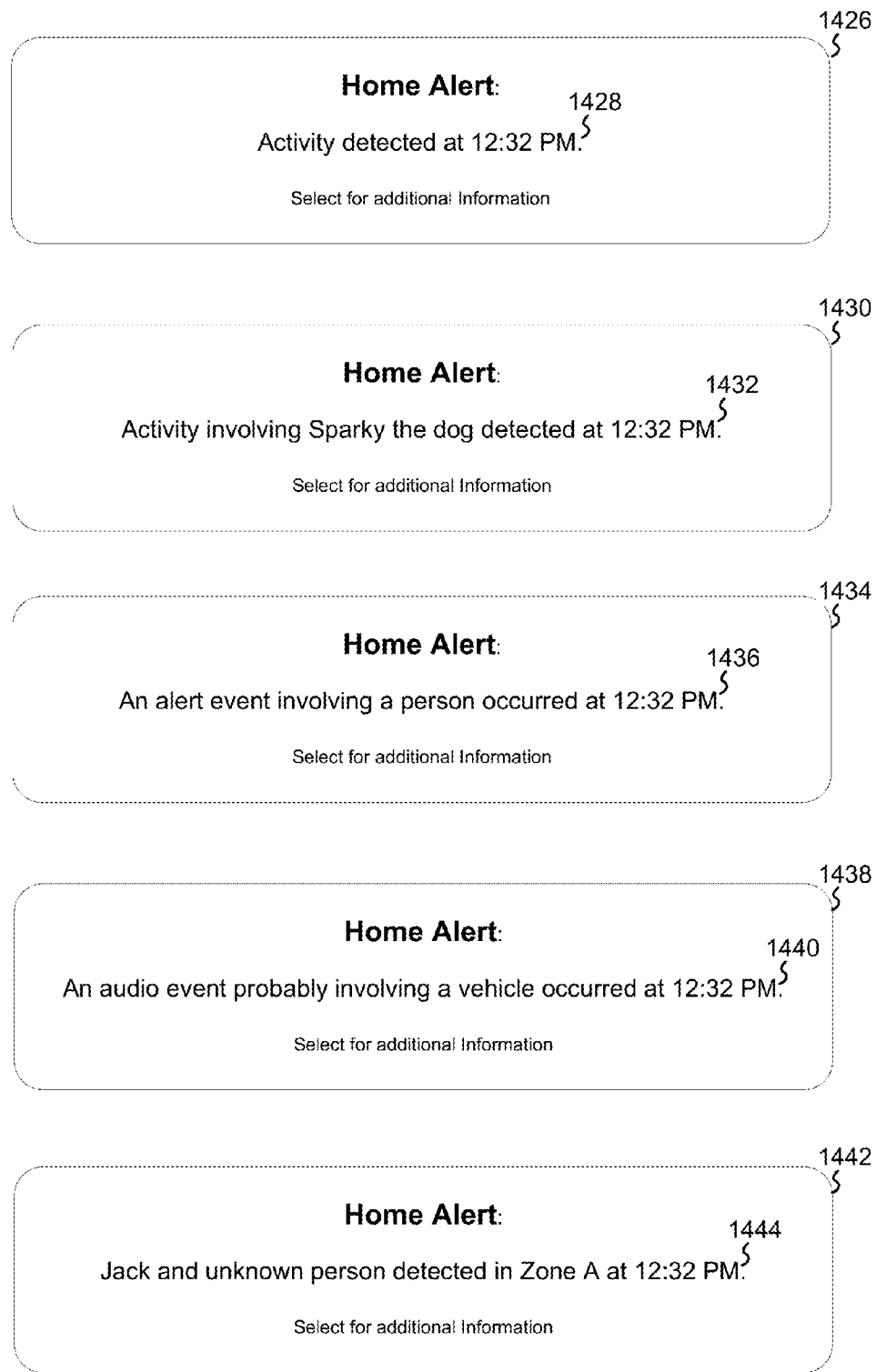

FIGS. 14B-14C illustrate example event alerts, in accordance with some implementations. Alert 1406 includes alert message 1408 indicating that a general motion event had occurred at a particular time (12:32 PM). In some implementations, alert 1406 is generated in accordance with a determination that the motion event included no particular entities or objects. In some implementations, alert 1406 is generated in accordance with a determination that no particular entities or objects in the motion event were recognized with sufficient confidence (e.g., above a predetermined confidence threshold).

Alert 1410 includes alert message 1412 indicating that a motion event involving a particular zone (Zone A) had occurred at 12:32 PM. In some implementations, the particular zone is a zone of interest denoted by a user of the smart home application. In some implementations, "Zone A" is a user-defined title for the particular zone.

Alert 1414 includes alert message 1416 indicating that a motion event likely involving a person had occurred at 12:32 PM. Thus, alert 1414 conveys information regarding both an event category for the motion event and the corresponding confidence level for the category. For example, an instance of a person was detected in the motion event with a corresponding confidence level above confidence threshold 71714 (FIG. 7C) but below confidence threshold 71712.

Alert 1418 includes alert message 1420 indicating that a motion event involving a person had occurred during a particular time period (12:32 PM-12:35 PM). Thus, alert 1414 conveys information regarding both an event category for the motion event and a duration of the motion event. In some implementations, the alert message 1420 corresponds to an event category with a high corresponding confidence level, such as a confidence level above confidence threshold 71712 (FIG. 7C). In accordance with some implementations, alert 1414 is generated as a first alert for a particular motion event and alert 1418 is generated as a second alert or updated alert for the particular motion event. For example, alert 1414 is generated based on an initial event category and corresponding confidence level for the motion event, such as an event category assigned after analyzing a few seconds (e.g., 5, 10, 15, or 30 seconds) of the motion event. In this example, alert 1418 is generated after analyzing the entire 3 minute event.

Alert 1422 includes alert message 1424 indicating that a motion event involving an unknown person had occurred at a particular time (12:32 PM). In some implementations, an unknown person comprises an unrecognized detected person. For example, a person is detected, but the person cannot be identified via facial recognition or otherwise. In some implementations, alert 1422 is generated in accordance with a determination that the person is not recognized as any particular person with a confidence score meeting particular criteria. For example, the detected person is determined to be a known person, "John", with a confidence score of 48 and is determined to be "Paul" with a confidence score of 36. In this example, a confidence score below a confidence threshold (e.g., confidence threshold 71716, FIG. 7C) results in the detected person not being identified as the known person. Thus, the detected person is not identified as either "John" or "Paul" and the corresponding alert message 1424 states "unknown person."

Alert 1426 includes alert message 1428 indicating that activity was detected at a particular time (12:32 PM). In some implementations, alert message 1428 is equivalent to alert message 1408. In some implementations, alert 1428 is generated in accordance with a determination that the activity included no particular entities or objects. In some implementations, alert 1428 is generated in accordance with a determination that no particular entities or objects in the motion event were recognized with sufficient confidence (e.g., above a predetermined confidence threshold).

Alert 1430 includes alert message 1432 indicating that activity involving a particular animal (Sparky the dog) was detected at a particular time (12:32 PM). In some implementations, alert message 1432 corresponds to entity detection identifying a dog entity in the activity (e.g., motion event) and entity recognition identifying the dog entity as Sparky the dog. In some implementations, alert message 1432 corresponds to a particular event category for Sparky the dog.

Alert 1434 includes alert message 1436 indicating that an alert event involving a person occurred at a particular time (12:32 PM). In some implementations, an alert event comprises an event detected by a non-camera smart device, such as a smart thermostat, a smart hazard detector, a smart door lock, or the like. For example, a smart hazard detector detects smoke and triggers an alert event. In some implementations, an alert event triggered by a non-camera smart device is associated with a particular portion of a video feed from a camera. For example, an alert event triggered by a smart door lock is associated with a camera feed from a camera directed at the door in which the smart door lock is installed. Thus, a user (e.g., a user of the smart home application) may view video footage of the front door for a period of time immediately after the alert triggered by the smart door lock. In some implementations, the alert event was determined to involve a person based on an analysis of information from one or more smart devices, such as visual data from a camera or audio data from a microphone. In some implementations, alert message 1436 corresponds to a high confidence score for the person detection, such as a confidence score above confidence threshold 71712 (FIG. 7C).

Alert 1438 includes alert message 1440 indicating that an audio event, probably involving a vehicle, occurred at a particular time (12:32 PM). In some implementations, an audio event comprises an event detected by one or more microphones (e.g., one or more microphones of a smart device 204). In some implementations, an audio event detected by a microphone is associated with a particular portion of a video feed from a camera. For example, an audio event triggered by a microphone on a smart thermostat is associated with a camera feed from a camera located in the vicinity of the smart thermostat (e.g., within the same room or space). Thus, a user may view video footage for a period of time immediately before, during, and/or immediately after the detected audio event. In some implementations, the audio event was determined to probably involve a vehicle based on an analysis of information from one or more smart devices, such as visual data from a camera or the detected audio data. In some implementations, alert message 1440 corresponds to a confidence score for the object detection meeting certain criteria, such as within a particular confidence range. For example, a confidence score for the vehicle detection is above confidence threshold 71714, but below confidence threshold 71712 (FIG. 7C).

Alert 1442 includes alert message 1444 indicating that an event involving an identified person (Jack) and an unknown person occurred within a particular zone of interest (Zone A) at a particular time (12:32 PM). In some implementations, the event comprises one or more of: a motion event, an audio event, and an alert event. In some implementations, the alert message 1444 indicates that the person denoted as "Jack" was identified with a high confidence level, such as a confidence score for the person recognition above confidence threshold 71712 (FIG. 7C). In some implementations, the alert message 1444 indicates that the person denoted as "unknown person" was either not identified or not identified with a high enough confidence level. For example, the unknown person was not identified as being any particular person with a corresponding confidence score above confidence threshold 71716 (FIG. 7C). In some implementations, the alert message 1444 indicates that the event occurred at least in part within Zone A. In some implementations, Zone A corresponds to a user-defined zone of interest. In some implementations, Zone A corresponds to a recognized zone within a scene (e.g., a front door of a dwelling). In some implementations, alert 1442 corresponds to an event category for events involving a known person, an unknown person, and a zone of interest. In some implementations, alert 1442 corresponds to multiple event categories, such as an event category for events involving a recognized person, an event category for events involving an unknown person, and an event category for events involving a zone of interest.

In some implementations, one or more alert presentation characteristics are adjusted based on the corresponding event category. For example, alerts involving unknown persons, such as alert 1422, include an audio component whereas alerts involving known entities, such as alert 1430 do not include an audio component. In some implementations, one or more alert display characteristics are adjusted based on the corresponding event category. For example, alerts involving a zone of interest, such as alert 1410, include a colored border (e.g., a color corresponding to the particular zone of interest), whereas alerts not involving a zone of interest, such as alert 1408, include a black border. In some implementations, one or more alert presentation characteristics are adjusted based on the time since the event was detected (or occurred).

Figure 15A:
FIGS. 15A-15I illustrate examples of person detection in a video feed, in accordance with some implementations.
Figure 15B:
Figure 15C:

FIGS. 15A-15I illustrate examples of person detection in a video feed, in accordance with some implementations. FIGS. 15A-15C illustrate a multi-pass approach to person detection, in accordance with some implementations. FIG. 15A shows the results of an initial person detection analysis. In FIG. 15A two bounding boxes, bounding box 1502 and bounding box 1504, are displayed. The bounding boxes each correspond to an instance of a potential person based on the initial analysis. FIG. 15B shows a region 1506 selected for use with a second person detection analysis. Region 1506 is selected such that it encompasses both bounding box 1502 and bounding box 1504. In some implementations, region 1506 comprises a square region. In some implementations, region 1506 comprises a region with a rectangular shape, triangular shape, circular shape, and etcetera. In some implementations, multiple regions are selected (e.g., a region around each bounding box). In some implementations, a particular bounding box is the selected region. FIG. 15C shows the results of a second person detection analysis performed on region 1506. FIG. 15C shows bounding box 1508, corresponding to bounding box 1502, containing a detected person. FIG. 15C does not have a bounding box corresponding to bounding box 1504 as the second analysis determined that the jacket on the chair was not a person. Thus, the detected instance of the potential person within bounding box 1504 comprises a false positive. In some implementations, the region 1506 shown FIG. 15C is analyzed at a higher resolution during the second analysis than the region 1506 was analyzed during the first analysis. For example, the image shown in FIG. 15A (e.g., an image corresponding to the field of view of a camera) is analyzed with a resolution of 1280×720 and the image shown in FIG. 15C (e.g., an image corresponding to region 1506) is analyzed with a resolution of 1280×720. Thus, in this example, the resolution of region 1506 improves from FIG. 15A to FIG. 15C.

Figure 15D:
Figure 15E:
Figure 15F:

FIGS. 15D-15F illustrate a multi-pass approach to person detection, in accordance with some implementations. FIG. 15D shows the results of an initial person detection analysis.

In FIG. 15D three bounding boxes, bounding box 1510, bounding box 1512, and bounding box 1514, are displayed. The bounding boxes each correspond to an instance of a potential person based on the initial analysis. FIG. 15E shows a region 1516 selected for use with a second person detection analysis. Region 1516 is selected such that it encompasses both bounding box 1510 and bounding box 1514. In some implementations, the potential person in bounding box 1512 is identified as a false positive (e.g., based on a previous analysis such as the analysis of the image in FIG. 15C). In some implementations, a second region is selected to encompass bounding box 1512. In some implementations, region 1516 is selected such that it encompasses bounding boxes 1510, 1512, and 1514. FIG. 15F shows the results of a second person detection analysis performed on region 1516. FIG. 15F shows bounding box 1518, corresponding to bounding box 1510, containing a detected person; and bounding box 1520 corresponding to bounding box 1514 containing a second detected person.

Figure 15G:
Figure 15H:
Figure 15I:

FIGS. 15G-15I illustrate a multi-pass approach to person detection, in accordance with some implementations. FIG. 15G shows the results of an initial person detection analysis. In FIG. 15G two bounding boxes, bounding box 1522 and bounding box 1524, are displayed. The bounding boxes each correspond to an instance of a potential person based on the initial analysis. FIG. 15H shows a region 1526 selected for use with a second person detection analysis. Region 1526 is selected such that it encompasses both bounding box 1522 and bounding box 1524. FIG. 15I shows the results of a second person detection analysis performed on region 1526. FIG. 15I shows bounding box 1528, corresponding to bounding box 1522, containing a first detected person; and bounding box 1530 corresponding to bounding box 1524 containing a second detected person.

Figure 16A:
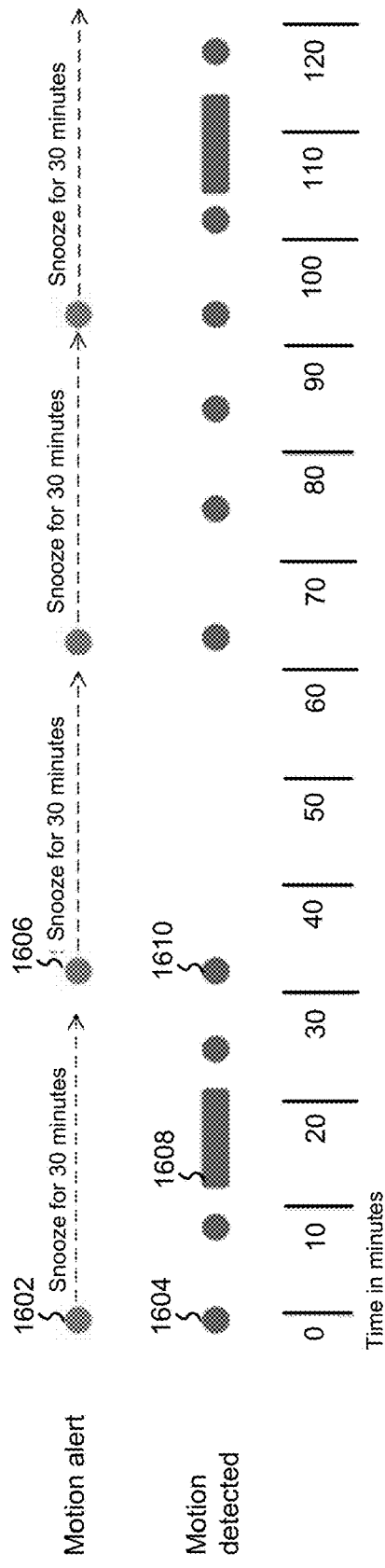
FIGS. 16A-16C illustrate examples of alert logic for use with some implementations.
Figure 16B:
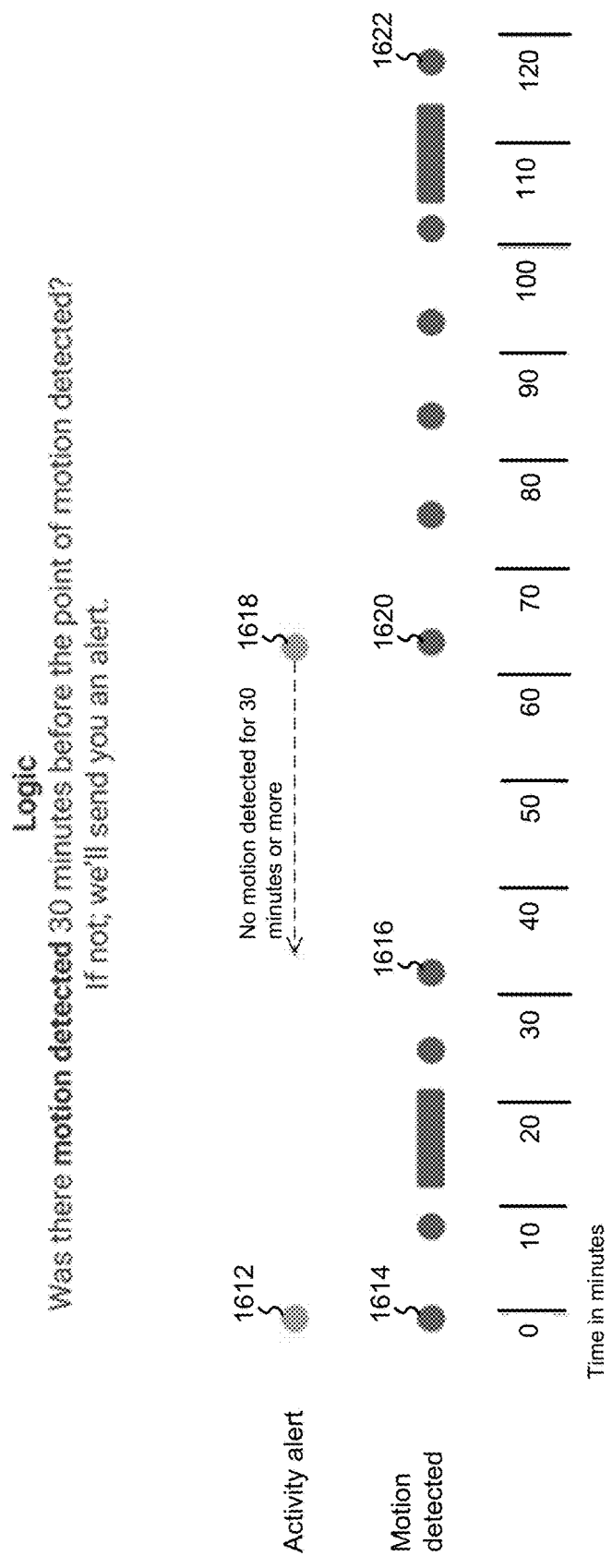
Figure 16C:
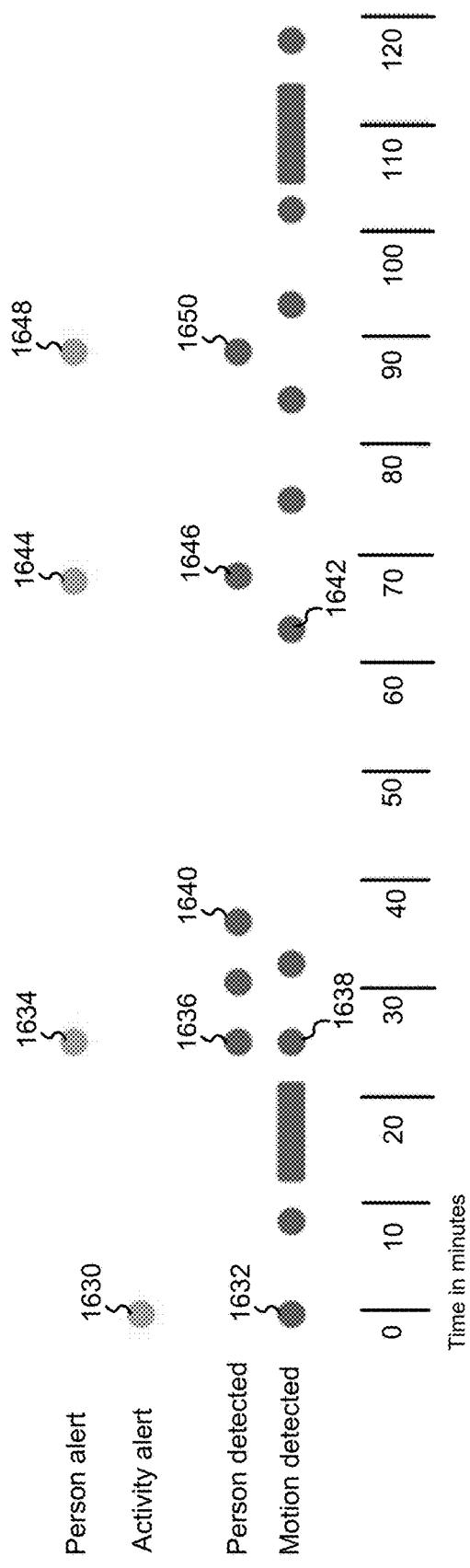

FIGS. 16A-16C illustrate examples of alert logic for use with some implementations. FIG. 16A shows an example of alert logic for use in a smart home system. As shown in FIG. 16A, after an alert has been generated, the system forgoes generating any subsequent alerts for a predetermined amount of time (e.g., 30 minutes). FIG. 16A shows motion 1604 detected at time 0 and generation of a corresponding motion alert 1602. FIG. 16A also shows subsequent motion, such as motion 1608, detected within 30 minutes after generation of motion alert 1602 and the system forgoing generating any corresponding alerts. FIG. 16A further shows motion 1610 detected at time 30 and generation of a corresponding motion alert 1606.

FIG. 16B shows another example of alert logic for use in a smart home system. As shown in FIG. 16B, when motion is detected, the system determines whether motion has been detected in a preceding predetermined amount of time (e.g., 30 minutes). If no motion has been detected in the preceding predetermined amount of time, the system generates an alert for the motion. FIG. 16B shows motion 1614 detected at time 0 and generation of a corresponding motion alert 1612. FIG. 16B also shows subsequent motion, such as motion 1616, detected within 30 minutes after any preceding motion, and the system forgoing generating any corresponding alerts. FIG. 16B further shows motion 1620 detected at time 63, more than 30 minutes after the previous motion 1616 at time 31, and generation of a corresponding motion alert 1618. FIG. 16B further shows a series of motion detected after motion 1620, including motion 1622, and the system forgoing generating any additional alerts.

In some implementations, motion is grouped into events and an alert is generated for each event. Thus, two instances of detected motion generate a single alert if it is determined that the two instances comprise a single motion event, and the two instances of detected motion generate two alerts if it is determined that the two instances comprise two distinct motion events.

FIG. 16C shows an example of alert logic with multiple types of alerts for use in a smart home system. As shown in FIG. 16C, the system detects both motion and persons. In some implementations, a person is detected when detected motion is determined to comprise an instance of a person with a sufficiently high confidence score, such as a confidence score above confidence threshold 71716 (FIG. 7C). In some implementations, person detection is performed independently of motion detection. In some implementations, person detection comprises analyzing individual images within the video stream to determine if any of the images contain a person.

FIG. 16C shows motion 1632 detected at time 0 and generation of a corresponding motion alert 1630. FIG. 16C also shows detected motion 1638 and a detected person 1636 at time 25. In response to the detected person, the system determines whether a person has been detected within a preceding predetermined amount of time (e.g., 10 minutes). In accordance with a determination that a person has not been detected within the preceding predetermined amount of time, the system generates person alert 1634. In some implementations, in accordance with a determination that multiple types of detections have occurred, the system generates only a single alert. In some implementations, the system generates an alert for the detection type with the highest priority. In some implementations, the system generates an alert for the detection type highest in a detection type hierarchy. FIG. 16C also shows a person 1640 detected at time 38 and the system forgoing generating an alert in accordance with a determination that a person had been detected within a preceding predetermined amount of time (e.g., 10 minutes).

FIG. 16C also shows motion 1642 detected at time 63 and the system forgoing generating an alert in accordance with a determination that either motion or a person had been detected within a preceding predetermined amount of time (e.g., 30 minutes). In the example of FIG. 16C, person 1640 is detected at time 38 and motion 1642 is detected at time 63 and thus the time between detections is 25 minutes, which is less than the 30 minute threshold for generating a motion alert. In some implementations, the system forgoes generating an alert in accordance with a determination that either a detection of the detection type or a detection type higher in a detection type hierarchy has been detected within a preceding predetermined amount of time. In some implementations, the system forgoes generating an alert in accordance with a sole determination that a detection of the detection type has been detected within a preceding predetermined amount of time.

FIG. 16C also shows a person 1646 detected at time 69 and the system generating person alert 1644 in accordance with a determination that a person has not been detected within a preceding predetermined amount of time (e.g., 10 minutes). In some implementations, distinct detection types correspond to distinct predetermined amounts of time. For example, a person detection corresponds to a 10 minute amount of time, an audio detection corresponds to a 20 minute amount of time, and a motion detection corresponds to a 30 minute amount of time. In some implementations, the predetermined amounts of time are stored in a database, such as server database 716 (FIG. 7A). In some implementations, the predetermined amounts of time comprise alert criteria 7172 (FIG. 7A). FIG. 16C also shows a person 1650 detected at time 89 and the system generating person alert 1648 in accordance with a determination that a person has not been detected within a preceding predetermined amount of time (e.g., 10 minutes).

Representative Processes

Figure 17A:
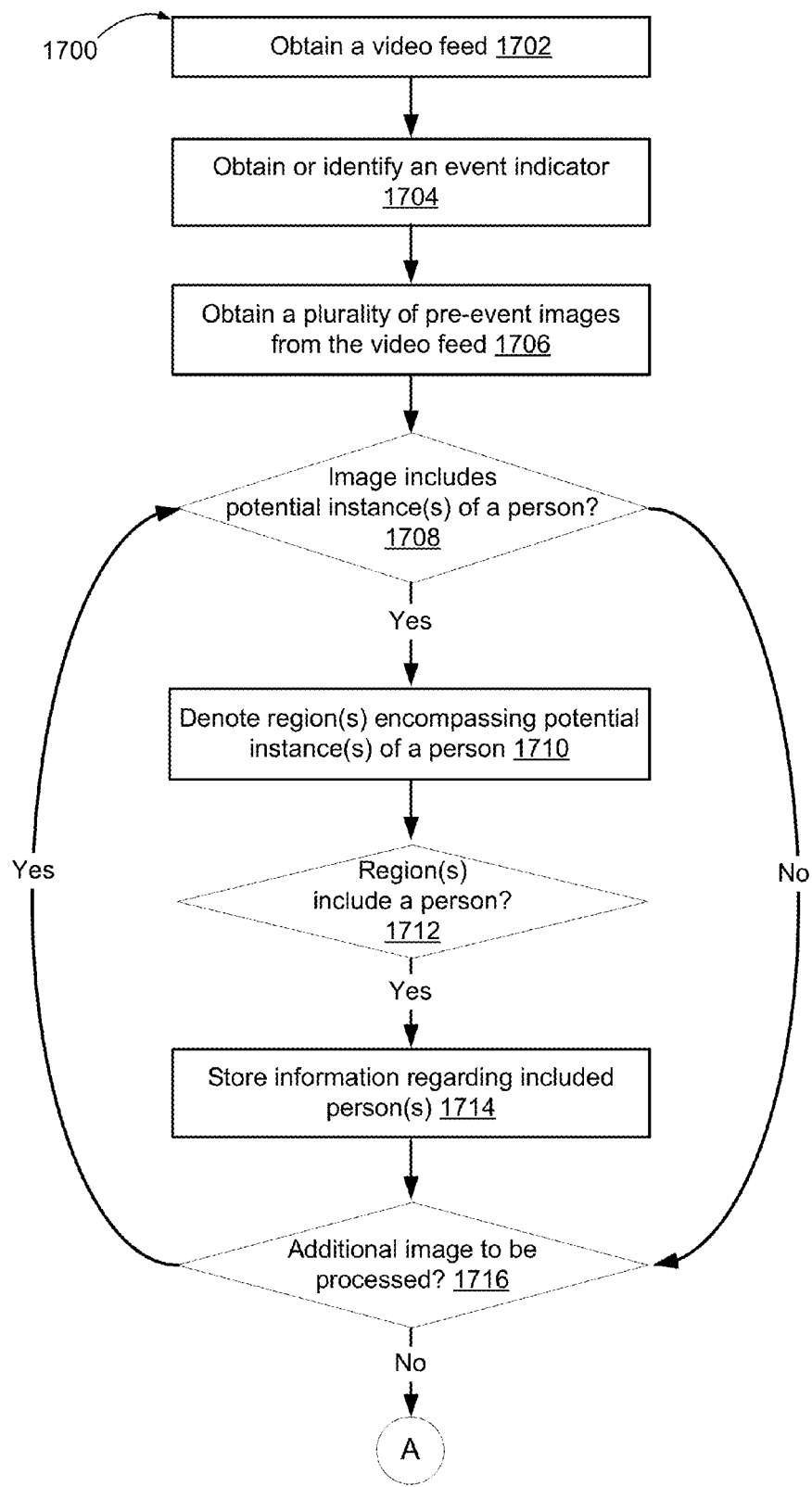
FIGS. 17A-17C illustrate a flowchart representation of a method of person detection in a video feed, in accordance with some implementations.
Figure 17B:
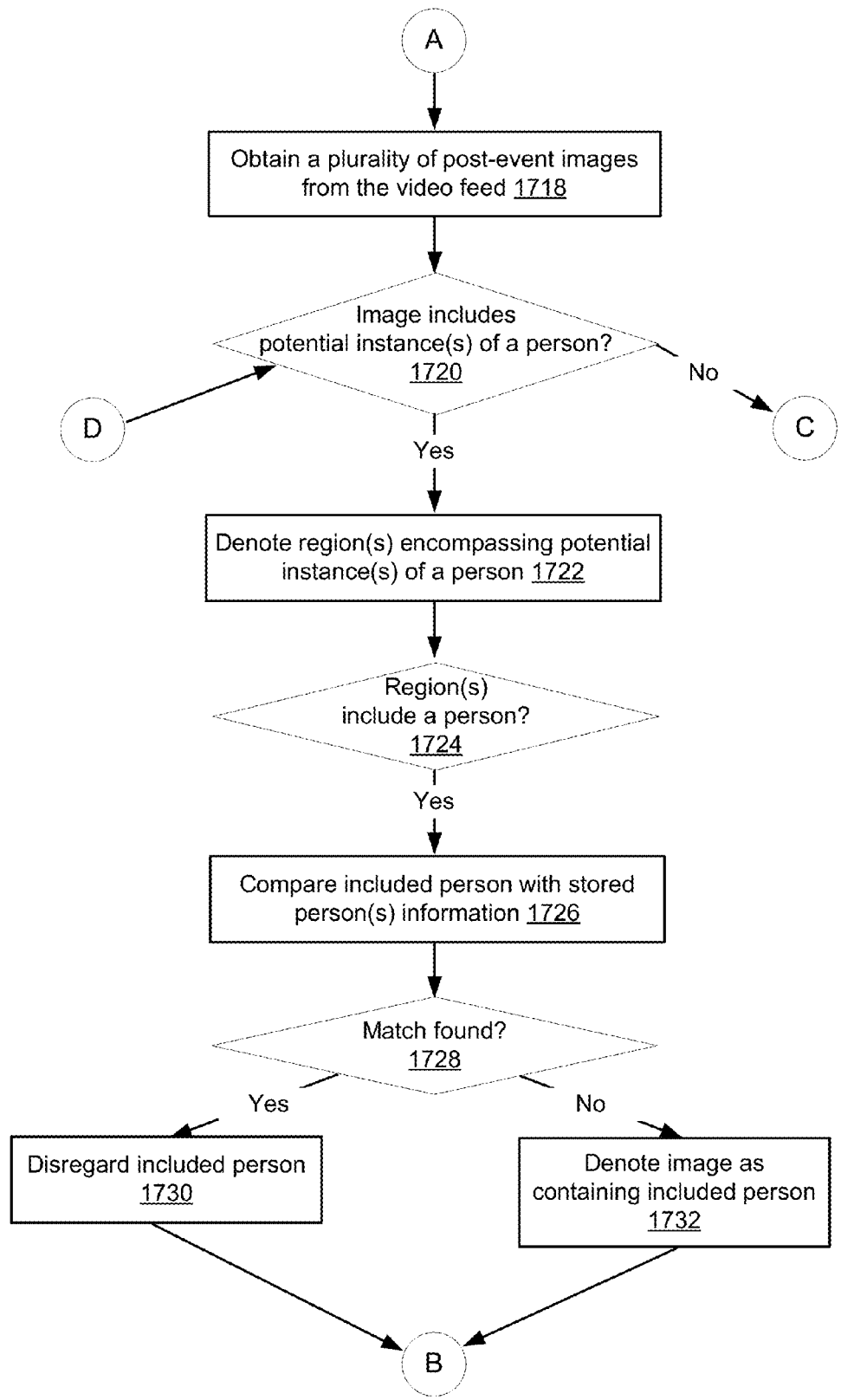
Figure 17C:
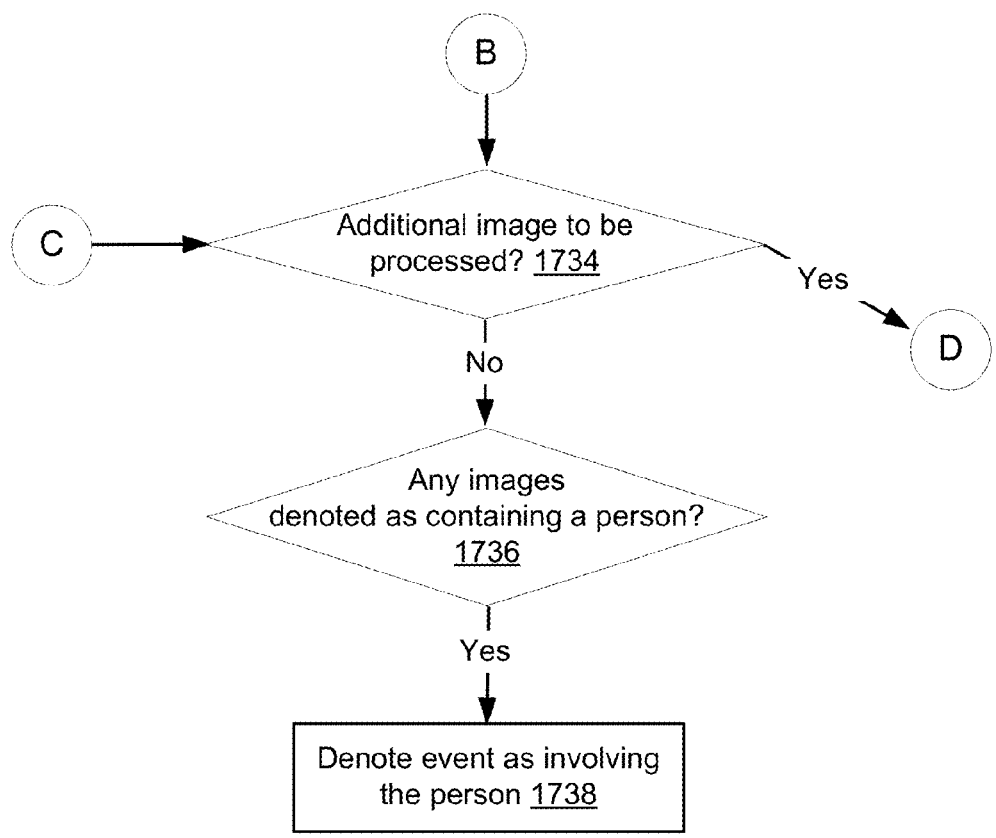
Figure 18:
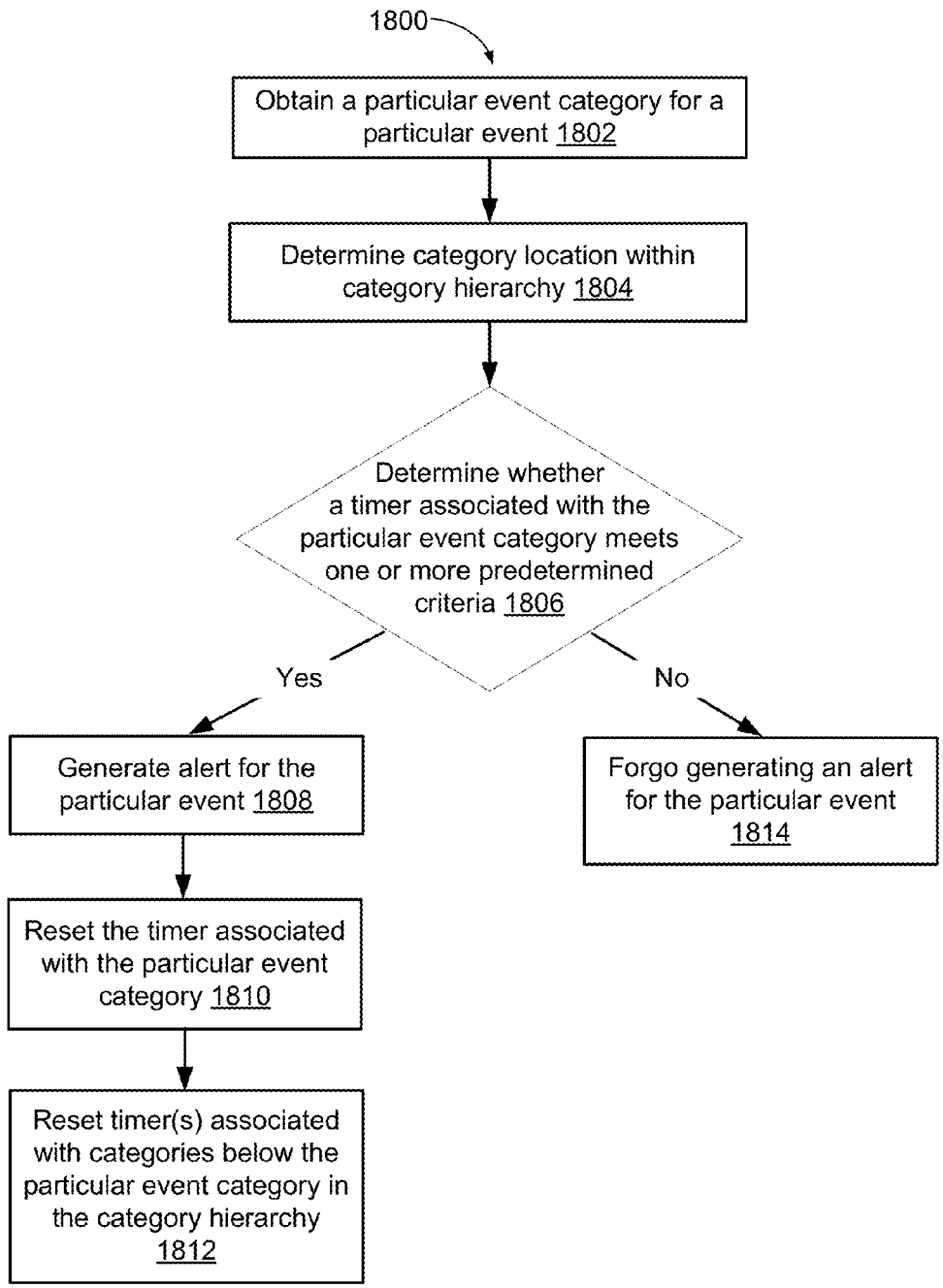
FIG. 18 illustrates a flowchart representation of a method for providing event alerts, in accordance with some implementations.

Attention is now directed to the flowchart representations of FIGS. 17A-17C and 18. FIGS. 17A-17C illustrate a flowchart representation of a method 1700 of person detection in a video feed, in accordance with some implementations. FIG. 18 illustrates a flowchart representation of a method 1800 for providing event alerts, in accordance with some implementations.

In some implementations, the methods 1700 and 1800 are performed by: (1) one or more electronic devices of one or more systems, such as the devices of a smart home environment 100, FIG. 1; (2) one or more computing systems, such as smart home provider server system 164 of FIG. 1 and/or server system 508 of FIG. 5; or (3) a combination thereof. In some implementations, methods 1700 and 1800 are performed by a smart device 204 (FIG. 9) or a component thereof, such as data processing module 9322. In some implementations, methods 1700 and 1800 are performed by a client device 504 (FIG. 8) or a component thereof, such as alert module 8284. Thus, in some implementations, the operations of the methods 1700 and 1800 described herein are entirely interchangeable, and respective operations of the methods 1700 and 1800 are performed by any of the aforementioned devices, systems, or combination of devices and/or systems. In some embodiments, methods 1700 and 1800 are governed by instructions that are stored in a non-transitory computer-readable storage medium and that are executed by one or more processors of a device/computing system, such as the one or more CPU(s) 702 of server system 508 and/or the one or more CPU(s) 1002 of smart home provider server system 164. For convenience, methods 1700 and 1800 will be described below as being performed by a computing system, such as the server system 508 of FIG. 5.

Referring now to FIGS. 17A-17C.

The system obtains (1702) a video feed. In some implementations, the system obtains the video feed from a camera 118 within the smart home environment 100 (FIG. 1). In some implementations, the system obtains the video feed via network interface(s) 704 utilizing network communication module 712 (FIG. 7A).

The system obtains or identifies (1704) an event indicator. In some implementations, the system receives the event indicator from a camera 118. In some implementations, the camera 118 determines if sufficient motion is present in the video feed. If sufficient motion is detected, the camera sends the event indicator to the system. In some implementations, the server system receives the video feed from the camera and determines if sufficient motion is present in the video feed. If sufficient motion is detected, the system generates an event indicator. In some implementations, the event indicator indicates that a motion event candidate is present in a portion of the video feed. In some implementations, the event indicator comprises a cuepoint, such as those discussed above with reference to FIG. 11B. In some implementations, the event indicator comprises motion start information. In some implementations, the system utilizes data processing module 7144 (FIG. 7A) to analyze the video feed and determine if sufficient motion is present. In some implementations, the event indicator includes a timestamp of when the event began.

The system obtains (1706) a plurality of pre-event images (e.g., 5, 10, or 15 images) from the video feed. In some implementations, the system stores the received video feed and, in response to obtaining or identifying an event indicator, retrieves the plurality of pre-event images from storage. For example, server system 508 stores the video feed in server database 716 and retrieves the plurality of pre-event images using event processor sub-module 7146. In some implementations, the plurality of pre-event images comprises the plurality of images immediately preceding the timestamp of the event indicator. In some implementations, the plurality of pre-event images comprises a plurality of consecutive images. In some implementations, the plurality of pre-event images comprises images taken at intervals before the timestamp of the event indicator. For example, the plurality of pre-event images comprises 10 images where each image is selected for each minute preceding the event indicator. For example, the timestamp of the event indicator is time 0, the first image is the image at time −30, the second image is the image at time −90, the third image is the image at time −150, and so on. In some implementations, the plurality of pre-event images comprise every 10th, 30th, 60th, or the like image from the video feed preceding to the event indicator. In some implementations, the pre-event images are selected based on analysis of the video feed. For example, the system performs video analysis to identify images likely to include information relevant to the event.

In some implementations, the system obtains one or more post-event images and processes them with the plurality of pre-event images. In some implementations, the one or more post-event images are images determined to not involve motion. In some implementations, the one or more post-event images are utilized to identify false positives and background for the scene.

The system determines (1708) whether a first image of the plurality of pre-event images includes one or more potential instances of a person. In some implementations, in accordance with a determination that the first image of the plurality of pre-event images does not include one or more potential instances of a person, the system performs operation 1716. In some implementations, the system utilizes object detection sub-module 7152 to determine whether the first image includes one or more potential instances of a person. In some implementations, the system denotes a bounding box around each potential instance of a person. For example, FIG. 15A shows an image containing two potential instances of a person corresponding to bounding box 1502 and bounding box 1504. In some implementations, determining whether an image includes one or more potential instances of a person includes identifying one or more potential instances and assigning a confidence score to each of the potential instances. In some implementations, if the confidence score meets one or more criteria the system denotes the corresponding instance with a bounding box for further analysis. In some implementations, the determining includes analyzes the one or more potential instances to determine whether one or more of the potential instances comprise false positives.

In some implementations, the system utilizes facial detection to determine whether the first image includes one or more potential instances of a person. In some implementations, the system utilizes historical information for the camera to determine whether the first image includes one or more potential instances of a person. In some implementations, the system utilizes heuristics to determine whether the first image includes one or more potential instances of a person. In some implementations, the system distinguishes the foreground of an image from the background and analyzes the foreground to determine whether the first image includes one or more potential instances of a person. In some implementations, the system distinguishes the foreground of the image from the background based on prior training and/or analysis of previous images captured by the camera. In some implementations, the system utilizes scalable object detection with a deep neural network to determine whether the first image includes one or more potential instances of a person. Scalable object detection using deep neural networks is described in detail in the following paper: Erhan, Dumitru et al., "Scalable Object Detection using Deep Neural Networks," 2013, which is hereby incorporated by reference in its entirety. In some implementations, the system utilizes a deep network-based object detector to determine whether the image includes one or more potential instances of a person. In some implementations, the system utilizes a single shot multibox detector to determine whether the image includes one or more potential instances of a person. A single shot multibox detector is described in detail in the following paper: Liu, Wei et al., "SSD: Single Shot MultiBox Detector," 2015, which is hereby incorporated by reference in its entirety.

In some implementations, after identifying the one or more potential instances of a person, the system analyzes the one or more potential instances to determine whether the one or more potential instances are false positives. In some implementations, the analyzing includes analyzing the dimensions of the potential instances (e.g., the height, width, and proportionality). In some implementations, the analyzing is performed as part of the determination as to whether the first image includes the one or more potential instances of a person.

In accordance with a determination that the first image of the plurality of pre-event images includes one or more potential instances of a person, the system denotes (1710) one or more regions encompassing the potential instances of a person. In some implementations, the system denotes a square region encompassing each potential instance of a person in the image. In some implementations, the system denotes a rectangular region, triangular region, circular region, or other like encompassing the potential instances of a person. In some implementations, the denoted region is the smallest such region that encompasses the potential instances of a person (e.g., the smallest square region to encompass all potential instances of a person). In some implementations, the region is denoted so as to include a boundary region around the potential instances of a person (e.g., a 10, 50, or 100 pixel boundary region). In some implementations, the system utilizes regioning sub-module 7154 to denote the one or more regions encompassing the potential instances of a person. For example, FIG. 15B shows region 1506 encompassing bounding boxes 1502 and 1504.

The system determines (1712) whether the one or more regions include a person. In some implementations, the system utilizes scalable object detection with a deep neural network to determine whether the region includes one or more persons. In some implementations, the system utilizes a deep network-based object detector to determine whether the region includes one or more persons. In some implementations, the system utilizes a single shot multibox detector to determine whether the region includes one or more persons. In some implementations, the system utilizes a same algorithm to determine whether the image includes one or more potential persons and to determine whether the region includes one or more persons. In some implementations, determining whether the one or more regions include a person includes identifying one or more potential persons and assigning a confidence score to each. In some implementations, if the confidence score meets one or more criteria the system denotes the potential person as a person. In some implementations, the system utilizes object detection sub-module 7152 to determine whether the region includes one or more persons. For example, FIG. 15C shows a person detected within region 1506 denoted by bounding box 1508. In some implementations, the system utilizes facial detection to determine whether the one or more regions include one or more persons. In some implementations, the system distinguishes the foreground of a region from the background and analyzes the foreground to determine whether the region includes one or more persons.

In accordance with a determination that the one or more regions include a person, the system stores (1714) information regarding the included persons. In some implementations, the system stores the information in server database 716. In some implementations, the system stores the information in event information database 7166 or event records 7168. In some implementations, the information regarding the included persons includes information as to the location of the persons within the image. In some implementations, the information includes information such as dimensions, coloring, posture, and the like regarding the included persons.

In some implementations, the system stores information regarding all the potential instances of a person. In some implementations, the system stores information regarding potential instance(s) of a person that do not comprise a person. For example, the system determines that a particular potential instance of a person does not comprise a person and stores information regarding the potential instance (e.g., location, size, etc.) along with information denoting the potential instance as not comprising a person (e.g., a false positive).

The system determines (1716) whether plurality of pre-event images include any additional images to be processed. In accordance with a determination that the plurality of pre-event images includes another image to be processed, the system repeats operation 1708 on the next image. Thus, the system analyzes each image of the plurality of pre-event images. For example, if the plurality of pre-event images includes 10 images the system analyzes each of the 10 images. In some implementations, the system analyzes the plurality of pre-event images simultaneously. In some implementations, the system assigns each image to a separate thread to be processed independently (e.g., in parallel). In some implementations, the system does not process any additional images in accordance with a determination that a processed image included a person. In some implementations, the system does not process any additional images in accordance with a confidence level indicating that a processed image included a person.

In accordance with a determination that the plurality of pre-event images does not include another image to be processed, the system obtains (1718) a plurality of post-event images (e.g., 5, 10, 15, or 30 images) from the video feed. In some implementations, the system stores the received video feed and, in response to obtaining or identifying an event indicator, retrieves the plurality of post-event images from storage. For example, server system 508 stores the video feed in server database 716 and retrieves the plurality of post-event images using event processor sub-module 7146. In some implementations, the plurality of post-event images comprises the plurality of images immediately subsequent the timestamp of the event indicator. In some implementations, the plurality of post-event images comprises a plurality of consecutive images. In some implementations, the plurality of post-event images comprises images taken at intervals after the timestamp of the event indicator. For example, the plurality of post-event images comprises 10 images where each image is selected for each minute subsequent to the time stamp of the event indicator. For example, the timestamp of the event indicator is time 0, the first image is the image at time 0, the second image is the image at time 60, the third image is the image at time 120, and so on. In some implementations, the plurality of post-event images comprise every 10th, 30th, 60th, or the like image from the video feed subsequent to the event indicator. In some implementations, the system analyzes the plurality of post-event images before the plurality of pre-event images. In some implementations, the system analyzes the plurality of post-event images in parallel with the plurality of pre-event images. In some implementations, the post-event images are selected based on analysis of the video feed. For example, the system performs video analysis to identify images likely to include information relevant to the event. In some implementations, images corresponding to the start or stop of motion are selected. In some implementations, images corresponding to an end of a motion track (e.g., a motion stop or exit activity) are selected. In some implementations, the post-event images are selected based on the quality of the image. For example, images that are blurry or saturated are not selected.

The system determines (1720) whether a first image of the plurality of post-event images includes one or more potential instances of a person. In accordance with a determination that the first image of the plurality of post-event images does not include one or more potential instances of a person, the system performs operation 1734. In some implementations, operation 1720 comprises operation 1708. In some implementations, the system utilizes object detection sub-module 7152 to determine whether the first image includes one or more potential instances of a person. In some implementations, the system denotes a bounding box around each potential instance of a person.

In some implementations, in accordance with a determination that the first image of the plurality of post-event images includes one or more potential instances of a person, the system compares the one or more potential instances of a person with stored persons information (e.g., information stored during operation 1714). For example, the system compares the one or more potential instances of a person with information regarding potential instances of a person detected in the pre-event images that were determined not to comprise a person (e.g., false positives). Thus, in accordance with some implementations, the system eliminates false positives prior to denoting one or more regions encompassing the potential instances of a person or determining whether the one or more regions include a person.

In accordance with a determination that the first image of the plurality of post-event images includes one or more potential instances of a person, the system denotes (1722) one or more regions encompassing the potential instances of a person. In some implementations, operation 1722 comprises operation 1710. In some implementations, the system denotes the one or more regions so as to exclude one or more potential instances determined to be false positives (e.g., not comprise a person). In some implementations, the system denotes the one or more regions without regard to one or more potential instances determined to be false positives (e.g., not comprise a person). In some implementations, the system denotes a region encompassing each potential instance of a person in the image.

The system determines (1724) whether the one or more regions include a person. In some implementations, operation 1724 comprises operation 1712. In some implementations, the system utilizes a deep network-based object detector to determine whether the region includes one or more persons. In some implementations, the system utilizes a single shot multibox detector to determine whether the region includes one or more persons. In some implementations, the system utilizes a same algorithm to determine whether the image includes one or more potential persons and to determine whether the region includes one or more persons.

In accordance with a determination that the one or more regions include a person, the system compares (1726) information regarding the included person from operation 1724 with stored persons information (e.g., information stored during operation 1714). In some implementations, the system utilizes data processing module 7144 and/or object detection sub-module 7152 to compare the information. In some implementations, comparing the information includes comparing the location of the included person with the location of the stored persons within the image.

In some implementations, the plurality of post-event images is processed before any pre-event images are processed. In some implementations, the plurality of pre-event images are processed in accordance with a determination that at least one post-event image includes a person.

The system determines (1728) whether a match is found between the information regarding the included person and the stored persons information. In some implementations, the system utilizes data processing module 7144 and/or object detection sub-module 7152 to determine whether the match is found. In some implementations, determining whether a match is found comprises determining whether the included person is in the same location as one of the stored persons within the image.

In accordance with a determination that a match is found, the system disregards (1730) the included person. In some implementations, in accordance with a determination that a match is found, the system denotes the included person as not part of the event. In some implementations, the system determines whether the match comprises a match to a potential instance of a person previously determined to be a false positive. In some implementations, in accordance with a determination that the match comprises a match to a potential instance of a person previously determined to be a false positive, the system disregards the included person. In some implementations, in accordance with a determination that the match does not comprise a match to a potential instance of a person previously determined to be a false positive, the system denotes the image as containing the included person. In some implementations, in accordance with a determination that the match does not comprise a match to a potential instance of a person previously determined to be a false positive, the system denotes the image as containing the included person as a non-participant in the event.

In accordance with a determination that a match is not found, the system denotes (1732) the image as containing the included person. In some implementations, the system denotes the image as containing the included person by adding or updating metadata associated with the image. In some implementations, the system stores the information regarding the included person in a database, such as database 716 (FIG. 7A). In some implementations, the system stores the information in the event information database 7166.

The system determines (1734) whether plurality of post-event images include any additional images to be processed. In accordance with a determination that the plurality of post-event images includes another image to be processed, the system repeats operation 1720 on the next image. Thus, the system analyzes each image of the plurality of post-event images. For example, if the plurality of post-event images includes 10 images the system analyzes each of the 10 images. In some implementations, the system analyzes the plurality of post-event images simultaneously. In some implementations, the system assigns each image to a separate thread to be processed independently (e.g., in parallel). In some implementations, the system does not process any additional images in accordance with a determination that a processed image included a person. In some implementations, the system does not process any additional images in accordance with a confidence level indicating that a processed image included a person.

The system determines (1736) whether plurality of post-event images include an image denoted as containing a person. In some implementations, the system determines whether the plurality of post-event images include an image denoted as containing a person by analyzing metadata for the plurality of post-event images. In some implementations, the system determines whether the plurality of post-event images include an image denoted as containing a person by utilizing a database, such as server database 716 or event information database 7166.

In accordance with a determination that the plurality of post-event images include an image denoted as containing a person, the system denotes (1738) the motion event corresponding to the event indicator as involving the person. In some implementations, the system denotes the motion event corresponding to the event indicator as containing a person by editing or adding metadata for the motion event. In some implementations, the system denotes the motion event corresponding to the event indicator as containing a person by storing the information in a database, such as event information database 7166 or event records 7168. In some implementations, the system denotes the motion event corresponding to the event indicator as involving the person in accordance with a determination that the person was a participant in the motion event. For example, in accordance with a determination that the person was in motion, the person was in a region in which motion occurred, and/or the person corresponds to a motion track. In some implementations, the system denotes the motion event corresponding to the event indicator as involving the person in accordance with a determination that the person was detected in multiple post-event images.

In some implementations, the system obtains a video feed, the video feed comprising a plurality of images. In some implementations, the system obtains the video feed from a camera 118 within the smart home environment 100 (FIG. 1). In some implementations, the system obtains the video feed via network interface(s) 704 utilizing network communication module 712 (FIG. 7A). In some implementations, the plurality of images comprise the plurality of post-event images obtained in operation 1718.

In some implementations, for each image in the plurality of images, the system analyzes the image to determine whether the image includes a person. In some implementations, the system utilizes a deep network-based object detector to determine whether the image includes one or more persons. In some implementations, the system utilizes a single shot multibox detector to determine whether the image includes one or more persons. In some implementations, determining whether the image includes a person includes identifying one or more potential persons and assigning a confidence score to each. In some implementations, if the confidence score meets one or more criteria the system denotes the potential person as a person. In some implementations, the system utilizes object detection sub-module 7152 to determine whether the image includes one or more persons.

In some implementations, the analyzing includes: (1) determining that the image includes a potential instance of a person by analyzing the image at a first resolution; (2) in accordance with the determination that the image includes the potential instance, denoting a region around the potential instance, where the area of the region is less than the area of the image; (3) determining whether the region includes an instance of the person by analyzing the region at a second resolution, greater than the first resolution; and (4) in accordance with a determination that the region includes the instance of the person, determining that the image includes the person. For example, FIGS. 15A-15C illustrate the analyzing including: (1) determining that the image includes a potential instance of a person (1502, FIG. 15A); (2) denoting a region around the potential instance (1506, FIG. 15B); (3) determining whether the region includes an instance of the person (FIG. 15C); and (4) determining that the image includes the person (1508, FIG. 15C). In some implementations, the region is analyzed at the same resolution as the image. In some implementations, the region is analyzed at a lower resolution than the image. In some implementations, the region comprises the image. In some implementations: (1) the video feed comprises a high resolution video feed, and (2) the system, prior to analyzing the image at the first resolution, downsamples the image from an initial resolution to the first resolution. In some implementations: (1) analyzing the image at the first resolution comprises utilizing a person detection algorithm to analyze the image, and (2) analyzing the region at the second resolution comprises utilizing the same person detection algorithm to analyze the region. In some implementations, in accordance with a determination that the region comprises at least a threshold amount of the image, such as 80%, 90, or the like, the system forgoes determining whether the region includes an instance of a person. In some implementations, the system assigns a confidence score to the potential instance; and, in accordance with a determination that the confidence score meets one or more predetermined criteria, the system forgoes determining whether the region includes an instance of a person. In some implementations, when the system forgoes determining whether the region includes an instance of a person, the system determines whether the image includes a person based on the analysis of the image at the first resolution.

In some implementations, for each image of the plurality of images, the system assigns a confidence score to the image. For example, the system assigns a confidence score to the image in FIG. 15A based on the analysis of the instance of the person in bounding box 1508 (FIG. 15C). In some implementations, the system utilizes object detection sub-module 7152 to assign the confidence score to the image.

In some implementations, the confidence score is based on the analysis of the image at the first resolution. For example, a confidence score for the image in FIG. 15A is based on the analysis illustrated in FIG. 15A (e.g., the analysis of the potential instances of a person in bounding boxes 1502 and 1504). In some implementations, the confidence score is based on the analysis of the region at the second resolution. For example, a confidence score for the image in FIG. 15A is based on the analysis illustrated in FIG. 15C (e.g., the analysis of the instance of a person in bounding box 1508). In some implementations, the confidence score comprises an aggregation of information from the analysis of the image and the analysis of the region.

In some implementations: (1) the video feed includes a motion event, and (2) in accordance with a determination that the confidence score for at least one image of the plurality of images exceeds a predetermined threshold, the system denotes the motion event as involving a person. For example, FIGS. 15D-15I illustrate images that include a motion event—a person walking through the field of view. Thus, in accordance with a determination that the confidence score for either the image in FIG. 15D or the image in FIG. 15G exceeds a predetermined threshold (e.g., confidence threshold 71716, FIG. 7C), the system denotes the motion event as involving a person (e.g., the person in bounding box 1530, FIG. 15I). In some implementations, the system determines whether a detected person is a participant in the motion event and, in accordance with a determination that the identified person is a participant, the system denotes the motion event as involving a person. In some implementations, the system denotes the motion event by adding/updating information in a database, such as event information database 7166 or event records 7168 (FIG. 7A). In some implementations, the system utilizes event processor sub-module 7146 and/or event categorizer sub-module 7148 to determine whether a confidence score for at least one image of the plurality of images exceeds a predetermined threshold. In some implementations, the system utilizes object detection sub-module 7152 to determine whether a confidence score for at least one image of the plurality of images exceeds a predetermined threshold.

In some implementations, the video feed includes at least one of a motion event, an audio event, and an alert event. In some implementations, the video feed includes metadata denoting times when an audio or alert event occurred. In some implementations, the metadata is stored in a database, such as event information database 7166 or event records 7168. In some implementations, in accordance with a determination that the confidence score for at least one image of the plurality of images corresponding to an event exceeds a predetermined threshold, the system denotes the event as involving a person.

In some implementations, determining that the image includes the potential instance of the person comprises: (1) detecting the potential instance of the person; (2) assigning a confidence score to the potential instance of the person; and (3) in accordance with a determination that the confidence score meets one or more predetermined criteria (e.g., confidence criteria 7171, FIG. 7A), determining that the images include the potential instance of the person. For example, as illustrated in FIG. 15D a potential instance of a person is detected within bounding box 1512. In this example, a confidence score is assigned to the potential instance of a person, and, as show in FIG. 15E, the region 1516 does not encompass bounding box 1512 due to the confidence score failing to meet the predetermined criteria. Conversely, a potential instance of a person is detected within bounding box 1510 and the region 1516 encompasses bounding box 1510 because the confidence score for the potential instance of a person in bounding box 1510 meets the predetermined criteria. In some implementations, assigning the confidence score to the potential instance of the person comprises assigning the confidence score based on analysis of one or more additional images (e.g., images preceding or subsequent to the image that includes the potential instance of the person).

In some implementations, in accordance with a determination that the region includes the person, the system denotes the image as containing a person. For example, in accordance with a determination that region 1506 (FIG. 15B) includes a person (e.g., the person in bounding box 1508, FIG. 15C), the system denotes the image shown in FIG. 15A as containing a person. In some implementations, the system denotes the image as containing a person by adding or updating information in a database, such as event information database 7166 or data storage database 7160. In some implementations, denoting the image as containing a person comprises adding or updating metadata for the image.

In some implementations, in accordance with a determination that the region does not include the person, the system denotes the image as not containing a person. In some implementations, the system denotes the image as not containing a person by adding or updating information in a database, such as event information database 7166 or data storage database 7160. In some implementations, denoting the image as not containing a person comprises adding or updating metadata for the image. In some implementations, in accordance with a determination that the region does not include the person, the system forgoes denoting the image (e.g., forgoes denoting the image as containing, or not containing, a person).

In some implementations, the system: (1) determines whether the region includes one or more persons other than the potential person; and (2) in accordance with a determination that the region includes the one or more other persons, denotes the image as containing a person. For example, the system analyzes an image and determines that it includes one potential instance of a person. The system denotes a region around the potential instance, and then analyzes the region to determine whether it includes any persons. In this example, as a result of the analysis of the region, the system determines that the region includes two persons: one corresponding to the potential instance, and one not detected in the analysis of the entire image. In another example, the system determines that the region includes one person, but not one corresponding to the potential instance. For example, the system analyzes the entire image and flags a jacket hanging on the wall next to a window as a potential person. The system denotes a region encompassing the jacket and the window and analyzes the region. In analyzing the region the system determines that the jacket is not a person, but that a person is present outside the window. In some implementations, determining whether the region includes an instance of the person comprises re-analyzing the potential instance of the person. In some implementations, determining whether the region includes an instance of the person comprises utilizing a deep network-based object detector to determine whether the region includes one or more persons. In some implementations, determining whether the region includes an instance of the person comprises utilizing a single shot multibox detector. In some implementations, the system utilizes object detection sub-module 7152 to determine whether the region includes one or more persons.

In some implementations, the system: (1) determines that one or more images of the plurality of images includes a person; (2) obtains a second plurality of images, the second plurality of images preceding the motion event; (3) for each image in the second plurality of images, analyzes the image to determine whether the image includes the person; (4) in accordance with a determination that one or more images of the second plurality of images do not include the person, denotes the motion event as involving the person; and (5) in accordance with a determination that one or more images of the second plurality of images include the person, forgoes denoting the motion event as involving the person. In some implementations, the system determines whether a person is a participant in an event by analyzing images preceding the event to determine if the person was already present in the scene prior to the event occurring. For example, FIGS. 15D-15I illustrate images that include a motion event—a person walking through the field of view. FIGS. 15D-15I also include a person sitting in a chair reading. In accordance with some implementations, the system analyzes the image shown in FIG. 15A and determines that a person is present within bounding box 1502. The system then forgoes denoting the motion event in FIGS. 15D-15I as including the person within bounding box 1502 as the system determines that the person was not a participant in the motion event. In some implementations, the second plurality of images comprises the plurality of pre-event images obtained in operation 1706.

In some implementations, the system: (1) in accordance with a determination that an image includes multiple potential instances of a person, denotes a region around each potential instance; and (2) for each region, determines whether the region includes an instance of a person by analyzing the region at a second resolution, greater than the first resolution. In some implementations, a region is denoted around a subset of the multiple potential instances. For example, in the image shown in FIG. 15E the region 1516 encompasses bounding boxes 1510 and 1514, but not bounding box 1512. In some implementations, the system utilizes regioning sub-module 7154 to denote a region.

In some implementations, the system: (1) in accordance with a determination that an image includes multiple potential instances of a person, denotes a region encompassing each potential instance; and (2) determines whether the region includes one or more instances of a person by analyzing the region at a second resolution, greater than the first resolution. For example, in the image shown in FIG. 15H the region 1526 encompasses both bounding box 1524 and bounding box 1522. In some implementations, the system utilizes regioning sub-module 7154 to denote the region and objection detection sub-module 7152 to analyze the denoted region. In some implementations, the system determines whether the region includes one or more instances of a person by analyzing the region at a second resolution less than the first resolution. In some implementations, the system determines whether the region includes one or more instances of a person by analyzing the region at the first resolution.

In some implementations, the system determines an approximate age of the potential person. For example, the system determines whether the potential person is an infant, toddler, adolescent, or adult. In some implementations, the system determines the approximate age of the potential person based on one or more of the potential person's dimensions (e.g., weight and/or height). In some implementations, the system categorizes potential persons as either children or adults based on the potential person's dimensions.

In some implementations, the system, for each image in the plurality of images, analyzes the image to determine whether the image includes a particular object, the analyzing including: (1) determining whether the image includes a potential instance of the particular object by analyzing the image at a first resolution; (2) in accordance with a determination that the image includes a potential instance, denoting a region around the potential instance, wherein the area of the region is less than the area of the image; (3) determining whether the region includes an instance of the particular object by analyzing the region at a second resolution, greater than the first resolution; and (4) in accordance with a determination that the region includes an instance of the particular object, determining that the image includes the particular object. In some implementations, the system utilizes scalable object detection with a deep neural network to determine whether the first image includes the particular object. In some implementations, the system utilizes a deep network-based object detector to determine whether the image includes the particular object. In some implementations, the system utilizes a single shot multibox detector to determine whether the image includes the particular object. In some implementations, the particular object comprises a vehicle, such as a car, truck, boat, or airplane. In some implementations, the particular object comprises a weapon. In some implementations, the particular object comprises an entity such as an animal (e.g., a pet).

In some implementations, the system determines whether the motion event involves a person by analyzing one or more relationships between images including persons of the plurality of images. In some implementations, determining whether the motion event involves a person comprises determining whether the person appears in distinct locations in respective images of the plurality of images. For example, FIGS. 15D-15I illustrate images that include a motion event—a person walking through the field of view. In this example, the system determines that the person in bounding box 1514 (FIG. 15D) and bounding box 1524 (FIG. 15G) is a participant in the motion event because the person's location has changed between images. Conversely, the system determines that the person in bounding box 1510 (FIG. 15D) and bounding box 1522 (FIG. 15G) is not a participant in the motion event because the person's location has not changed between images. In this example, the system denotes the motion event as involving the person in bounding box 1514, but does not denote the motion event as involving the person in bounding box 1510. In some implementations, the system utilizing event processor sub-module 7146 to analyze the one or more relationships between images that include person(s). In some implementations, the system analyzes whether a detected person has an associated motion track for the motion event. In some implementations, the system determines that a detected person with an associated motion track is involved in the motion event, and a detected person without an associated motion track is not involved in the motion event. In some implementations, the system determines that the motion event involves a person in accordance with a determination that the person was detected in multiple images with a variance in location from image to image. In some implementations, the system generates a track for the person based on the person's detected location within each image of the plurality of images, and determines that the motion event involves the person in accordance with a determination that the person's track meets certain criteria (e.g., is longer than some predefined threshold). In some implementations, the system stores information regarding detected person within the plurality of images. In some implementations, the system aggregates the stored information along with other event information (e.g., as discussed infra with respect to FIG. 11B) to determine whether the motion event involves the person. In some implementations, the system sends the stored information, along with other event information, to a categorizer to process the event (e.g., categorizer2 1141, FIG. 11F). In some implementations, the categorizer determines whether the motion event involves the person. In some implementations, the categorizer assigns a category to the motion event, where the category indicates whether the motion event involves the person. In some implementations, the categorizer sends the assigned category to the system. In some implementations, the categorizer comprises a support vector machine classifier, a decision tree classifier, or the like.

In some implementations, one or more of the above method operations are performed by a smart device, such as smart device 204 (FIG. 9). In some implementations, one or more of the above method operations are performed by a camera 118 (FIG. 1).

It should be understood that the particular order in which the operations in FIGS. 17A-17C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 1700 described above with respect to FIGS. 17A-17C.

Referring now to FIG. 18. The system obtains (1802) a particular event category for a particular event. For example, the system obtains the particular event category from a categorizer, such as categorizer 1141 in FIG. 11F. In some implementations, the categorizer is a component of the system, such as event categorizer sub-module 7148. In some implementations, the categorizer is separate and distinct from the system.

The system determines (1804) a category location within a category hierarchy for the particular event category. For example, the particular event category is an event involving an unknown person (e.g., unknown person(s) event 71702) and the system determines that it is at the top of an event hierarchy as shown in FIG. 7C. In some implementations, the system analyzes a category hierarchy to determine where in the hierarchy the particular event category is located. In some implementations, the category hierarchy is stored in a database, such as event information database 7166 or event categories 7170. In some implementations, the system utilizes event categorizer sub-module 7148 to determine the category location within the category hierarchy. In some implementations, the category hierarchy includes a category for unrecognized events.

The system determines (1806) whether a timer associated with the particular event category meets one or more predetermined criteria. For example, the system determines whether the timer exceeds a preset amount of time, such as 10 minutes, 30 minutes, or 90 minutes. In some implementations, a distinct timer is utilized for each event category within the category hierarchy. In some implementations, the system utilizes alert sub-module 7151 to determine whether the timer associated with the particular event category meets the one or more predetermined criteria.

In accordance with a determination that the timer associated with the particular event category does not meet the one or more predetermined criteria, the system forgoes (1814) generating an alert for the particular event. For example, the system determines that the timer indicates that it has been less than 10 minutes since the last alert was generated for the particular event's category and the predetermined criteria comprise waiting at least 10 minutes between alerts for the particular event's category. As another example, FIG. 16B shows motion 1616 detected within 30 minutes after preceding motion and the system forgoing generating an activity alert. In some implementations, the system generates an indicator for the particular event (e.g., a visual indicator on an event timeline within a smart home application), but forgoes generating an alert. For example, the system generates an indicator such as indicator 1322B in FIG. 13A. In some implementations, the system stores information regarding the particular event (e.g., in event records 7168, FIG. 7A), but forgoes generating an alert.

In accordance with a determination that the timer associated with the particular event category meets the one or more predetermined criteria, the system generates (1808) an alert for the particular event. In some implementations, the system utilizes alert sub-module 7151 to generate the alert. For example, the system determines that the timer indicates that it has been more than 30 minutes since the last alert was generated for the particular event's category or for a category above the particular event's category within the category hierarchy. In this example, the predetermined criteria comprise waiting at least 30 minutes between alerts for the particular event's category. As another example, FIG. 16B shows motion 1620 detected more than 30 minutes after preceding motion and the system generating activity alert 1618. In some implementations, the alert indicates the particular event's category. For example, the alert in FIG. 14A indicates that the particular event is categorized as a motion event involving a person.

In some implementations, the system analyzes one or more timestamps for the particular event category to determine whether or not to generate an alert for the particular event. For example, the system analyzes the timestamp for the most recently generated alert for the particular event. In another example, the system analyzes the timestamps for the most recently generated alert for the particular event as well as the most recently generated alerts for event categories higher in the category hierarchy than the particular event's category.

The system resets (1810) the timer associated with the particular event category. In some implementations, the system resets the timer in response to generating the alert for the particular event. In some implementations, the system stores a timestamp for the generated alert (e.g., stores the timestamp within server database 716). In some implementations, the system resets the timer in accordance with the determination that the timer meets the one or more predetermined criteria.

The system resets (1812) one or more timers associated with categories below the particular event category in the category hierarchy. For example, the particular event category comprises unknown person(s) event category 71702 and the system resets the timer for each event category below unknown person(s) event category 71702 in event categories 7170 (FIG. 7C). In some implementations, the system resets the one or more timers in response to generating the alert for the particular event. In some implementations, the system resets the one or more timers in accordance with the determination that the timer for the particular event category meets the one or more predetermined criteria.

In some implementations, the system: (1) obtains a first category of a plurality of motion categories for a first motion event, the first motion event corresponding to a first plurality of video frames from a camera; (2) sends a first alert indicative of the first category to a user associated with the camera; (3) after sending the first alert, obtains a second category of the plurality of motion categories for a second motion event, the second motion event corresponding to a second plurality of video frames from the camera; (4) in accordance with a determination that the second category is the same as (or substantially the same as) the first category, determines whether a predetermined amount of time has elapsed since the sending of the first alert; (5) in accordance with a determination that the predetermined amount of time has elapsed, sends a second alert indicative of the second category to the user; and (6) in accordance with a determination that the predetermined amount of time has not elapsed, forgoes sending the second alert. For example, the first category and the second category comprise a known person(s) event category 71704 (FIG. 7C) and the system determines that at least 30 minutes have elapsed since the first alert was sent. As another example, FIG. 16C shows person detection 1646 at time 69 and person detection 1650 at time 89. In some implementations, person detection 1646 and person detection 1650 both correspond to the same event category (e.g., unknown person(s) event 71702, FIG. 7C). In this example, the system determines that at least 10 minutes have elapsed since person alert 1644, corresponding to person detection 1646 was sent. In accordance with this determination, the system sends person alert 1648, corresponding to person detection 1650. In some implementations, the system assigns a particular alert type to each event and the system sends a new alert in accordance with a determination that at least a predetermined amount of time has elapsed since the last alert of the particular alert type was sent. In some implementations, determining whether a predetermined amount of time has elapsed since the sending of the first alert comprises determining whether a timer associated with the second category meets one or more predetermined criteria. In some implementations, the system obtains the first event category from a categorizer, such as categorizer 1141 in FIG. 11F. In some implementations, the categorizer is a component of the system, such as event categorizer sub-module 7148. In some implementations, the categorizer is separate and distinct from the system. In some implementations, the system utilizes event categorizer sub-module 7148 to obtain the first and second categories. In some implementations, the system utilizes alert sub-module 7151 and/or network communication module 712 to send the first alert. In some implementations, the first alert is presented at a client device, such as client device 504 in FIG. 14A. In some implementations, the system utilizes data processing module 7144 or a component thereof (e.g., event categorizer sub-module 7148) to determine whether the second category is the same as the first category.

In some implementations, the predetermined amount of time is based on the category. For example, events of type unknown person(s) event 71702 have a predetermined amount of time of 10 minutes and events of type animal event 71708 have a predetermined amount of time of 30 minutes. In some implementations, the predetermined amount of time is based at least in part on an importance metric associated with the first category. For example, more important categories have alerts sent more frequently than less important categories. In some implementations, the predetermined amount of time is based on a confidence level for the event category. For example, a particular event is assigned known person(s) event type 71704 (FIG. 7C) with a corresponding confidence level of 65. In this example, alerts for known person(s) events with confidence levels above 50 are sent no more than every 20 minutes while known person(s) events with confidence levels below 50 are sent no more than every 30 minutes. In some implementations, the plurality of event categories includes a categories based on the confidence level. For example, a first event category comprises a known persons event with a confidence score above 90 and a second event category comprises a known persons event with a confidence score below 90.

In some implementations: (1) the plurality of motion event categories has a particular category hierarchy, and (2) the system: (a) in accordance with a determination that the second category is not the same as the first category, determines whether a predetermined amount of time has elapsed since sending an alert indicative of the second category or a category above the second category in the category hierarchy; (b) in accordance with a determination that the predetermined amount of time has elapsed since sending an alert indicative of the second category or a category above the second category in the category hierarchy, sends the second alert indicative of the second category to the user; and (c) in accordance with a determination that the predetermined amount of time has not elapsed since sending an alert indicative of the second category or a category above the second category in the category hierarchy, forgoes sending the second alert. For example, FIG. 16C shows a person detection 1640 at time 38 and a motion detection 1642 at time 63. In accordance with some implementations, person detection 1640 corresponds to a person event category and motion detection 1642 corresponds to a general motion event category. In this example, the system determines that the event category for the person detection 1640 differs from the event category for the motion detection 1642. The system then determines how much time has elapsed since an event of general motion event category or a higher category in the event category hierarchy. In this example, 31 minutes have elapsed since the last motion detection and 25 minutes have elapsed since the last person detection. If the predetermined amount of time is 30 minutes, the system will not send an alert because only 25 minutes have elapsed since the previous person event (corresponding to person detection 1640) and person events are higher in the event category hierarchy than general motion events.

In some implementations, the category hierarchy comprises a plurality of motion event categories and a plurality of confidence levels. For example, the category hierarchy includes a first entry for the first category with a first confidence level and a second entry for the first category and a second confidence.

In some implementations: (1) sending the first alert to the user comprises utilizing a first delivery method for sending the first alert to the user, and (2) sending the second alert to the user in accordance with a determination that the second category is not the same as the first category comprises utilizing a second delivery method for sending the second alert. For example, utilizing the second delivery method comprises sending the second alert to different devices than the first delivery method; and/or causing the devices to react differently. As another example, the first delivery method includes an audio alert and the second delivery method does not include an audio alert. In some implementations, the first delivery method comprises sending the alert to only one client device associated with the smart home environment. In some implementations, the second delivery method comprises sending the alert to all client devices associated with the smart home environment. In some implementations, the second delivery method utilizes different display characteristics for presenting the alert than the first delivery method.

For example, the first delivery method causes the alert shown in FIG. 14A to have a grey border and the second delivery method causes the alert shown in FIG. 14A to have a red border.

In some implementations: (1) the system generates a confidence level for an association of the motion event candidate with the first category; and (2) the first alert is indicative of the first category and the confidence level. For example, the system determines that a particular motion event, or motion event candidate, is most likely an event involving a person and generates a corresponding confidence level of 76. In this example, the system sends an alert, such as alert 1414 in FIG. 14B indicating the event category (a person event) and the confidence level (likely involving).

In some implementations, the category hierarchy is based on at least one of: a user preference of the user; a user profile of the user; and a group profile of a group that includes the user. In some implementations, the user preference comprises an express user preference obtained from the user. In some implementations, the user preference comprises an implied user preference (e.g., based on prior user activity, heuristics, and the like). In some implementations, information for the user profile of the user is received from the user. In some implementations, information for the user profile of the user is generated by the system (e.g., based on prior user activity, heuristics, and the like).

In some implementations, the category hierarchy is based on at least one of: placement of the camera (e.g., indoors or outdoors); a camera type of the camera; one or more settings of the camera; and a time of the motion event candidate. For example, a category hierarchy for an outdoor camera assigns higher position within the category hierarchy to vehicle events than a category hierarchy for an indoor camera assigns to the vehicle events. In some implementations, the camera type of the camera includes information regarding the capabilities of the camera. For example, a category hierarchy for a camera with a high quality microphone assigns higher position within the category hierarchy to audio events than a category hierarchy for a camera with a lower quality microphone assigns to the audio events. In some implementations, the one or more settings of the camera include information regarding an operating state of the camera (e.g., low light mode). For example, a category hierarchy for a camera in low light mode assigns higher position within the category hierarchy to events involving a moving light than a category hierarchy for a camera in a higher light mode assigns to the events involving a moving light. In some implementations, the one or more settings of the camera include a device profile. In some implementations, the one or more settings comprise one or more settings set by a user in the smart home. In some implementations, the one or more settings include a category hierarchy for the camera set at least in part by a user. For example, the user denotes animal events 71708 (FIG. 7C) as being at the top of the category hierarchy. In some implementations, the time of the motion event candidate comprises information regarding one or more of: time of day, time of week, time of month, time of year, and the like. For example, audio events occurring at night are higher in a category hierarchy than audio events occurring during the day. In some implementations, the time of the motion event candidate comprises information regarding a time corresponding to the user being away from the smart home or a time corresponding to the user being in the smart home. For example, vehicle events occurring while a user is away from the smart home are higher in a category hierarchy than vehicle events that occur while the user is home.

In some implementations, the system: (1) analyzes one or more audio events corresponding to the first motion event; and (2) determines an event category based on the analyzed one or more audio events and the first category; where the first alert is indicative of the event category. In some implementations, the alert indicates that sound was present. In some implementations, the alert indicates the type of sound present. In some implementations, the alert includes an affordance to playback at least a portion of the audio event. In some implementations, the system assigns a motion event category and an event category, distinct from the motion event category. For example, the motion event category is "John moving in the living room" and the event category is "John singing and dancing in the living room." In some implementations, the system assigns a motion event category and an audio event category. In some implementations, the audio event category is independent of the motion event category. For example, the motion event category is "John moving in the living room" and the audio event category is "John talking." In some implementations, the system utilizes data processing module 7144 (FIG. 7A) or a component thereof, such as event processor sub-module 7146 or event categorizer sub-module 7148, to analyze the one or more audio events and/or determine the event category.

In some implementations, the system: (1) receives a plurality of video frames from a camera, the plurality of video frames including a motion event candidate; (2) categorizes the motion event candidate by processing the plurality of video frames, the categorizing including: (a) associating the motion event candidate with a first category of a plurality of motion event categories; and (b) generating a confidence level for the association of the motion event candidate with the first category; and (3) sends an alert indicative of the first category and the confidence level to a user associated with the camera. For example, FIGS. 14A-14C show examples of alerts indicative of categories and confidence levels. In some implementations, the system includes the camera. In some implementations, the camera is communicatively coupled to the system. In some implementations, the categorizing includes associating the motion event candidate with a plurality of categories; and generating a confidence level for the association of the motion event candidate with each of the plurality of categories. In some implementations, an alert is generated for the category with the highest confidence level. In some implementations, the system utilizes network interface(s) 704 in conjunction with network communication module 712 to receive the plurality of video frames. In some implementations, the system utilizes event categorizer sub-module 7148 and event categories 7170 to categorize the motion event candidate. In some implementations, the system utilizes event categorizer sub-module 7148 and event categories 7170 to generate the confidence level. In some implementations, the system utilizes network interface(s) 704 in conjunction with network communication module 712 to send the alert. In some implementations, the system sends alert information to a client device and the client device generates an alert based on the alert information. In some implementations, the system sends an alert to the client device and the client device presents the alert to the user. In some implementations, sending an alert indicative of the first category and the confidence level to the user associated with the camera comprising sending the alert indicative of the first category and the confidence level to the user associated with the camera in accordance with a determination that a descriptive alerts option is enabled.

In some implementations: (1) the system obtains a descriptive phrase indicative of the confidence level; and (2) sending the alert indicative of the first category and the confidence level comprises sending the alert with the obtained phrase. For example, a confidence level above confidence threshold 71716 (FIG. 7C) and below confidence threshold 71714 corresponds to the phrase "may involve." For example, the first category comprises animal event 71708 and the confidence level is 55 and therefore the alert message states "Activity that may involve Mr. Paws was detected." As another example, a confidence level above confidence threshold 71714 (FIG. 7C) and below confidence threshold 71712 corresponds to the phrase "likely involves." As another example, a confidence level above confidence threshold 71712 (FIG. 7C) corresponds to the term "involving." For example, the first category comprises vehicle event 71710 and the confidence level is 97 and therefore the alert message states "Activity involving a vehicle was detected."

In some implementations, the first category indicates that the motion event involves at least one of: a person; a known person; and an unknown person. For example, the first category indicates that a specific person, such as "Joe" was involved. As another example, the first category indicates that an unrecognized person (e.g., an intruder) was involved. In some implementations, the first category indicates a recognized object or entity is involved, such as a vehicle, a pet, a weapon, or wildlife. In some implementations, sending an alert for an event involving a known person includes sending the name of the person. For example, the alert message states that "A motion event involving Sally occurred." In some implementations, a known person is determined using facial recognition (e.g., in conjunction with person detection). In some implementations, a known person is determined using gait detection.

In some implementations, the first category indicates that the motion event involves a particular portion of a field of view of the camera. For example, a camera has a field of view that includes a door. In this example, a motion event involving the door, such as a person entering through the door, is assigned an event category indicative of the door. For example, the alert message for a person entering through the door states that "A person has entered through the living room door." In some implementations, the first category indicates that the motion event involves a zone of interest. For example, alert 1410 in FIG. 14B indicates that the motion event involves Zone A. In this example, the motion event category assigned to the motion comprises a Zone A motion category.

In some implementations, the alert indicates whether the confidence level meets one or more predefined criteria. In some implementations, the alert indicates whether or not the confidence level exceeds one or more thresholds. For example, alert 1414 in FIG. 14B includes alert message 1416 stating "likely involving a person" indicating that the confidence level for the person event category exceeds confidence threshold 71714 (FIG. 7C).

In some implementations: (1) the system selects a first delivery method of a plurality of delivery methods for sending the alert to the user, where the first delivery method is based at least in part on the confidence level; and (2) sending the alert to the user comprises utilizing a first delivery method for sending the alert to the user. For example, an alert for a person event with a high confidence level is pushed to more user devices than an alert for a person event with a lower confidence level. In some implementations, the delivery method is based on the event category and the confidence level. For example, some delivery methods include sending the alert to different devices than other delivery methods. As another example, some delivery methods cause the devices to react differently than other delivery methods. As another example, some delivery methods include an audio alert and other delivery methods do not include an audio alert. In some implementations, the first delivery method comprises sending the alert to only one client device associated with the smart home environment. In some implementations, the first delivery method comprises sending the alert to all client devices associated with the smart home environment. In some implementations, some delivery methods utilize different display characteristics for presenting the alert than other delivery methods.

In some implementations, categorizing the motion event candidate by processing the plurality of video frames comprises categorizing the motion event candidate by processing the plurality of video frames and analyzing information received from a device distinct from the camera. For example, the system uses information obtained from multiple smart devices, such as multiple cameras, to categorize the event. As another example, the system uses audio obtained from a smart television to categorize a motion event candidate captured by a camera in the same room as the smart television.

In some implementations, categorizing the motion event candidate by processing the plurality of video frames comprises analyzing at least one of: total amount of motion in the video frames; direction of motion detected in the video frames; velocity of motion detected in the video frames; and whether motion detected in the video frames corresponds to a recognized activity. In some implementations, total amount of motion in the video frames comprises total amount of motion in a particular video frame of the plurality of video frames. In some implementations, categorizing the motion event candidate by processing the plurality of video frames comprises analyzing one or more motion tracks. In some implementations, the motion event candidate is categorized utilizing processing pipeline 1112 (FIG. 11B).

In some implementations: (1) the system analyzes one or more audio events corresponding to the motion event candidate; and (2) generating the confidence level comprises generating the confidence level based at least in part on the analyzed one or more audio events. In some implementations, the system obtains audio information (e.g., raw or preprocessed audio information) and generates the confidence level based at least in part on the audio information. For example, analysis of the motion event candidate indicates that the motion event candidate includes a person screaming. Analysis of contemporaneous audio data capture by a nearby device indicates that a person is screaming. In this example, the system generates a confidence level based on the analysis of the motion event candidate and analysis of the contemporaneous audio.

In some implementations, the system sends an alert in accordance with a determination that motion has ceased. For example, a camera set in a busy location sends a motion stop alert after a predetermined amount of inactivity (e.g., 5, 10, or 15 minutes).

In some implementations, one or more of the above method operations are performed by a smart device, such as smart device 204 (FIG. 9). In some implementations, one or more of the above method operations are performed by a camera 118. In some implementations, one or more of the above method operations are performed by a client device 504.

It should be understood that the particular order in which the operations in FIG. 18 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 1800 described above with respect to FIG. 18.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first category could be termed a second category, and, similarly, a second category could be termed a first category, without departing from the scope of the various described implementations. The first category and the second category are both categories, but they are not necessarily the same category.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
at a computing system having one or more processors and memory:
obtaining a video feed, the video feed comprising a plurality of images; and
for each image in the plurality of images, analyzing the image to determine whether the image includes a person, the analyzing including:
determining that the image includes a potential instance of a person by analyzing the image at a first resolution;
in accordance with the determination that the image includes the potential instance, denoting a region around the potential instance, wherein the area of the region is less than the area of the image;
determining whether the region includes an instance of the person by analyzing the region at a second resolution, greater than the first resolution; and
in accordance with a determination that the region includes the instance of the person:
determining that the image includes the person; and
storing an indication of the determination for use in subsequent alert notification processing.

2. The method of claim 1, further comprising, for each image of the plurality of images, assigning a confidence score to the image.

3. The method of claim 2, wherein the confidence score is based on the analysis of the image at the first resolution.

4. The method of claim 2, wherein the confidence score is based on the analysis of the region at the second resolution.

5. The method of claim 2, wherein the video feed includes a motion event, and the method further comprises, in accordance with a determination that the confidence score for at least one image of the plurality of images exceeds a predetermined threshold, denoting the motion event as involving a person.

6. The method of claim 1, wherein determining that the image includes the potential instance of the person comprises:
detecting the potential instance of the person;
assigning a confidence score to the potential instance of the person; and
in accordance with a determination that the confidence score meets one or more predetermined criteria, determining that the images include the potential instance of the person.

7. The method of claim 1, further comprising:
determining whether the region includes one or more persons other than the potential person; and in accordance with a determination that the region includes the one or more other persons, denoting the image as containing a person.

8. The method of claim 1, further comprising:
determining that one or more images of the plurality of images includes a person;
obtaining a second plurality of images, the second plurality of images preceding the motion event;
for each image in the second plurality of images, analyzing the image to determine whether the image includes the person;
in accordance with a determination that one or more images of the second plurality of images do not include the person, denoting the motion event as involving the person; and
in accordance with a determination that one or more images of the second plurality of images include the person, forgoing denoting the motion event as involving the person.

9. The method of claim 1, further comprising:
in accordance with a determination that an image includes multiple potential instances of a person, denoting a region encompassing each potential instance; and
determining whether the region includes one or more instances of a person by analyzing the region at a second resolution, greater than the first resolution.

10. The method of claim 1, further comprising:
for each image in the plurality of images, analyzing the image to determine whether the image includes a particular object, the analyzing including:
determining whether the image includes a potential instance of the particular object by analyzing the image at a first resolution;
in accordance with a determination that the image includes a potential instance, denoting a region around the potential instance, wherein the area of the region is less than the area of the image;
determining whether the region includes an instance of the particular object by analyzing the region at a second resolution, greater than the first resolution; and
in accordance with a determination that the region includes an instance of the particular object, determining that the image includes the particular object.

11. The method of claim 1, further comprising determining whether the motion event involves a person by analyzing one or more relationships between images including persons of the plurality of images.

12. A computing system comprising:
one or more processors; and
memory coupled to the one or more processors, the memory storing one or more programs configured to be executed by the one or more processors, the one or more programs including instructions for:
obtaining a video feed, the video feed comprising a plurality of images; and
for each image in the plurality of images, analyzing the image to determine whether the image includes a person, the analyzing including:
determining that the image includes a potential instance of a person by analyzing the image at a first resolution;
in accordance with the determination that the image includes the potential instance, denoting a region around the potential instance, wherein the area of the region is less than the area of the image;
determining whether the region includes an instance of the person by analyzing the region at a second resolution, greater than the first resolution; and
in accordance with a determination that the region includes the instance of the person:
determining that the image includes the person; and
storing an indication of the determination for use in subsequent alert notification processing.

13. The computing system of claim 12, wherein the one or more programs further include instructions for assigning a confidence score to each image of the plurality of images.

14. The computing system of claim 13, wherein the video feed includes a motion event, and the one or more programs further include instructions for, in accordance with a determination that the confidence score for at least one image of the plurality of images exceeds a predetermined threshold, denoting the motion event as involving a person.

15. The computing system of claim 12, wherein determining that the image includes the potential instance of the person comprises:
detecting the potential instance of the person;
assigning a confidence score to the potential instance of the person; and
in accordance with a determination that the confidence score meets one or more predetermined criteria, determining that the images include the potential instance of the person.

16. The computing system of claim 12, wherein the one or more programs further include instructions for:
determining that one or more images of the plurality of images includes a person;
obtaining a second plurality of images, the second plurality of images preceding the motion event;
for each image in the second plurality of images, analyzing the image to determine whether the image includes the person;
in accordance with a determination that one or more images of the second plurality of images do not include the person, denoting the motion event as involving the person; and
in accordance with a determination that one or more images of the second plurality of images include the person, forgoing denoting the motion event as involving the person.

17. A non-transitory computer-readable storage medium storing one or more programs, the one or more programs comprising instructions, which when executed by a computing system, cause the system to:
obtain a video feed, the video feed comprising a plurality of images; and
for each image in the plurality of images, analyze the image to determine whether the image includes a person, the analyzing including:
determining that the image includes a potential instance of a person by analyzing the image at a first resolution;
in accordance with the determination that the image includes the potential instance, denoting a region around the potential instance, wherein the area of the region is less than the area of the image;
determining whether the region includes an instance of the person by analyzing the region at a second resolution, greater than the first resolution; and
in accordance with a determination that the region includes the instance of the person:
determining that the image includes the person; and storing an indication of the determination for use in subsequent alert notification processing.

18. The non-transitory computer-readable storage medium of claim 17, wherein the one or more programs comprising instructions, which when executed by the computing system, cause the system to assign a confidence score to each image of the plurality of images.

19. The non-transitory computer-readable storage medium of claim 17, wherein determining that the image includes the potential instance of the person comprises:
 detecting the potential instance of the person;
 assigning a confidence score to the potential instance of the person; and
 in accordance with a determination that the confidence score meets one or more predetermined criteria, determining that the images include the potential instance of the person.

20. The non-transitory computer-readable storage medium of claim 17, wherein the one or more programs comprising instructions, which when executed by the computing system, cause the system to:
 determine that one or more images of the plurality of images includes a person;
 obtain a second plurality of images, the second plurality of images preceding the motion event;
 for each image in the second plurality of images, analyze the image to determine whether the image includes the person;
 in accordance with a determination that one or more images of the second plurality of images do not include the person, denote the motion event as involving the person; and
 in accordance with a determination that one or more images of the second plurality of images include the person, forgo denoting the motion event as involving the person.

* * * * *